US006141653A

United States Patent
Conklin et al.

[19]

[11] Patent Number: 6,141,653
[45] Date of Patent: Oct. 31, 2000

[54] SYSTEM FOR INTERATIVE, MULTIVARIATE NEGOTIATIONS OVER A NETWORK

[75] Inventors: Jeffrey Conklin, Boston; David Foucher, Somerville; Daniel Foucher, Bedford, all of Mass.

[73] Assignee: TradeAccess Inc, Cambridge, Mass.

[21] Appl. No.: 09/192,735

[22] Filed: Nov. 16, 1998

[51] Int. Cl.[7] .................................................. G06F 17/60
[52] U.S. Cl. .................... 705/80; 705/1; 705/26
[58] Field of Search .................... 705/80, 1, 26, 705/27, 39, 37

[56] References Cited

U.S. PATENT DOCUMENTS

| | | |
|---|---|---|
| 4,799,156 | 1/1989 | Shavit et al. . |
| 5,253,165 | 10/1993 | Leiseca et al. . |
| 5,305,200 | 4/1994 | Hartheimer et al. . |
| 5,495,412 | 2/1996 | Thiessen ................................. 364/401 |
| 5,557,518 | 9/1996 | Rosen . |
| 5,629,982 | 5/1997 | Micali . |
| 5,666,420 | 9/1997 | Micali . |
| 5,671,279 | 9/1997 | Elgamal . |
| 5,677,955 | 10/1997 | Doggett et al. . |
| 5,715,314 | 2/1998 | Payne et al. . |
| 5,732,400 | 3/1998 | Mandler et al. . |
| 5,757,917 | 5/1998 | Rose et al. . |
| 5,787,402 | 7/1998 | Potter et al. .............................. 705/37 |
| 5,790,677 | 8/1998 | Fox et al. . |
| 5,794,207 | 8/1998 | Walker et al. . |
| 5,802,497 | 9/1998 | Manasse . |

(List continued on next page.)

OTHER PUBLICATIONS

"TRADE'ex Unveils MarketMaker Software for Creating Online Marketplace," Business Wire, p. 04280202, Apr. 1998.

"Corporate EFT Report," Technology Center, vol. 18, No. 2, p. N/A, Feb. 1998.

"TradeAccess Sponsors First U.S. Trade Mission Web Site For Department of Commerce," PR Newswire, Dec. 1997.

Jones, Chris, "Trade'ex Readies Java-based MarketMaker," InfoWorld, vol. 18, No. 44, p. 6, Oct. 1996.

TDS Marketing Group, "TRADE'ex Connects the UK," M2 Presswire, p. N/A, Oct. 1996.

Schmerken, Ivy, "NASDAQ Revamps to Keep Up," Wall Street Computer Review, vol. 8, No. 10, p. 35(6), Jul. 1991.

*Primary Examiner*—Eric W. Stamber
*Assistant Examiner*—Susanna Meinecke-Diaz
*Attorney, Agent, or Firm*—Maureen Stretch

[57] ABSTRACT

A multivariate negotiations engine for iterative bargaining which: enables a sponsor to create and administer a community between participants such as buyers and sellers having similar interests; allows a buyer/participant to search and evaluate seller information, propose and negotiate orders and counteroffers that include all desired terms, request sample quantities, and track activity; allows a seller/participant to use remote authoring templates to create a complete Website for immediate integration and activation in the community, to evaluate proposed buyer orders and counteroffers, and to negotiate multiple variables such as prices, terms, conditions etc., iteratively with a buyer. The system provides secure databases, search engines, and other tools for use by the sponsor, which enable the sponsor to define the terms of community participation, establish standards, help promote the visibility of participating companies, monitor activity, collect fees, and promote successes. All this is done through a multivariate negotiations engine system operated at the system provider's Internet site, thus requiring no additional software at the sponsors', or participant sellers', or buyer's sites. This also allows buyers and sellers to use and negotiate payment options and methods that are accepted internationally. The system maintains internal databases that contain the history of all transactions in each community, so that sponsors, buyers and sellers may retrieve appropriate records to document each stage of interaction and negotiation. Documents are created by the system during the negotiation process.

58 Claims, 56 Drawing Sheets

U.S. PATENT DOCUMENTS

| | | | |
|---|---|---|---|
| 5,809,144 | 9/1998 | Sirbu et al. | |
| 5,826,244 | 10/1998 | Huberman | 705/37 |
| 5,873,071 | 2/1999 | Ferstenberg et al. | 705/37 |
| 5,897,621 | 4/1999 | Boesch et al. | 705/26 |
| 5,905,975 | 5/1999 | Ausubel | 705/37 |
| 5,918,218 | 6/1999 | Harris et al. | 705/37 |
| 5,924,082 | 7/1999 | Silverman et al. | 705/37 |
| 5,963,923 | 10/1999 | Garber | 705/37 |
| 6,014,643 | 1/2000 | Minton | 705/37 |

```
BEGIN
LOGIN: 579
NAME: The Federation of Korean Industries
LC_BANK_NAME: Imperial Bank
LC_BANK_ADDR: Corporate Service Center, 2015 Manhattan Beach Boulevard
LC_BANK_CITY: Redondo Beach
LC_BANK_COUNTRY:USA
LC_SWIFT_ID: IMPBUS66
ADMIN:0
TEMPLATE:4
SIGNED:1
EXW:0
FCA:0
FAS:0
FOB:0
CFR:0
CIF:0
CPT:0
CIP:0
DAF:0
DES:0
DEQ:0
DDU:0
DDP:0
CREDIT:1
LETTER:0
DOCUMENTARY:0
 END
```

FIG. 10 -1

SETUP AREA

HELP! CLICK HERE!

GENERAL INFO
EDIT   PREVIEW

HOME PAGE
EDIT   PREVIEW

PROFILE PAGE
EDIT   PREVIEW

STAFF PAGE
EDIT   PREVIEW

LOCATION PAGE
EDIT   PREVIEW

PRODUCTS / SERVICES
EDIT   PREVIEW

PRODUCT CATALOG
EDIT   PREVIEW

PROCESSING & PAYMENT
EDIT   PREVIEW

SERVICE PAGE
EDIT   PREVIEW

---

Welcome, Client name!

This is the Sponsor setup area, where you can create your company's ECommerce website quickly and easily. Simply follow the step-by-step instructions; we've included sample text to show you what kind of information to provide.

Access to the Setup Area is restricted by company code and password to authorized representatives of your company. Providing accurate information is important, so please edit your website as often as you like. To edit your information, point your browser as often as you like to http://www.provider.com/mysite/ and enter your company code and password.

Each section below represents a different page of your website. Simply click on the edit button for each page, review the sample text we've provided, fill out the form with information about your business, and then preview your new page by clicking on the preview button.

The page preview allows you to look over the final content of the pages you have created. Once you are happy with your work, you can view your actual working website by pointing your web browser to http://www.provider.com/es/exports. Please save this internet address to see your website on the Internet.

First time visitors must start with "General Information" and complete all sections. Instructions are available to guide you . This entire process should take about one hour. After completing set up, updating your information will take much less time. Use the navigation bars on the left side of each page to save time.

GENERAL INFORMATION — 100

In this section, enter general information such as company name, contact information, etc. The information you provide is used on all of the pages on your website, so please be accurate.

EDIT ▶ — 102

HOME PAGE — 104

Your Home Page is the first page that visitors to your website will see. It should welcome the visitor and give them a short introduction to your company and its products. Click the edit button to set up or edit this page. — 106

EDIT ▶   PREVIEW ▶ — 108

Fig. 11a-1

| | |
|---|---|
| To: | Jeff Jones, CEO <Buyer><br>Purchasing Department, M/s 897,229 Berkely Street, Boston, Ma 02116 |
| | In accordance with the terms of our Purchase Order number EX05 dated 09/20/1998 please issue an irrevocable documentary letter of credit (subject to UCP500) by cable with the following terms and conditions: |
| Advising Bank: | Imperial Bank <Seller><br>Corporate Service Center, 2015 Manhattan Beach Boulevard<br>Redondo Beach<br>USA<br>SWIFT ID: IMPBUS66 |
| Beneficiary: | ABC,Inc. |
| Amount: | $25000.00 usd +/- 10% |
| Payment Terms: | Sight Payment |
| Latest Shipment: | 1/1/99 |
| Expiration Date: | 10/20/98 |
| Presentation: | Documents must be presented no later than 21days from B/L |
| Partial Shipments: | Permitted |
| Transshipment: | Permitted |

FIG. 11a-2

| | |
|---|---|
| 3rd Party Docs: | Not Permitted |
| Merchandise: | per Buyer's Order Number EX05 |
| Ship Terms as per INCOTERMS 1990: | CIP |
| PORTS: | ORIGIN: UNKNOWN, DESTINATION: BOSTON |
| INSURANCE: | PAID BY APPLICANT |
| FREIGHT: | PAID BY APPLICANT |
| OTHER TERMS: | NEGOTIATING BANKS AUTHORIZATION TO DEDUCT 5% from the proceeds and pay to:<br><br>ABC,Inc. Business & Information Services, Inc.<br>229 Berkeley Street<br>Boston, MA 02116<br>617-450-9405<br><br>indicating documents value less commision net proceeds due |
| Documents Required: | Commercial Invoice: 1 Original, 3 Copies<br>Packing List: 1 Original, 1 Copy<br>Clean On Board Ocean B/L: 3 Originals, 1 Copy<br>Air Waybill: 1 Original, 1 Copy<br>Forwarders Cargo Receipt: 1 Original, 1 Copy<br>Certificate of Origin: 1 Original, 1 Copy<br><br>BENEFICIARY'S STATEMENT AUTHORIZING THE DEDUCTION CALCULATED AT 5% FROM THE INVOICE AMOUNT BEING AGENTS COMMISSION PAYABLE TO: |

FIG. 11a-3

ABC,Inc. Business & Information
Services, Inc.
229 Berkeley Street
Boston, MA 02116
617-450-9405

Charges:
Issuing Bank charges for: Applicant
Advising Bank charges for: Beneficiary
Reimbursing Bank charges for: Applicant
Acceptance Commssion for: Beneficiary
Discount charge for: Applicant

FIG. 11b

>From www@harvard.net  Sat May 9 01:11:28 1998
Date: Sat, 9 May 1998 01:16:45 - 0400 (EDT)
From: info@mvn.com
To: davef@swave.com, info.mvn.com@postoffice.harvard.net
Sub;ect:  Membership form Nu-Seller The following user requested a website; however, it entered an invalid Company Code, and could not be found in the database. Its website has been activated. Please respond by verifying their access and requesting an invoice from the appropriate sponsor representative, or by deleting their access through administration.

---------------------------------------------------------------------DEMOGRAPHICS

| | |
|---|---|
| Date: | 19950413 |
| Name: | Girish Panjwani |
| Title: | Deputy Manager |
| Company: | Nu-Seller, Ltd. |
| Product Chosen: | International BusinessStarter A |
| Cost: | 9,999 Rupees |
| Company Code: | EIC1043 |
| Address: | 14, Commercial Complex |
| City: | New Delhi |
| Region: | New Delhi |
| Postal Code: | 110 048 |
| Phone: | 6445521 |
| Fax: | 6431929 |
| Email: | gpanjwani@nu-seller.co.in |

Message:

Dear Sponsor Representative:

The above individual/company has agreed to and acknowledged the MVN Listing Agreement, and has selected the above product at the above price to set up on the MVN Web Site. By proceeding with the setup process on this Web Site, the above company hereby agrees that it will promptly pay the invoice submitted by you.

Thank you.

FIG. 12

ADMINISTRATION

Below is a list of orders. Click on any order to view the order in more detail and for further options

| ID | STATUS | Buyer Order NUMBER | BUYER | PAYMENT | ITEMS | TOTAL |
|---|---|---|---|---|---|---|
| Test Account | | | | | | |
| 1 | In Negotiation | DA01 | ABC | Letter Of Credit | 1 | $ 897.00 |
| 12 | Incomplete | DA02 | Socjjdk | Letter Of Credit | 2 | $ 2290.00 |
| Exports Inc. | | | | | | |
| 2 | Incomplete | EX01 | Tool Inc. | Wire Transfer | 1 | $12500.00 |
| 3 | Incomplete | EX02 | company | Letter Of Credit | 1 | # 12500.00 |
| 4 | Incomplete | EX03 | hjk | Wire Transfer | 1 | $12500.00 |
| 5 | Incomplete | EX04 | hjk | Letterr Of Credit | 1 | $12500.00 |
| 6 | In Negotiation | EX05 | TradeAccess Inc. | Letter Of Credit | 1 | $25000.00 |
| 7 | In Negotiation | EX06 | x | Letter of Credit | 1 | $25000.00 |
| 8 | In Negotiation | EX07 | TradeAccess Inc. | Letter Of Credit | 1 | $25000.00 |
| 9 | In Negotiation | EX08 | Buyers Inc. | Letter Of Credit | 1 | $25000.00 |
| 10 | Incomplete | EX09 | Baskets Inc. | Credit Card | 1 | $ 200.00 |
| 11 | In Negotiation | EX10 | EMI | Letter Of Credcit | 1 | $25000.00 |

FIG. 13

SPONSOR

| | |
|---|---|
| Order #: | 6 |
| Buyer's Order ID: | EX05 |
| Company Code: | <u>exports</u> |
| Status: | In Negotiation (awaiting vendor) |
| Payment: | <u>Letter of Credit</u> |
| Delivery: | CIP |
| Buyer ID: | oKmYfWlv |
| Buyer: | Jeff Jones, CEO<br>ABC,Inc. , Inc.<br>Purchasing Department<br>M/s 897 229 Berkeley Street<br>Boston, MA 02116<br>Phone: 617-450-9405   Fax: 617-450-9409<br>Email: info/abcinc.com<br>Bank Name: BankBoston   Bank Swift: BB12345<br>Bank Address: One Financial Place, Boston |
| SHIP TO: | Henry Smith<br>Shipping Clerk<br>ABC, Inc.<br>Shipping Department<br>M/s 897 229 Berkeley Street<br>Boston MA 02116<br>Phone: 617-450-9405   Fax: 617-450-9409<br>Email: info@abcinc.com |
| Freight: | DHL<br>123 Cargo Street<br>Boston, MA 02116<br>Phone: 617-345-4500   Fax: 617-345-8700<br>Email: ships@dhl.com |
| Items: | *10 Grade 100 Widgets<br>(ID:EX100) at $2500.00 |
| Total: | $25000.00 |

FIG. 14

ADMINISTRATION

Welcome to the Sponsor administration area.

The list below contains all of the companies who are currently registered with the service. You may use the register button to register a new company for inclusion in the list, or select an existing company and then click on the 'view' or 'remove' button to perform that action .

Please note that this part of the site requires a current javascript-enabled web browser, so please upgrade your browser! (The rest of the system does not require an advanced browser.)

| | |
|---|---|
| B123 | .......... Bharali Mfg |
| CIITA | .......... Test Co Name |
| CONCAMIN | .......... CONCAMIN |
| EIC1043 | .......... Eicher Goodearth Ltd |
| EIC7273 | .......... Eicher Ltd |
| Eric | .......... Dill Corp |
| FMM | .......... Federation of Malaysian Manufacturers |
| FRI | .......... Francis Inc. |
| Helaine | .......... Helaine |
| Imperial | .......... Imperial Bank |
| JC3 | .......... Test co |
| JMC1 | .......... Handbag Company |
| Jan | .......... Integrative Medicine |
| Karen | .......... x |
| MA12 | .......... Malaysia Inc. |

REGISTER    VIEW    REMOVE

View orders which are:   View Order #   _____

FIG. 15b

332 Name*: [Jeff Jones]  Title*: [CEO]

Company*: [ABC, Inc.]

334 Address*:
336 [x]
[x]
[x]

City*:  State/Country*:

338 Postal Code* [x]  Telephone*: [x]

340 E-mail*: [x]  Fax*: [x]

Freight Forw[x] ht forwarder at Bo[x]

342 Freight Forwarder*:

344 Address*:
346 [dhl]

348 City*: [x]
[x]

Postal Code* [x]

E-mail*: [x]  Fax*: [x]

[x]  [x]

Parti[x]  Perm[x]
Transshipment:  Permitted  Prohibited
350  351
 Documents must be presented no later than 21 days
 3rd Party Docs: from B/L ( The Not Permitted cannot be greater than 21).
352  353  355

Merchandise:  ⦿ per Buyer's Order Number EX07
 ○  ○
354 Buyer's Comments:  I want a 20% discount
 356  357
Add any additional terms or comments here:
358

ORDER PROCESSING SYSTEM
LETTER OF CREDIT

Please fill out the following form completely. Fields marked with an astereick (*) are mandatory. When finished, press the 'submit' button to propose your Letter of Credit.

General Information
Buyer: John Smith,Director,ABC inc.
8 Oak Street, South Polema, MA 02166
Seller: Exports Inc.
Advising Bank: Imperial Bank,Corporate Service Center,
2015 Manhattan Beach Boulevard
Redondo Beach, USA
SWIFT ID: IMPBUS99
Expiration Date: _____

Payment Information
Buyer's Order
Number: _____  Total $25000.00 usd
Payment Terms: __Sight __ Acceptance __ Deferred Payment
Tenor: ___days  Sight ___  Bill of Lading date: _____
  Other _____
    (Ignore tenor if using sight payment)

Delivery Informatioin

Latest Shipment: _____
Ship Terms as per INCOTERMS 1990: CIP
Destination Port: _____
Insurance:  __Paid by Applicant  ___Paid by Beneficiary
Freight:    __Paid by Applicant  ___ Paid by Beneficiary

FIG. 15 C-2

[Sidebar buttons: Profile, Products, Catalog, Staff, Where?, Home]

LETTER OF CREDIT - CONTINUED

SHIPPING INFORMATION

Ship to*:     John Smith        Title: Director
Company*:  ABC Inc.
Address*:    8 Oak Street City*:              South Polema     State/Country*: MA
Postal Code*:         02166        Telephone*: 617-555-1023
E-mail*:          john@abc.com      Fax*: 617-555-0191

Freight Forwarder Information: (Freight fowarder at Boston)
Freight Forwarder*: _____
Address*: _____

City*: _____
Postal Code*: _____  Telephone*: _____
E-mail*: _____  Fax*: _____

DOCUMENTS & CHARGES
Documents must be presented no later than 21 days from B/L.

Presentation: (The number of days can be decreased but cannot be increased.)
Partial Shipments:   ___Permitted         ___ Prohibited
Transshipment:       ___Permitted         ___ Prohibited
3rd Party Docs:      Not Permitted
Merchandise:         per Buyer's Order Number EX27

OTHER
Add any additional terms or comments here:
_____
_____

FIG. 17

*Web Generation*

*Order Processing System*

Thank You

You will receive confirmation immediately that your proposed Letter of Credit has been sent to us. Once we have reviewed your proposed terms, you will receive an Email response from us, providing details on the terms we will accept and the procedures for printing your final Letter of Credit form.

To check the status of your order, and for all further actions regarding this order, please visit our Order Information Center. Please use the following information when prompted to idenify yourself to our server:

LOGIN: RaLuYKtr
PASSWORD: vPmAgecp

Please print out this page or write down the above information for future use. If you have any questions or concerns, or forget your login password, please do not hesitate to contact us.

HOME

FIG. 18

From: System
To: Buyer
From: MVNsystem

"NOTIFICATION OF PURCHASE ORDER ACCEPTANCE"

(seller) has accepted your Purchase Order (number). Your order is now confirmed. Full details of the order and necessary payment documentation can be printed from (order URL). Further questions regarding this order should be directed to (seller's email address).

FIG. 19

Generated by System to Buyer

To: Buyer
From: MVNsystem
Subject: Email #3
Bcc:
x-Attachments

"(seller)" has responded to your proposed Purchase Order (number). Full details on the order can be reviewed at (order URL)

FIG. 20

To: Seller
From: MVNsystem
Subject: #2 email text
Bcc:
x-Attachments

A SALE HAS BEEN GENERATED BY SPONSOR FOR Seller Company name.
Sponsor has processed a proposed purchase order on behalf of your company. Please log into your customization area. Review the terms of this order and follow the instructions provided there to respond to the proposed buyer. MVN system will then process your response directly to the buyer.

Order Summary:

- Items Sought: (catalog ID and Description?)
- Amount of Order: ($)
- Buyer's Country:

FIG. 21

To: Buyer
From: MVNsystem to Buyer
Subject: #2 email text
Bcc:
x-Attachments:

"Thank you for proposing your order (number assigned to the PO) to (name of seller). Your order has been submitted for review; (name of seller) will respond to your proposed order by email submitted directly to this account, including instructions on how to proceed with your order at that time. For any questions regading the processing of this order, please contact orders@mvn.com.

Thank you for using MVN."

This is an automatic email notification, no reply is necessary.

FIG. 22

Date: Fri, 2 Oct 1998 21:05:02 -0400 (EDT)
From: MVNsystem to Vendor upon registration
To: davef@swave.com
Subject: Thank you for registering Thank you registering for this Community. The following email has been sent to sponsor for processing of your invoice and Listing Agreement.

```
COMPANY DEMOGRAPHICS
Date:                October 2, 1998
Name:                        David Foucher
Title:               President
Company:             Shockwave Productions
Company Address: 8 Pleasant Street,
                     South Natick, MA 01760

ECommBuilder
Product Chosen:      International
                             BusinessDeveloper
Cost:                28,000 Rupees
Unique URL Cost:  10,000 Rupees
Username:            "test"
```

FIG. 23

Date: Wed, 30 SEP 1998 12:30:41 -0400 (SDT)
From: MVNsystem to Vendor
Subject: Sales action for Exports Inc.
Apparently-To: info@tradeacess.com VENDOR: Exports Inc.
ADDRESS:
COMPANY CODE: exports

---

ACTION NOTICE FOR THIS ACCOUNT

Please note that MVN has registered action by the following user, for the following products:

USER: Arne K
ADDRESS: x,x,x,New York x x

ACTION DATE: Wed Sep 30  12:30:41 1998

PRODUCTS:
1 of item SAMPLE-EX100 at $200.00/ea

ORDER TOTAL: $200.00

---

This is an automated message from MVN. Please do not respond to this message.

*Fig. 24*

| | |
|---|---|
| R1 | ISO compliant |
| R2 | Accepts Incoterms |
| R3 | Record of import/export experience |
| R4 | Able to handle all shipment types |
| R5 | Fees fully paid up |
| R6 | Just-in-time capability |
| R7 | Bar code processing on key docs |
| R8 | Accepts letter of credit, wire transfer or doc. collection |

10,000 widgets at 19.95 each usd

FOB 4-year warranty on parts

Act of God clause excusing performance for fire, flood, earthquake, tornado, strikes, govenment action

ST1

10,000 widgets at 19.95 each usd

FOB 6-month warranty on parts

Act of God clause excusing performance for fire, flood, earthquake, tornado.

BT2

10,000 widgets at 19.95 each usd

FOB 1-year warranty on parts

Act of God clause excusing performance for fire, flood, earthquake, tornado, government action.

FD

10,000 widgets at 19.95 each usd

FOB 1-year warranty on parts

Act of God clause excusing performance for fire, flood, earthquake, tornado, government action.

*Exports, Inc.*

Welcome to our Web Site!

Exports Inc. is a leading New Hampshire area export company that produces widgets.

The Exports Inc. team hopes you enjoy exploring our Website for all your Widget News.

Thank You!

To learn more, please contact us.

FIG.31b

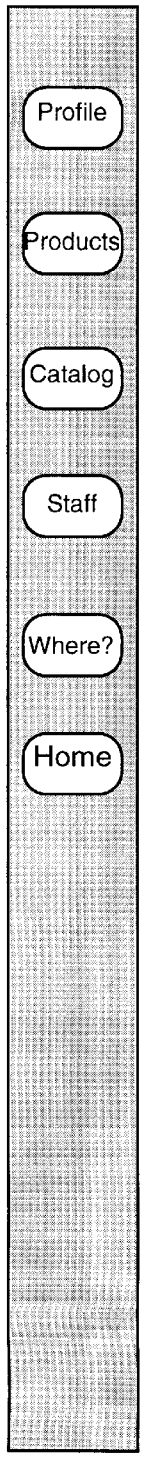

*Exports Inc.*

PRODUCT CATALOG

Please take a moment to browse our product catalog. below. If you wish to place an order, select the quantity of each item in the text boxes at the side of the catalog and click on the 'Review Order and Availability' button at the bottom of the page.

| Quantity Ordered | Product # | Item | Description | Unit | Price/Unit |
|---|---|---|---|---|---|
| _____ | EX300 | Grade 300 Widgets | Yellow plastic widgets, certified compliant | 20 Doz. | $4000.00 usd |
| _____ | Samples of this product (quantity: 1 Dozen) are available for $185.00 per order. | | | | |
| _____ | EX400 | Grade 400 Widgets | Red plastic widgets, certified compliant | 15 Doz. | $6000.00 usd |
| _____ | Samples of this product (quantity: 1 Dozen) are available for $400.00 per order. | | | | |
| _____ | EX500 | Wooden Chairs | Curved seat, wooden spindles, oak, etc. | 2 Doz. | $950.00 usd |
| _____ | Samples of this product (Quantity: 1) are available for $45.00 per order. | | | | |
| _____ | EX200 | Grade 200 Widgets | Green plastic widgets, certified compliant | 10 Doz. | $2500.00 usd |
| _____ | Samples of this product (Quantity: 1 Dozen) are available for $225.00 per order. | | | | |
| _____ | EX100 | Grade 100 Widgets | Blue plastic widgets, certified compliant | 10 Doz. | $2500.00 usd |
| _____ | Samples of this product (Quantity: 1 Dozen) are available for $200.00 per order. | | | | |

Our named port of departure is Boston (ship); Boston (air).
Our international freight forwarder is Evergreen;DHL.

FIG. 31c

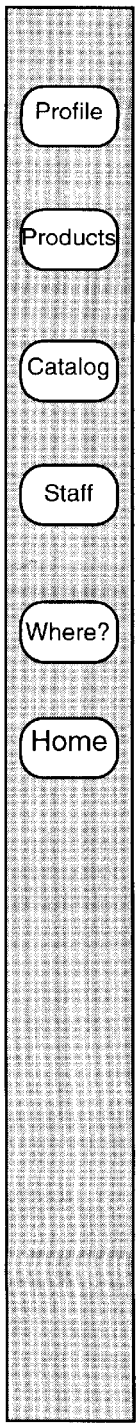

*Exports Inc.*

CUSTOMER SERVICE

Dear Exports Inc. Customers,

Thank you for taking the time to visit the service and support section of our Web Site. Exports Inc. is pleased to provide our customers with online access to our Customer Service staff, who will be pleased to assist you with any questions regarding our products or services.

When contacting us, please take a moment to provide the information requested on our Email form so we may better assist you. A Customer Service Representative will reply to your inquiry as soon as possible.

Exports Inc. is committed to providing outstanding Customer Service, and we look forward to assisting you.

Sincerely,
John Smith
VP of Customer Service

Customer service inquiries may be submitted using our online form.

EXPORTS INC.

CONTACT US

Please take a moment to provide the following information when contacting us.
Note: Fields marked with as asterick (*) are mandatory:

* Your Name: _____

*Your Title/Designation: _____

* Your Company Name: _____

Company Address: _____

City & State: _____

Country: _____

Zip: _____

Telephone: _____

Fax: _____

*Email: _____

Are you an existing Customer?: ___Yes ___No

How may we assist you?: _____

---

Submit Inquiry          Reset

FIG. 32

- Profile
- Products
- Catalog
- Staff
- Where?
- Home

PRODUCT CATALOG

You may use this page to view or change any of this product's information. If you make changes, please make sure that the fields in red are properly filled in before clicking the 'submit' button. You can return to the product list by clicking on the 'back' button below.

Catalog #:     EX400
*(must be unique)*
Product Name:     Grade 400 Widgets

Description:     Red plastic widgets, certified compliant

Unit Size:     15 Dozen
*(kilos, tons, litres, etc.)*

Price ($USD):     6000.00
*(no symbols or commas, please)*
Samples:     x Samples Available
Quantity: 1 Dozen
Price: 400.00

---

Quantities up to 25 units - ship within 30 days.
Quantities up to 30 units - ship within 60 days.
Quantities up to 40 units - ship within 90 days.
Quantities up to 50 units - ship within 100 days.

SUBMIT
BACK

SYSTEM FOR INTERATIVE, MULTIVARIATE NEGOTIATIONS OVER A NETWORK

BACKGROUND OF THE INVENTION

1. Technical Field

This invention relates generally to systems for conducting negotiations and more particularly to systems for creating sponsored communities over a network such as the Internet to enable iterative, multivariate negotiations.

2. Background

Business entities have tried for years to adapt computers and networks for use in sophisticated intercompany negotiations for commercial purchase and sales transactions, but with results that usually fall far short of expectations. Early mainframe computer attempts, for example, usually involved one corporation's allowing its existing suppliers and quantity buyers to connect to its internal private, proprietary network, using specially written locally developed application programs and private, proprietary network connections. These private systems were usually extremely costly to develop and maintain (often costing in the multi-millions of dollars) and very often did not meet all the needs and changing requirements of the participating businesses. Since many corporations had different internal networks and computer systems, considerable effort went into working around incompatibilities. Additionally, these systems had to be based on already existing, close relationships between buyers and sellers and usually were also based on previously negotiated agreements. Thus, the systems did not help in searching for information about new buyers and sellers, nor with the evaluation or negotiation processes, nor with the documenting of those processes from the beginning. They were not interactive, but typically batch processing systems, and usually accepted alphanumeric text only, not the inclusion of graphics or sound files. They usually addressed ongoing relationships previously worked out manually, for which extremely expensive custom systems were developed at buyers' or vendors sites.

Most business (and many other) negotiation processes are usually multivariate. That is, a business negotiation deals with many variable items, such as price, quantity, quality, shippers, insurance, warranty, schedules, returns and so on. The above solutions typically did not automate multivariate negotiations in any way, since they had to be built on agreements whose terms had all been previously negotiated With the advent of the Internet and the World Wide Web (Web), the exchange of information amongst companies was greatly enhanced, with the use of Web technologies. However, even with chat rooms, bulletin boards, and forum websites most of this data and information exchange is simply that—not a multivariate negotiations process nor an online, electronic commerce process.

While some of the Web devices, such as chat rooms and bulletin boards are interactive, each essentially allows two or more people to have conversations over the Internet, in the same way they might speak over the telephone or several might speak over an old-fashioned party line telephone. While the chat room or bulletin board may store these conversations, no other action takes place as a result of the process. Consequently, privacy and security questions aside, these are not effective devices to use to negotiate a number of variable terms, reach agreement on each and document the results. Just as telephone conversations about negotiations can be recorded on tape, but do not produce a contract document on paper, online chat or bulletin board discussions about negotiations cannot easily be used to make a contract on the network, even if they are archived.

Extranet Web technology has been developed to enable a corporation to "talk to" (but not negotiate multiple variables in iterative bargaining with) its suppliers and buyers over the Internet as though the other companies were part of the corporation's internal "intranet." This information exchange is done by using client/server technology, Web browsers, and hypertext technology used in the Internet, on an internal basis, as the first step towards creating intranets and then, through them, extranets.

In typical intranet client/server technology, one computer acts as a Web server computer to perform complex tasks, while other, smaller computers or terminals are "clients" that communicate with the Web server. In typical client/server intranets the client requests data and performance of tasks from the Web server computer. A Web server program runs on the Web server computer to provide Web server functions. The communications between these intranet clients and Web servers is in Hypertext, or HyperText Markup Language (HTML)—the "language" of the Internet's World Wide Web.

Usually, for intranets, at the Web server site, one or more people would create documents in hypertext format and make them available at the Web server. In many companies, employees have personal computers or terminals at their desks connected to the internal network. In an "intranet" these employees would use a Web browser on their terminals to see what hypertext documents are available at the internal corporate Web server site.

While this has been an advance for internal communications over a private network, it does not usually provide any interactive, iterative, multivariate negotiations capabilities and it requires personnel familiar with HyperText Markup Language (HTML) to create hypertext links in documents to create and maintain the "internal" Web pages. If a more interactive approach is desired, an Information Technology (IT) specialist in some form of scripting, such as CGI, or PERL is needed who can create forms documents and procedures to allow users to ask for information from the Web server. Again, this is custom programming at the user's site, and still does not provide multivariate negotiations or commerce capabilities.

Corporations that share information internally can also use workgroup software such as IBM's LOTUS NOTES™ software on the internal network. However, this, too, requires special programming and scripting for the unique needs of the organization, and normally does not address multivariate negotiations, even on an internal basis.

Since extranets simply extend a company's intranet to include selected other companies, the extranet concept usually does not provide any negotiations capabilities, either, much less electronic commerce capabilities.

To date, most attempts at adapting Internet technology to negotiations and commerce, even in small measure, have been focused on solving the problem from inside a corporation's systems going out and with the emphasis on the seller, not the buyer. Consequently, Intranet/Extranet options usually do not provide electronic commerce, only more sophisticated information distribution and sharing.

For corporations that sell at retail, one technique for selling goods over the Internet 04 is shown in FIG. 2b (Prior Art). This scheme uses the concept of a hosting "mall" 24 Website that enables buyers to browse through stores 28 (individual participating selling corporate Websites or aggregated catalog systems) and use a "shopping cart" 26 feature for selecting items to purchase. Participating sellers in a all 24 create their own Websites which list items for sale and prices. The mall usually provides the shopping cart technique for the buyer to use to select items to buy. Such Internet 04 sales techniques also use security systems for transmitting payments by credit card 30a and 30b or CYBERCASH™ payment methods (not shown). Most of these mall Website are significantly limited in the interaction, if any, they allow between buyers and sellers. A few allow limited price negotiations between buyers and sellers, but none allow iterative, multivariate negotiation and bargaining for both price and terms, such as availability, shipping, carrier, payment methods, risk of loss, etc.

Similarly, for non-retail business buyers and sellers, the mall concept above has limited value, since it usually does not connote much about the integrity or capability of the participating businesses, nor provide all of the various payment options a business might want to use. Most of the present Internet and World Wide Web systems for commerce are directed to consumer purchases of retail items in small quantities, not to business to business transactions or consumer transactions negotiating for goods and services in large quantities on national or international terms.

The companies that do provide more of a business to business focus over the Internet usually do so by offering special enterprise application server software 19s, as shown in FIG. 2a (Prior Art) for installation inside an enterprise's private corporate network. These programs fit into a category of software called front-office applications or application servers—so called because they sit close to the user end inside an enterprise and are customized to interface with the back-office applications 21 inside the enterprise, which include commercial products from software suppliers as well as custom developed applications that handle internal business functions such as inventory tracking, financials, human resources and supplies, and similar Enterprise Resource Planning (ERP) systems.

As seen in FIG. 2a (Prior Art), three separate corporations 16a, 16b and 16c are shown using the services of an enterprise commerce site provider 18. Each corporate site 16 has a firewall 16af, 16bf, and 16cf. Firewalls are a combination of hardware and software designed to prevent unwanted intrusion into a private corporate network by unauthorized personnel. A firewall usually puts a specially programmed computer system between its internal network and the Internet. It also prevents the company's internal computer users from gaining direct access to the Internet, since the access to the Internet provided by the firewall computer is usually indirect and performed by software programs known as proxy servers.

Note that, as shown in FIG. 2a (Prior Art), in a typical implementation of an enterprise commerce site provider 18, the enterprise commerce site provider 18 breaks through the firewalls 16af–16cf of each of its customers. Normally this is done in such a way as to provide secure access. Occasionally, if the commerce site provider 18 allows its customers to be linked for certain transactions over the Internet 04, over a common external link 10 to the Internet, internal security may be comprised, if the customer's firewall is configured incorrectly and the Internet transmission results in a breach.

Still in FIG. 2a (Prior Art), note that the typical enterprise commerce site provider 18 must have each customer 16 install the provider's application server software 19s, on an application server computer 19h inside the corporation's private network 14. Thus, in order to have access to the commerce site, corporation 16a would have an individual working at a desktop computer 08, for example, connect to the corporation's internal Web server computer(s) 20h over internal private network 14. The corporate employee thus accesses the enterprise commerce site provider 18 through his or her corporation's Web server computer 20h, running the enterprise commerce site provider 18's application server software 19s. From the Web server 20h, application server software 19s, possibly running on its own application server computer 19h communicates through the firewall 16af with enterprise commerce site provider 18, and ultimately, through that site to other corporate subscribers to the enterprise commerce site provider, 18 usually over a private leased network 11. The corporation's internal network 14 links the desktop computers 08 with not only the e internal a application server 19, but also to the internal corporate back-office internal computers 21.

Many, if not most, of the implementations of the enterprise commerce systems shown in FIG. 2B(Prior Art) may also require the corporation to install a special database application server 13h, to run special database application software 13s along with the application server software 19s. Thus, if the corporation already has a Web server computer 20, and the corresponding software 20s, it still has to purchase at least the application server software 19s, possibly an additional computer to act as the application server computer 19h, and possibly yet another combination of database server computer 13h and database server software 13s, in order to use the enterprise commerce provider 18's system.

Because application server products 19h and 19s, and possibly additional database server hardware and software as seen in FIG. 2a(Prior Art), have to be installed inside each participating corporation, customized to that corporation's internal back office systems 21, and backed by appropriate internal training support, it can cost in the several hundred thousands or millions of US dollars to purchase and install the systems and train internal people on their use. While a few of these applications connect buyers and sellers over the Internet, usually both the sellers and the buyers must also install and customize the application server software 19s inside their internal networks 14—another reason why these systems are so expensive, difficult to implement and costly to maintain. The traditional approach has been to design systems that will interface with the corporation's own internal computers and systems. Since these vary from one company to another, this is another reason why the application server software 19s can be costly, as extensive modifications to it may be necessary to interface with each customer corporation's own systems.

Payment options in an enterprise application server approach may be a little broader than those in a mall, in that they include not only credit cards (for those following the US banking systems) or CYBERCASH™ payments, but also procurement cards or specially agreed upon and custom programmed electronic authorization methods that allow a buyer to order items from a seller. However, for both enterprise application server and the mall Website approaches, payment processing, especially by credit card, is complicated.

In order to process a credit card transaction, a number of communications need to occur between selling Website and the bank/credit card processor. If the bank/credit card processor accepts "international" payments, any currency translations are done in separate steps, not online or in real time. That is, they are usually done on a special processing basis, rather than part of an online transaction, if they can be done at all in some countries. A general overview of the steps required for credit card handling is shown below:

| Enterprise server/mall Website | Bank/credit card processor |
|---|---|
| 1. transport the credit card information securely to processor or bank over a private network; | 2. verify the card is legitimate and the amount exists; send authorization to online merchant over the private network; |
| 3. post the item details back to the bank/credit card processor over, the private network; | 4. transport item details to card issuer for debit to the holder's account over private network |
| | 5. make necessary currency translation (usually offline) |
| | 6. credit the merchant account |
| | 7. deduct significant fees, usually a percentage or more per transaction from the merchant account; |
| | 8. archive details. |

Credit cards are issued to buyers relatively easily, but merchant identifiers (merchant ID's), which allow the merchant to accept and process the cards are not as easy to obtain, especially for online transactions, and online merchants are usually charged premium processing fees to authorize online processing and the handling of international transactions.

Procurement cards or other custom programmed electronic authorization methods that allow a buyer to order items from a seller are usually more expensive in that they usually require special negotiations and some custom programming. Any time custom programming is required, along with local installation and training at the corporation's site, costs go up significantly.

Because of this expense, enterprise application server systems, such as those provided by CONNECTINC.COM and TRADE'EX.COM are designed to work with existing relationships between buyers and sellers, in which the detailed terms have already been negotiated for ongoing purchases and to prevent "wild card purchasing" inside the organization. These are usually referred to as maintenance, repair and operations (MRO) or administrative purchasing. Generally, administrative purchasing only represents about 20% of a company's purchasing efforts. Within this administrative level of purchasing, procurement cards and specially constructed payment methods are used more for the low value transactions. More important MRO transactions are usually paid for by company checks or wire transfers. Most of a corporation's purchasing efforts, nearly 80% in many cases, are directed to production purchasing, which is usually not addressed by the above types of enterprise systems.

In marketing literature, for example, TRADE'EX states that its TRADE'EX procurement system is specifically designed to be an MRO system which "frees buyers to concentrate on more important tasks such as vendor selection and contract negotiation." That is, it does not handle production purchasing and negotiations.

Production purchasing is normally defined as the purchasing of components, subassemblies or parts that a company assembles and repackages into its own products. If a company manufactures automobiles, for example, production purchasing for it includes the purchasing done for all the components of its automobiles—tires, batteries, electrical systems, seats, engine parts, raw materials for frames, etc. For an auto manufacturer, MRO or administrative purchasing would handle such lower priority items as office supplies, office furniture, etc., or established longstanding items such as stock tires for automobiles for which all the terms had previously been negotiated without the benefit of automation.

Production purchasing includes the selection of new vendors, the evaluation of them and their products, conducting contract negotiations and so on. It is also of strategic importance to a business because it has a very direct impact on manufacturing and product costs, and sales prices. Thus, while the enterprise application server products do tend to reduce the internal transaction costs and time associated with MRO or administrative purchasing, they are usually affecting the smallest part of the purchasing effort, leaving the bulk of the endeavor, and often the most strategically important part to existing manual methods.

Credit cards are essentially ways to pay cash in advance for goods and services, and thus, would not be suitable for production purchasing either, where delivery, payment, and inspection schedules are usually negotiated to occur over time. Thus, in a production purchasing agreement, a buyer may only to agree to pay the seller in installments, after the seller has shipped a monthly quantity and the buyer has had a chance to inspect and accept them. Once the buyer has accepted a shipment, the seller would usually like the fastest payment possible. Even if credit card payments could be made after the fact, they are usually not handled online for international transactions.

In addition, obtaining real time card authorization for international transactions online is a major undertaking, because online card processing and bank to bank connectivity does not exist on the Internet in many countries. Also, transactions denominated in most non-G7 currencies are not likely to be processed in real time online because the international banking system is not capable of doing real time, online, Internet currency transactions. Consumers who travel and use credit cards to make payments in other countries, and other currencies, may think these transactions are being handled online, but they are not. Most of the currency exchange processing is done by the connecting banks offline, and most of it that is done electronically is done on private bank and interbank networks.

Many of the major credit card issuers also do not allow a merchant to use its merchant identifier (ID) to process transactions on behalf of related entities. This is a significant problem for mall operators, in particular. To add a new store to the mall, the mall Website operator must ask the store to get its own merchant ID, offline. It can take weeks to get a merchant ID, but without one, the seller in the mall cannot accept any online transactions at all.

For international processing there are other payment methods available, but these are usually done manually or offline. For example, wire transfers allow bank-to-bank payments for international transactions in any tradable currency. However, these are done over private bank networks and usually between companies which have already established a purchasing relationship—i.e. for MRO or administrative purchasing. Wire transfers are used more often in international trade than company checks, because the processing time for a wire transfer is faster than check processing and the fees charged by the banks are often lower. The participating banks usually handle the currency conversion as part of the process. Again, however, this usually requires some fairly sophisticated interbanking networks in the applicable countries.

Letters of credit (L/C) are another payment vehicle used for international transactions, once they have been negotiated. It usually takes 6 weeks or longer to negotiate one. Negotiations take so long because the issuing bank (the buyer's bank) assumes the total credit risk by agreeing absolutely to pay the seller so long as the transaction documents match the terms of the letter of credit itself. Most disputes about the payment of letters of credit have to do with discrepancies in the L/C terms, including such simple things as typographical errors. As seen in FIG. 2c (Prior Art) heretofore, letters of credit were negotiated primarily by telephone calls and facsimile exchanges between a buyer P1 and a bank P2 which can easily result in both substantive and typographical errors. Banks which process the letters of credit, often use a private network known as the SWIFT system, which provides 128 bit encryption for data sent between points on the SWIFT network. The United States Department of Commerce continues to regulate encryption controls required by US laws, and limits this full level of encryption to US and Canadian banks. Other systems are allowed to use 56 bit encryption outside the US and Canada.

Another form of payment often used by business for production purchasing is known as documentary collection. It is midway between a letter of credit and a wire transfer. With this method, the issuing bank does not assume the absolute credit risk and obligation to pay. It only agrees to assist the transaction as a sort of "honest broker." Consequently, the bank fees are lower. However, this method is normally used between parties that have already established a course of dealing, but want a structured payment vehicle processed through their respective banks.

Still another payment method often used in business transactions is the purchase order (PO) issued against a previously agreed upon master purchase agreement. Some of the MRO or administrative systems which go beyond credit card payments, enable a buyer and seller to use the terms of a previously negotiated master purchase agreement as a governing document for each purchase order issued. In this approach, a purchase order represents a buyer company's obligation to pay according to the master agreement, and the seller has to accept the risk that the buyer will actually pay the purchase order per the originally negotiated payment terms. As with letters of credit, this form of payment usually involves the transmission of facsimiles and telephone calls between the businesses—an error— prone process.

For purchase orders, as with letters of credit, and similar techniques, one of the difficulties for businesses is known as the "battle of the forms." If a buyer issues a purchase order, or ships goods against a letter of credit with different or additional terms stated or implied, in many jurisdictions it is not clear which contract terms will govern the transaction. Frequently forms get lost, or the exact order and dates of transmission and receipt are not known, or the contents are rendered unreadable by carbon copies or facsimile machines. There is usually no simple, reliable way to track all the steps involved in the transaction. Thus, transactions may be repudiated by buyers or sellers because the paperwork is incomplete or erroneous.

While some attempts have been made to address repudiation arising from terms sent fraudulently by other than the authorized buyer or seller, these attempts typically focus on obtaining some form of electronic signature or certificate of authenticity to avoid some of the difficulties. However these do not clear up unreadable terms or track down all the terms negotiation steps.

As mentioned above, some existing MRO systems provide MRO application server software at both the seller's and buyer's sites, which is installed and customized at those sites, to the internal systems used by each—the cost of such installation and customization is usually high.

In addition to the cost of the internal software installation and customization, enterprise MRO electronic commerce products usually do little or nothing to help a seller find new buyers (or the buyer find better, more cost efficient suppliers) or simplify the initial purchase and multivariate contract negotiation process. Most buyers want to be able to evaluate new suppliers readily. The negotiation of a major purchasing agreement with a new vendor for a new product may take anywhere from 6–12 months or more, if done manually. Since the existing enterprise application server products tend to focus on integrating with existing internal administrative/MRO corporate systems, very little, if anything is done by them to simplify the launching or negotiation of new buyer/seller relationships.

In many corporations, the selection of a new supplier for production purchases usually involves the creation of a team from purchasing, engineering, and manufacturing to evaluate all potential sellers. The team usually flies to potential vendor sites to evaluate capabilities and production facilities, obtain samples, and then return home to evaluate the samples.

For new product developments, the ability to evaluate actual samples as part of the buyer's new product may be critical to the buyer corporation's overall development strategy and product timetable, and thus, the bottom line. A mass storage device manufacturer that is developing a faster, cheaper, higher capacity disk drive, may need to find high capability read/write heads. Read/write heads with the characteristics needed by the mass storage device manufacturer may not be available from anyone on the market yet. However, the manufacturer probably knows several firms that make high quality read/write heads for existing devices. If these firms have new heads under development, they would usually be willing to provide evaluation samples to such a manufacturer. The manufacturer needs the samples to verify that the new disks it is building will work reliably and at full speed with the heads being developed by the other firm. If these tests can be performed and the results are good, the manufacturer knows it is likely to be able to meet a new product shipment date of x, with a price of y. If samples cannot be obtained and evaluated, the manufacturer's product development cycle may slip by months or years, thus costing potential millions in lost revenues and market shares.

Once a short list of vendors with acceptable samples has been qualified, the team would be represented by the purchasing buyer who negotiates with the different representatives from the vendor short list. When the buyer has selected a seller to buy from, it may still take 6 to 12 months or more to negotiate prices, sales terms, quantities, inspection and replacement terms, availability dates, shipping costs, carrier, risk of loss and insurance, payment options, etc. Most of these terms are critical for production purchasing. The cost of reaching agreement on all terms can come to thousands or tens of thousands of dollars worth of labor, travel, and other expenses normally associated with the typical production purchase negotiation, in addition to the delays caused to the buyer's development and production cycles.

As another example, if an automobile manufacturer plans to build x thousand new cars and trucks each month on its production line, it needs to be sure that the firm(s) from which it purchases the new types of batteries needed for new models can deliver the required quantity each month, on time, with excellent quality and reasonable prices. The auto maker could lose millions in sales if its assembly line is stopped because of part shortages. Thus, while price is important in production purchase negotiations, it is only one small part of an overall set of purchase term variables that are strategically important to the auto maker and its cost of goods sold. If the seller uses unreliable shippers and carriers or does not know how to import or export its goods to the manufacturer's assembly plants, the best price on the market will be worth very little to a manufacturer which has to halt production because of missed schedules, shipments, or quantities.

Obtaining samples from vendors known to the production buyer is significant in itself, as seen above. However, in today's international trade, the overwhelming majority of potential buyers and sellers are not aware of each other's existence. Yet international trade is increasing by double digit numbers each year, so an obvious need exists for more capability. Many countries are taking advantage of the "leapfrog" effect by using the Internet and the latest in information technology (IT) to build instant infrastructures for competing in international commerce. Some countries and trade regions have set up inspection services for potential outside buyers, so that a buyer can obtain an independent assessment of a particular vendor's production facilities from such services. This saves some time and travel expense. However, it still does not provide a buying team with samples for evaluation. With current Internet commerce systems there is no effective way to order such samples. By the time terms and conditions for a sample order have been negotiated manually at such distances, the samples are not likely to be relevant any longer to the buyer company's development goals.

At the same time, most sellers of such products may need time to ramp up their production (especially for new or improved products) in order to meet quantity terms and dates, and they may need to incur additional costs if they have to change shippers to meet the buyer's needs. A seller does not want to have its goods rejected arbitrarily as defective if this is not the case. So inspection, return and refund policies need to be negotiated. All of these terms are usually variable and may frequently interrelate. If a seller's shipping costs go up—so might its prices. If a buyer is unable to meet its quantity goals because too many of the seller's goods are defective, the buyer's internal costs go up, and the buyer may have to buy from another source.

Production purchasing negotiations such as these are usually done by telephone, on-site visits, faxes and other non-automated means of conducting a negotiation today. This work is labor intensive, and if travel is involved, expenses climb. If the transaction is an international one between two countries with different currencies, customs, and trade practices, it can take even longer and cost more to conduct the negotiations.

In today's global markets, while international sourcing is becoming more and more important, it is expensive for a buyer team to travel to sites in another country to evaluate them, buy samples for engineering evaluation at home, and to conduct the negotiation through occasional visits between buyer and seller. While most use facsimile machines or computer fax modems to submit drafts of agreements back and forth, face to face negotiations may be needed more frequently for international negotiations, because business practices in the two countries may differ significantly and errors or misreadings caused by poor fax reproductions may further complicate the process.

In other words, application server approaches do not offer any real solutions to the production purchasing, non-retail, problems.

Returning now for a moment to FIG. 2b (Prior Art), as mentioned above, Websites such as retail malls 24 or standalone Websites are used by some corporations which sell at retail. While many tools exist to allow companies to design Websites, there are not as many that allow a company to design one for automatic integration into a Website in a mall or with online catalogs. Since most companies want to maintain control over the appearance of their corporate and brand names, those mall or catalog sites that do provide Web tools for their business subscribers, usually do not provide complete common interfaces or templates for the companies to use, nor do they integrate the sites with multiple features and services. Instead, they usually only provide access to a shopping cart 26 feature and a secure credit card 30 payment feature with a catalog product and price list that is searchable. Some may also provide manual help to the seller in listing its Website in relevant search engines used on the Internet. Normally, however, it is the seller's responsibility to do so. In either case, the registration with search engines is usually done manually. Some may also require the seller to arrange for payment processing separately, offline. As mentioned before, obtaining a merchant ID can take weeks, thus limiting what the seller can do online until then.

Presently, on the Internet, search engines such as Compaq Corporation's ALTAVISTA™, Yahoo corporation's YAHOO™ and so on, have different schedules or accepting and adding new sites to their search lists. It can take anywhere from 4–8 weeks or more for a site to be registered with each search engine. Many Internet search engines also add entries to their lists by "spidering" around the Internet to gather all Website addresses. Depending on the search engine, spidering may take much longer or not be as complete as a user requested registration. For example, ALTAVISTA's Website states:

> The Altavista search engine starts by spidering your entire site with its spider Scooter. Scooter may take up to three months to spider and index your entire site. It normally spiders about 2 pages per site in any week. . . Best bet is to submit your pages manually at the rate of no more than 30 per week.

As can be seen, the costs to a seller to establish a Website can be significant both in time and money. IDC Corporation reported in 1997 that the average cost of creating a fully enabled domestic US business to business electronic commerce standalone, single, retail Website for a large Fortune 1000 business was approximately $600,000.00 (Six Hundred Thousand USD.)

BUSINESS MARKETING MAGAZINE™, published by ADVERTISING AGE™, reported in 1998 that median prices for creating a single Website averaged as follows:

| Company/Website Size | Average Cost |
| --- | --- |
| Small | $44,500 |
| Medium | $99,750 |
| Large | $302,975 |

To add electronic commerce to the site, costs averaged as follows:

| Company/Website Size | Average Cost |
| --- | --- |
| Small | $25,000 (online ordering by fax but no transaction or payment processing) |
| Medium | $33,000 (online ordering with credit card processing) |

-continued

| Company/Website Size | Average Cost |
|---|---|
| Large | $78,000 (database searches, online ordering, credit card processing) |

Creating a single Website can take anywhere from 1–8 weeks to 6–8 months or more. Creating one that is able to handle simple electronic commerce transactions may take even longer as merchant accounts for credit cards need to be obtained, integrating CYBERCASH™ or similar realtime payment methods must be provided for, search engine registrations need to be requested and so on.

As noted above, generally accepted electronic methodologies for handling international commerce online other than on a simple credit card or CYBERCASH™ payment basis for retail sales do not exist. Many countries do not have bank procedures in place to accept international credit card transactions in real time. In such countries, trying to adjust the current banking systems may well be impossible and completely new systems would be needed.

Thus, most existing electronic commerce sites are designed to work with existing proprietary banking networks such as the United States VISA™ and MC MASTERCARD™ real-time card authorization and processing interbanking systems. As noted above, these are known as SWIFT-compatible private networks which use 128 key encryption for security. This often limits a buyer or seller's market potential unnecessarily. Since many countries do not have banking systems comparable to the SWIFT interbanking system, payments in such countries may only be made by manually negotiated letters of credit and so on. It can take from 4–6 weeks simply to negotiate the terms of a letter of credit, when using the same manual techniques of phone calls and fax machines. In a global economy, when manufacturers in one country may want to source parts and components from the Pacific rim, sell them in the United States, Europe or South America, or Pacific Rim, a system that does not address the complexities of international purchasing is very limiting.

Similarly, the companies that provide Web hosting for a mall 24 on the Internet as shown in FIG. 2b (Prior Art) usually address only retail sales of consumer articles, with little or no control over the individual businesses that subscribe as sellers or the consumers who browse as buyers. In many business transactions, buyers want to know that the sellers meet some minimum standards and requirements and sellers want to know that fraudulent or inappropriate requests will not be tolerated.

Most World Wide Web mall or commerce sites do not offer this kind of site integrity for their business transactions, since most of them are directed primarily to retail sales in which a consumer can usually rely on consumer protection laws and some credit card "insurance" practices, for protection from the unscrupulous.

The few enterprise electronic commerce providers that go beyond the mall concept do so with the addition of a governor or administrator feature which coordinates with the enterprise application servers. The governor sets up and administers the rules for the site and can act as a broker. This usually entails a customized, specially programmed matching of participating companies' computer systems to coordinate authorization and payment approval so orders flow between firms. However, this technology can cost millions and it can take as much as two years to program the computers and set up the necessary processes and equipment at all the participating company sites. Most of the components for doing this are sold by major computer hardware and software vendors who also sell application server software, hardware, and consulting services to install the "front-end" application server at the participating business's site. Thus, while the Internet may be used to connect the companies participating, most of the work is done by the application server software installed on private, proprietary networks at the various company sites, and the Internet serves as a simple external telecommunications link.

An other complication of some of the seller—centric and enterprise application server products designed for commerce is that they may only work with certain forms of electronic data interchange (EDI) technology, which is 7 to 10 times more costly to use than other methods. Existing EDI technologies use private networks and charge per c all and by the bit of information transmitted. Depending on the approach used attempting to change such systems to use other forms of data interchange can be very costly, because of the number of installed software application servers at the participating company sites which must b e radically changed. Because of the expense associated with most EDI technologies, only about 2% of companies worldwide attempting to do business over a network use them.

Existing business to business enterprise application software servers tend to have more of a sellers' focus, and, as mentioned above, they tend not to focus on a buyer's need for finding and evaluating new sellers, nor for negotiating and bargaining with the new suppliers. Similarly, most of the mall Websites which focus on retail sales are seller-centric. That is, they focus on letting a seller list its wares and prices, and decide how much to disclose about itself and its products and only allow the buyer to select from listed items and prices. Little or no seller marketing, product, terms or service evaluation information is available to the buyer. As mentioned before, a buyer on a mall Website is usually not permitted to negotiate anything, simply to select from prices and payment options provided by the seller. Buyers using the enterprise application server software products cannot use them to negotiate new production purchases, but simply to process maintenance, repair or operation (MRO) orders against existing, already negotiated agreements.

Even with the seller-centric focus, most companies that provide a mall or enterprise application server business to business site offering, do not help with the marketing or promotion of the participating sellers' brands. Thus, the value of these services for the participants are often limited by the power of each company's individual brand. If the seller participants have products that are not well-recognized by brand name, an electronic commerce mall or business to business enterprise application server software service usually does not provide much added visibility or market reach. A few sites have attempted to address this by organizing along vertical market segments, such as malls devoted to the steel industry, but this alone does not provide that much additional visibility, primarily because it does not address some of the basic needs a buyer has for multivariate negotiations.

The production purchasing buyer needs to be able to collect information about sellers, and it would help to know that some entity has screened them and monitors them for adherence to some known set of standards and reputability. Additionally, production buyers today usually have to travel to a seller's physical location to get sample products. If the buyer is in the US and the seller is in Malaysia, this might costs thousands of dollars in airfares and travel expenses, just to get samples. Most existing products and services do not help with these tasks. As noted above, samples of newly engineered component parts may be critical for the buyer company's completion of its product. New systems being built by a computer maker may need power supplies or heat dissipation systems that are also new and unproven. The engineers developing the new computer systems need to be able to test their prototypes with sample, new component parts to know the whole system will work. None of the existing methods of buying over the Internet address this kind of need. Most systems are not designed from the buyer's viewpoint.

One system does attempt to address a few things from a buyer's viewpoint. This is the Priceline.com system which is described in U.S. Pat. No. 5,794,207 Method and Apparatus for a Cryptographically Assisted commercial Network System Designed to Facilitate Buyer-driven Conditional Purchase Offers, issued Aug. 11, 1998, to Walker et al., assigned to Walker Asset Management Limited. This is essentially an online bidding process in which a buyer specifies the price it desires to pay for an object, such as an airplane reservation or a car. The bid is submitted over the Internet to a central site which analyzes a database of sellers of that type of item to find one or more selling the object at close to the bid price. These matches or near-matches are presented to the buyer, who can then select from them and place a conditional purchase offer. If the seller accepts, the sale is made. A buyer can initiate another round of bidding if there is no good result from the initial one. While this system has benefits for certain types of purchases, usually of completed, commodity items, it does not address the needs of production buyers outlined above. It does not provide iterative bargaining between the buyer and seller on all aspects of a multivariate transaction, nor does it connote much, if anything about the participating sellers. It is similar to other auction sites on the World Wide Web which allow you to submit bids to a seller or auctioneer, but do not provide the opportunity to bargain interactively with the seller on all the terms. A bid submission process is quite different from a price and terms negotiation process. Bid submission systems are usually designed to assist a seller in disposing of excess inventory. Hence, some malls and enterprise server applications provide limited electronic commerce, but none provide true multivariate negotiation ability.

Finally, both the mall concept and the enterprise server concepts use databases for storing and indexing product and price lists and catalogs, along with final orders.

However, since very little is offered in the way of iterative bargaining, other than a simple order/confirmation process, little or nothing is known, and consequently stored about the negotiation process on a step by step basis. Again, any information that is collected is likely to be of interest primarily to the seller, not the buyer, since most of the systems in existence are focused on the seller.

It is an object of this invention to provide a system for iterative bargaining and purchasing over a network which enables buyers and sellers to negotiate prices, terms, and conditions iteratively until an agreement is reached on all points.

It is another object of this invention to provide an iterative bargaining and purchasing system that is economical to use.

Still another object of this invention is providing an iterative bargaining and purchasing system that enables the creation of knowledgeable communities of commerce.

Yet another object of this invention is providing a means for storing, archiving and accessing all transactions and documents as they are formed over the system.

SUMMARY OF THE INVENTION

These and other objects are achieved by a multivariate negotiations engine for iterative bargaining which: enables a sponsor to create and administer a community between participants such as buyers and sellers having similar interests; allows a buyer/participant to search and evaluate seller information, propose and negotiate orders and counteroffers that include all desired terms, request sample quantities, and track activity; allows a seller/participant to use remote authoring templates to create a complete Website for immediate integration and activation in the community, to evaluate proposed buyer orders and counteroffers, and to negotiate multiple variables such as prices, terms, conditions etc., iteratively with a buyer. The system provides secure databases, search engines, and other tools for use by the sponsor, which enable the sponsor to define the terms of community participation, establish standards, help promote the visibility of participating companies, monitor activity, collect fees, and promote successes. All this is done through a multivariate negotiations engine system operated at the system provider's Internet site, thus requiring no additional software at the sponsors', or participant sellers', or buyer's sites. This also allows buyers and sellers to use and negotiate payment options and methods that are accepted internationally. The system maintains internal databases that contain the history of all transactions in each community, so that sponsors, buyers and sellers may retrieve appropriate records to document each stage of interaction and negotiation. Documents are created by the system during the negotiation process.

It is an aspect of the present invention that it provides comprehensive iterative bargaining abilities for both buyers and sellers that enable them to negotiate all the terms and conditions of a transaction—not just the price.

It is another aspect of the present invention that, in a preferred embodiment, the negotiations engine uses software that is installed at the commerce system provider's site, thus eliminating the need for installation of any application server hardware, application server software, database server hardware or database server software at the buyer's, the seller's, or the sponsor's site.

Still another aspect of the present invention is that, in a preferred embodiment, all demographic, payment and negotiation information is transmitted using secure sockets over an open architecture network such as the Internet's Terminal Control Protocol-Internet Protocol (TCP-IP) network, thus eliminating the need for more expensive private leased lines or proprietary networks for the iterative bargaining between buyers and sellers amongst themselves or for communications with the sponsor.

Yet another aspect of the present invention is that the data collected about all transactions is kept in databases in a secure location inside an internet protocol (IP) firewall at the commerce provider's site, thus eliminating the need for additional, expensive database server hardware and database server software and firewall hardware and software at buyer and seller and sponsor sites.

Still another aspect of the present invention is that the costs for buyers, sellers and sponsors are greatly reduced by orders of magnitude over existing systems which cost much more and offer much less functionality.

Yet another aspect of the present invention is that complete histories of each stage of the negotiation processes are available for tracking and analysis which promotes non-repudiation of negotiated terms.

Still another aspect of the present invention is that it provides handling for international transaction and payment processing online.

Another aspect of the present invention is that remote authoring templates are integrated with the search and negotiations engines so that a seller in a community can create a Website incorporating its corporate logos and descriptions, while the system automatically integrates products, and other items with the community's promotional and other activities so that the seller can go online immediately.

Still another aspect of the present invention is that sponsors can perform many more functions, such as establishing standards, basic contract terms for the community (if desired), removing non-compliant participants, changing the structure of the seller and buyer databases, and so on than existing systems allow any administrator to perform.

Another aspect of the present invention is that it enables buyers to immediately purchase sample quantities of goods for evaluation purposes without the need to travel to the seller's location or to place telephone or fax orders.

Yet another aspect of the present invention is that while all transaction data is stored in a secure database at the negotiations engine system's site, the system provides multiple levels of privacy and access for each individual company, so that the records of transactions between a given buyer and seller are available only on a protected basis at appropriate levels of authorization for the buyer, the seller and the sponsor.

Another aspect of the invention is that databases are integrated with the complete electronic system, providing simplification in the capture and speed of transactions and other functions of the system.

Yet another aspect of the present invention is that it allows a seller to specify and manage the terms of trade it wants applied to its sales, such as using the full range of Incoterms or other established trade terms.

BRIEF DESCRIPTIONS OF THE DRAWINGS

FIG. 5b is a block diagram of a database entry of the present invention.

FIGS. 10-1 through 10-3 are schematic diagrams of interactive Web authoring screens of the present invention.

FIG. 11a-1 through 11a-3 show a completed letter of credit negotiated using the present invention.

FIG. 11b is a sample email notification of the present invention.

FIG. 12 is a block diagram of a seller's administrative database of the present invention.

FIG. 13 is an illustrative block diagram of a database entry for a community sponsor, showing status of a negotiation.

FIG. 14 is a block diagram of another sponsor administrative area of the present invention.

Figure 15A:
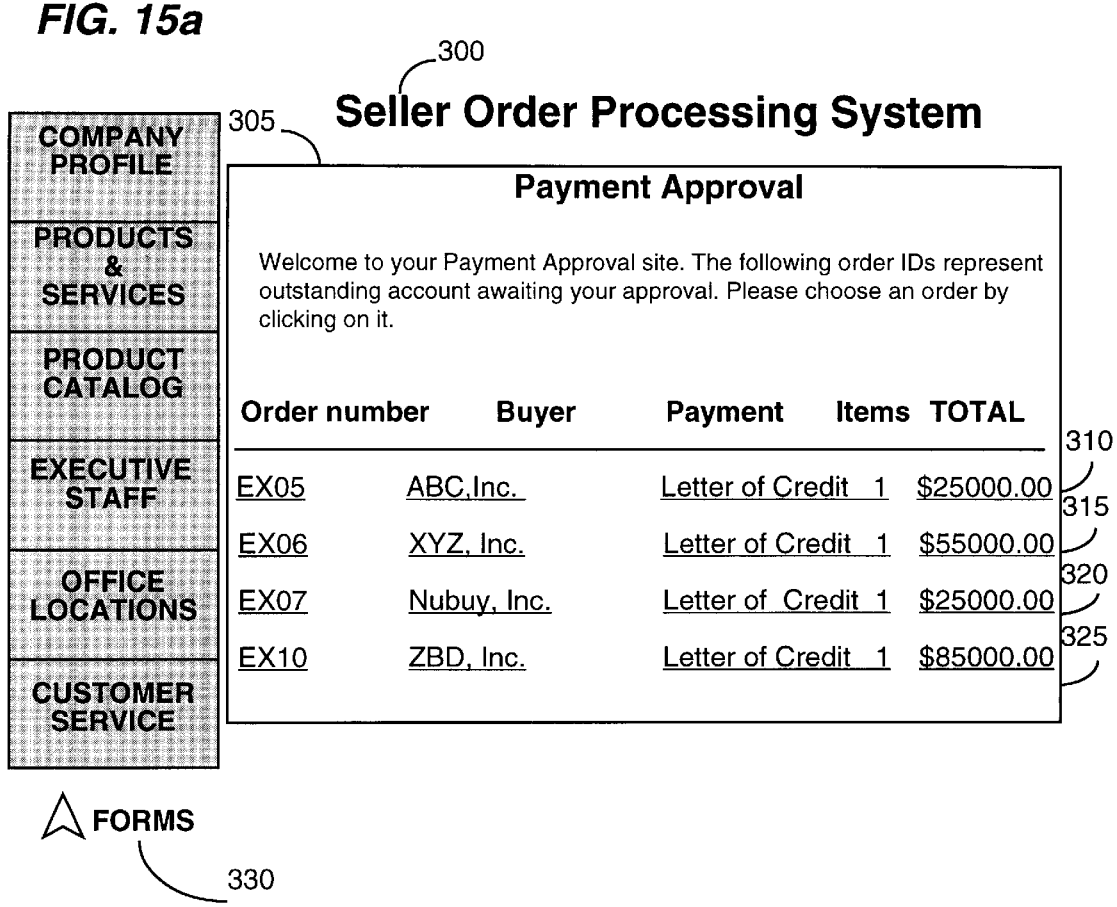

FIG. 15 a is a block diagram of part of a seller's order processing using the present invention.

FIG. 15b is a block diagram illustrating a buyer's proposed terms using the present invention.

Figure 3:
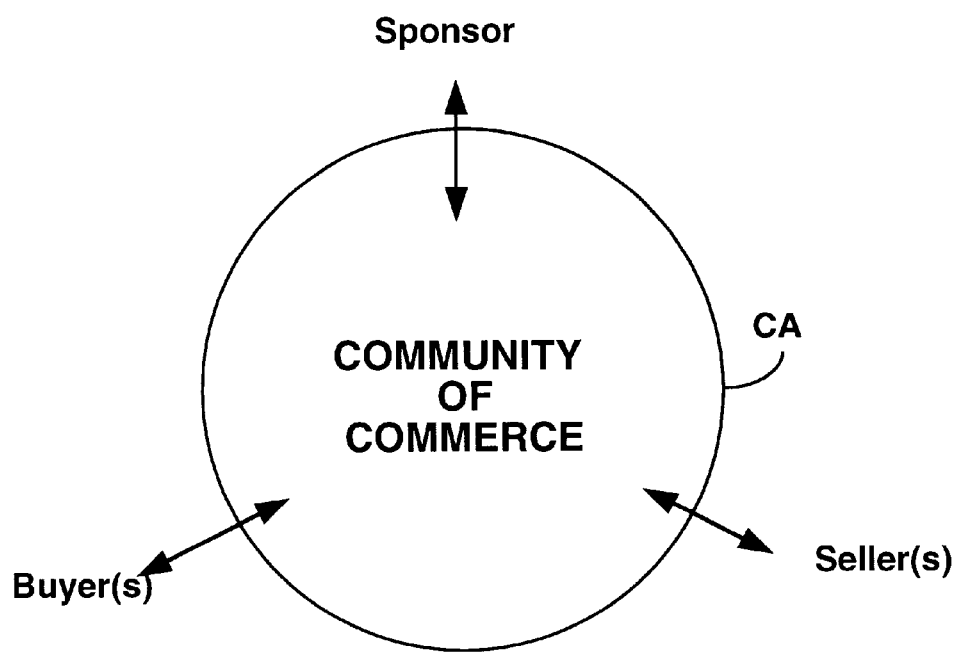
FIG. 3 is block diagram of a type of community enabled by the present invention.

FIGS. 15c-1 through 15c-3 are block diagrams showing a proposed letter of credit using the present invention.

Figure 16:
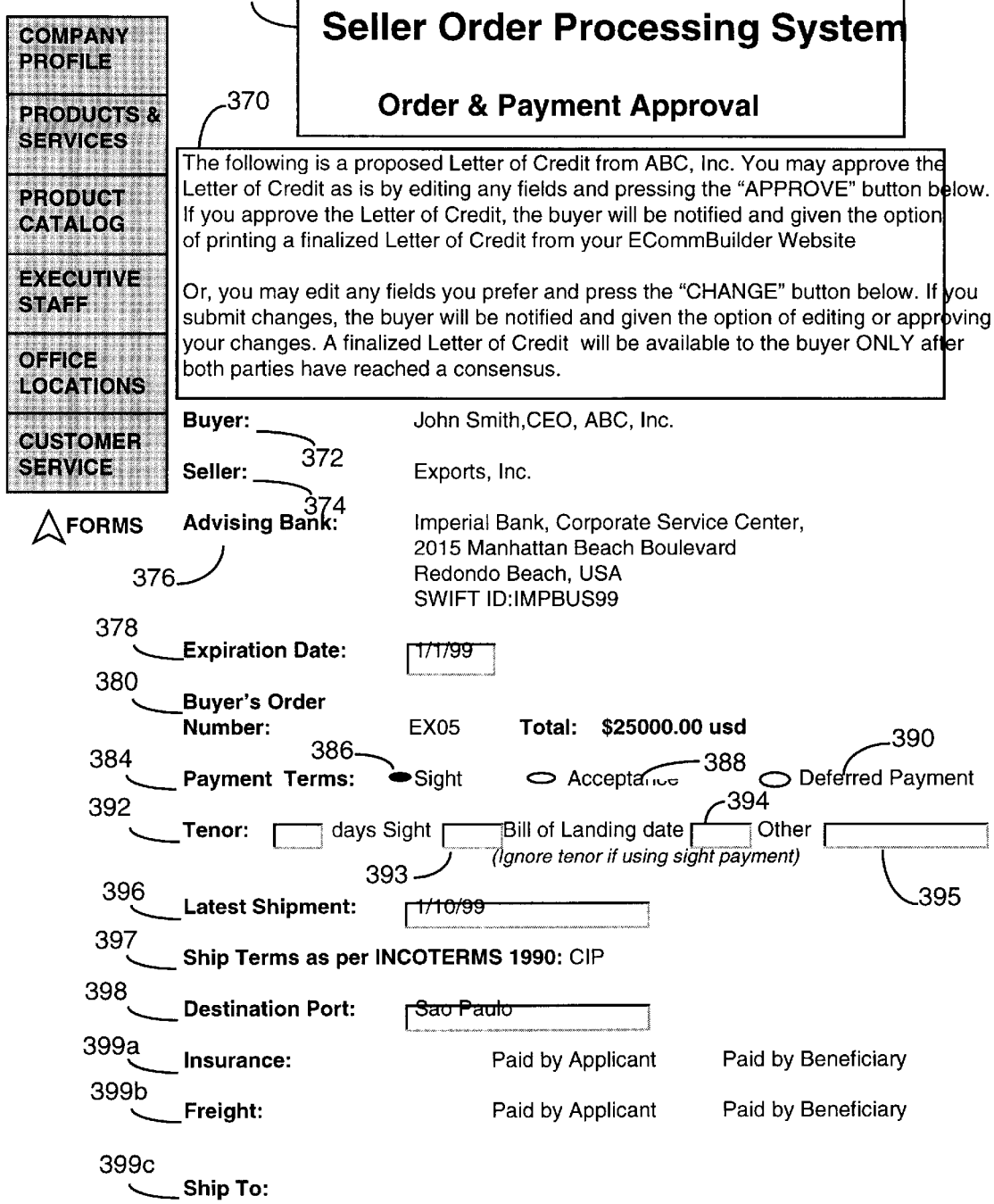

FIG. 16 is a block diagram of a seller's view of a proposed order with payment by letter of credit using the present invention.

FIG. 17 is a block diagram illustrating seller's order processing using the present invention.

FIGS. 18–23 are illustrative e-mail notifications of the present invention.

FIG. 24 is a block diagram of an illustrative set of community rules using the present invention.

Figure 25:
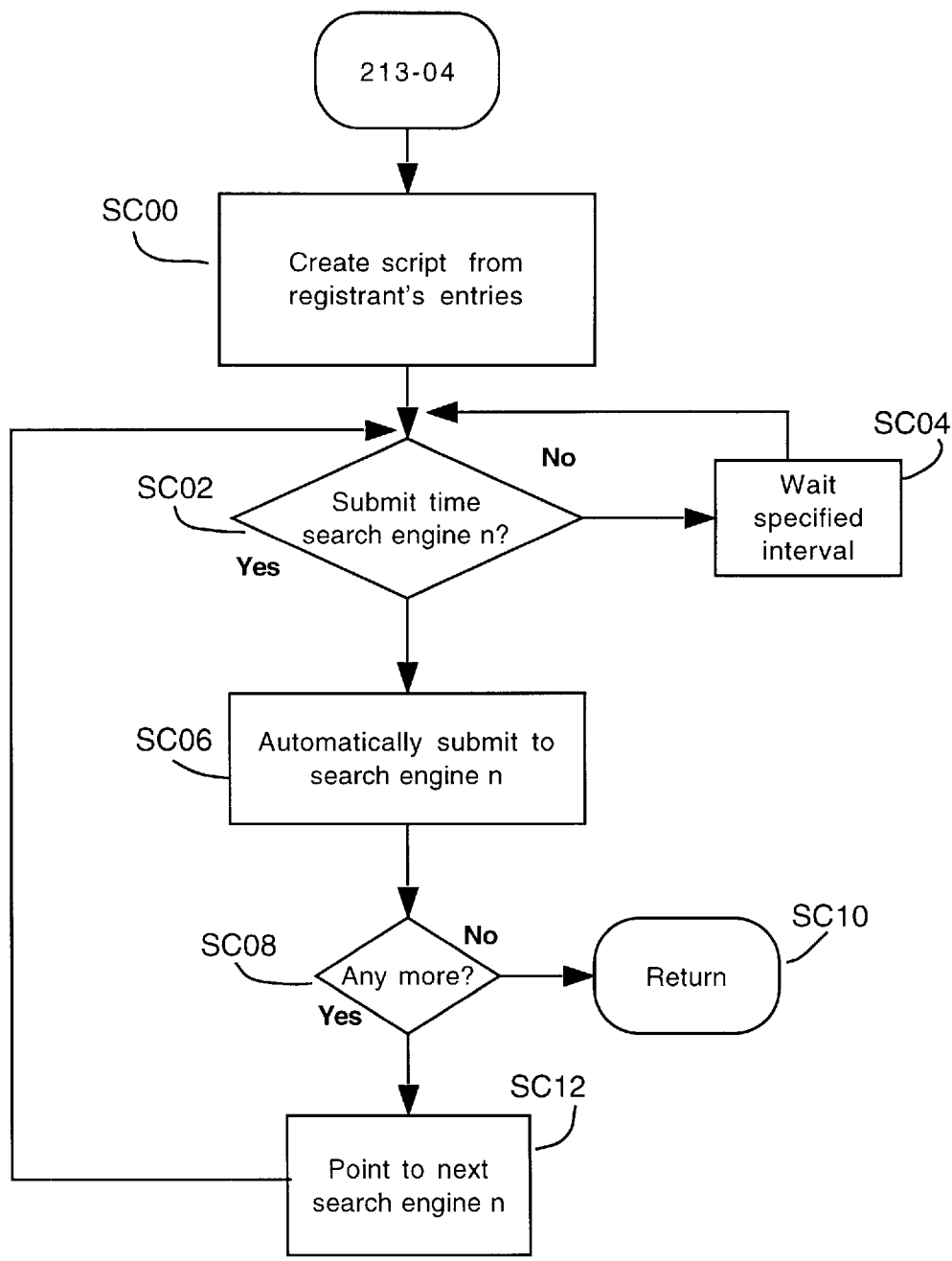

FIG. 25 is a flow diagram of the present invention's automation of search engine submissions.

Figure 26:
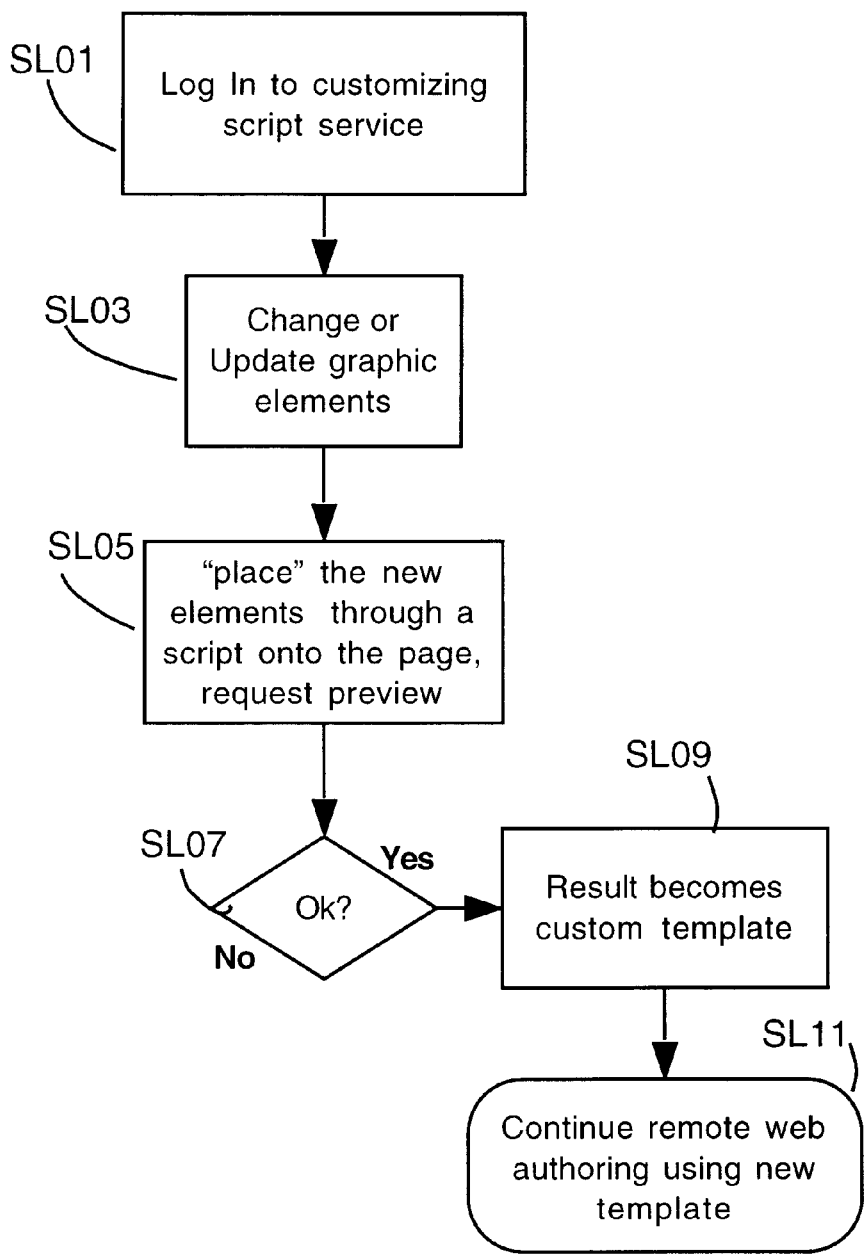

FIG. 26 is a flow diagram of a customizable language process for remote web authoring of the present invention.

Figure 27:
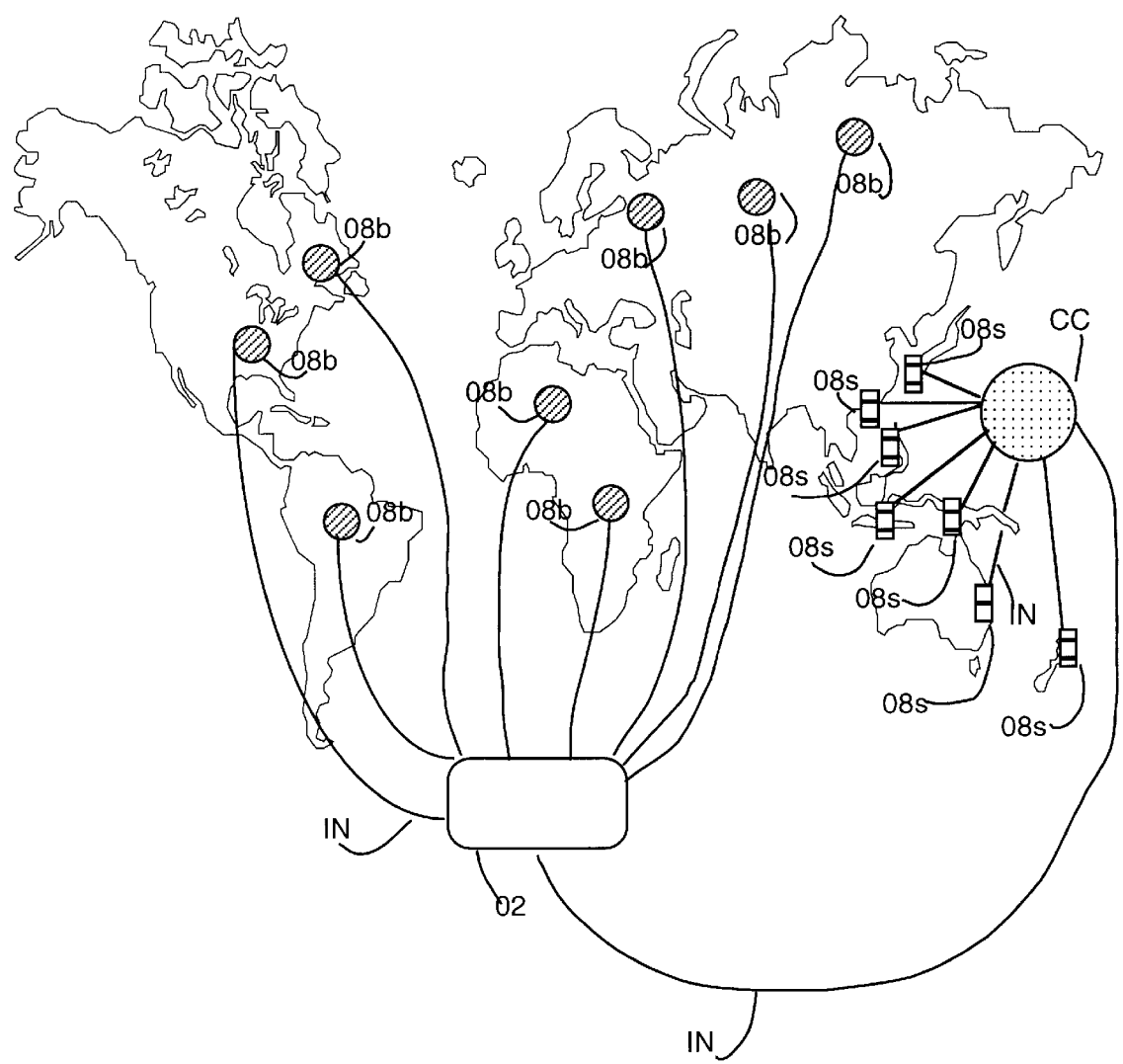

FIG. 27 is a block diagram illustrating International transaction processing using the present invention.

FIG. 28 is a block diagram showing records archived by the present invention.

Figure 29:
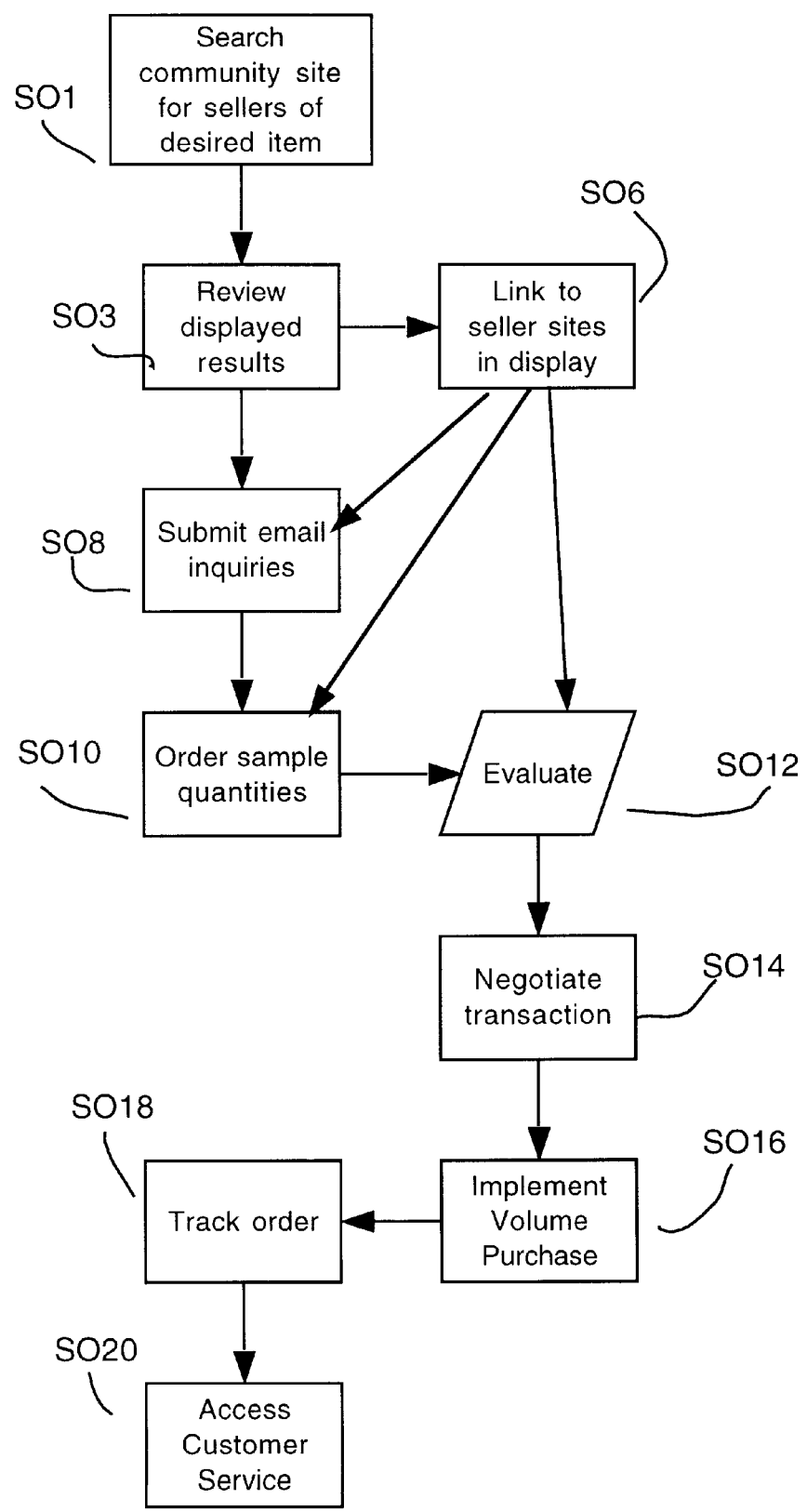

FIG. 29 is a flow diagram of sample quantity ordering using the present invention.

Figure 30:
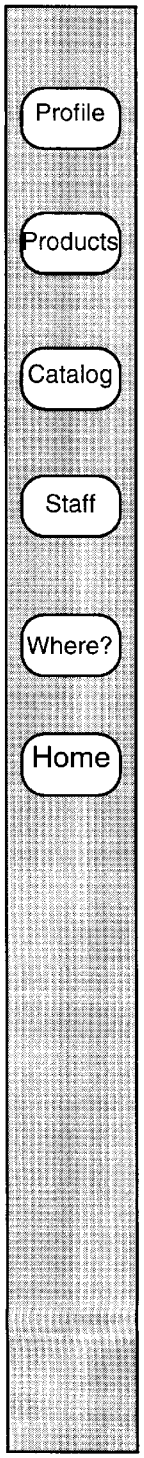
Figure 31A:
Figure 31D:

FIG. 30 is a block diagram showing a wire transfer negotiated according to the method and apparatus of the present invention.

FIGS. 31a through 31d are block diagrams of remotely authored Web pages created using the present invention.

FIG. 32 is a block diagram showing sample quantity ordering with the present invention.

DETAILED DESCRIPTION OF THE INVENTION

Overview

Figure 1A:
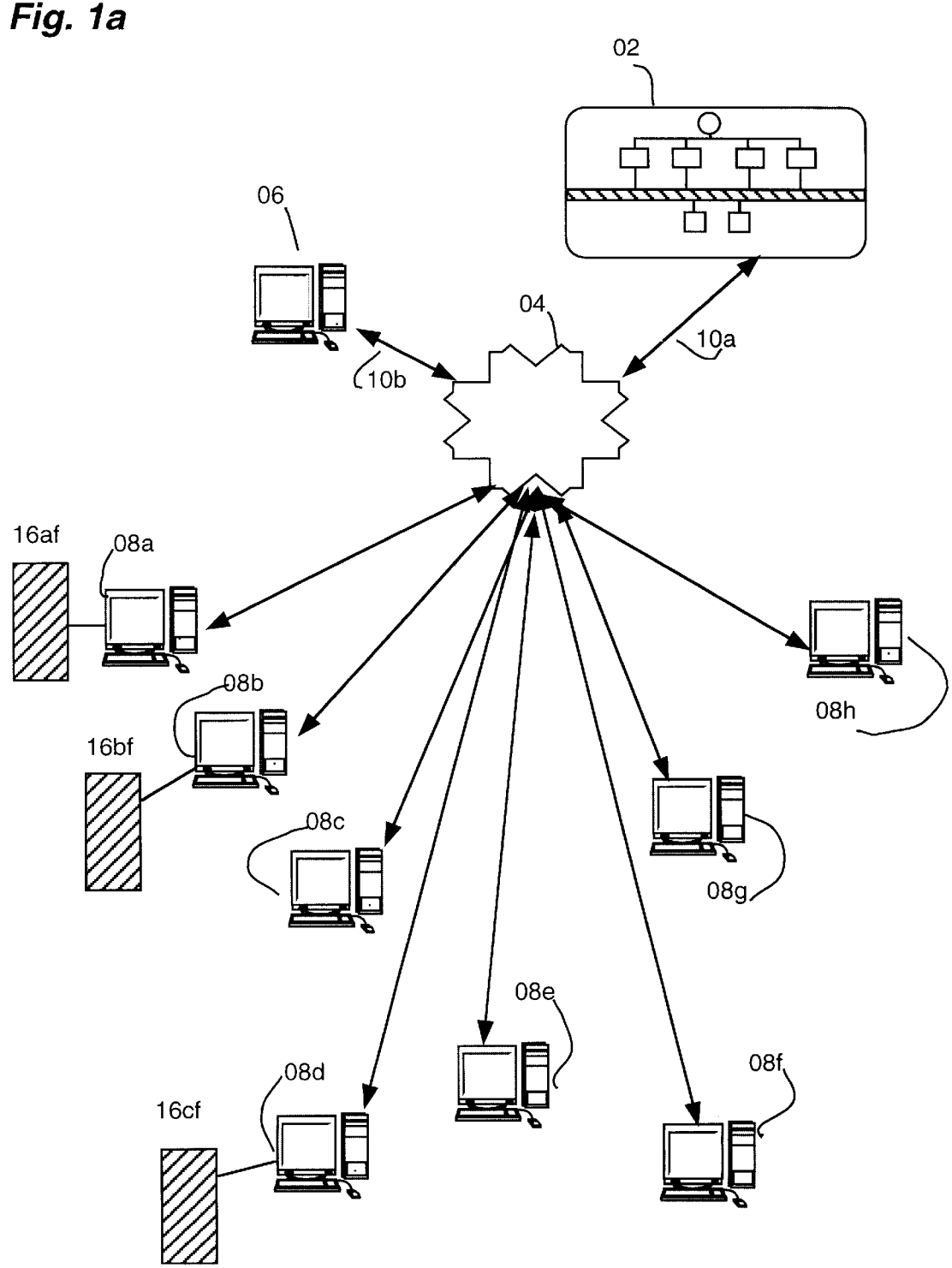
FIG. 1a is a block diagram of the present invention showing its use by one sponsored commerce community.

In FIG. 1a, a block diagram of the present invention shows a multivariate negotiations engine system 02 communicating over telecommunications link 10a to the Internet 04. A community sponsor 06 is shown also communicating over a telecommunications link 10b to the Internet 04. Participants 08 in this community are shown at 08a–08h. For commercial implementations each participant is either a buyer or a seller (or in some cases, both) in the community. Participants 08 connect to community sponsor 06, through the Internet 04 and multivariate negotiations engine system 02. Multivariate negotiations engine system 02 contains all the software needed to create sponsored communities, communicate with sponsors, and with all participants and store the results. Each sponsor or participant only needs a standard Internet browser such as those commonly available from Netscape Corporation or Microsoft Corporation, among others, and a commonly available desktop computer or other terminal, workstation, or computer to activate the browser over any commonly available link to the Internet. Typically, these browsers are distributed free of charge by their suppliers.

Multivariate negotiations engine system 02 can be used for other types of sponsored communities where interactive, iterative negotiations of a number of interrelated, variable items amongst the participants over the Internet is desired.

For example, manufacturers in the computer industry might want to agree on a set of multi-part, multi-tiered industry standards for a new computer bus. A computer industry association or a standards association might be the community sponsor, and the computer and peripheral manufacturers might be the participants who need to iteratively negotiate with each other and/or the standards body to agree upon the standards. The sponsoring standards body establishes the community, proposes initial standards, sets the rules for negotiations, encourages and monitors negotiations, and concludes with a finally agreed upon set of standards, with each step of each negotiation that occurred along the way archived. Since no additional hardware or software needs to be installed at the sponsor's site or at those of any of the participants, the present invention provides a much more economical and speedy way to negotiate complex, multivariate items such as complex standards specifications.

Additionally, while one form of sponsored community addresses corporate buyers and sellers engaged in production purchasing, other commerce communities could be implemented. For example, stock or commodity trading over the Internet might be conducted using the present invention. A sponsor, such as a traditional stock exchange or a newer type of securities body could establish the standards for accepting stockbrokers into the community. Such standards might include compliance with applicable securities regulations and so on. The sponsor can monitor and regulate actual iterative multivariate negotiations such as options, puts, calls, at the market or not at the market, etc., for buying and selling of commodities or securities electronically over the Internet. Or a trade show organizer might sponsor a community for allocating and iteratively negotiating accommodations, placement, footage, signage, facilities, etc., amongst vendors and suppliers at the show site.

Participants in a community can also ask the sponsor to appoint a moderator for their negotiations, if stumbling blocks arise. The moderator can monitor the negotiations and suggest next steps at any time in the process to one or several of the participants.

Many other types of communities can be created with the present invention. For example, governmental agencies might sponsor trade commerce communities for regional trade development efforts. International organizations might sponsor a community to assist countries in negotiating complex treaties.

Figure 1B:
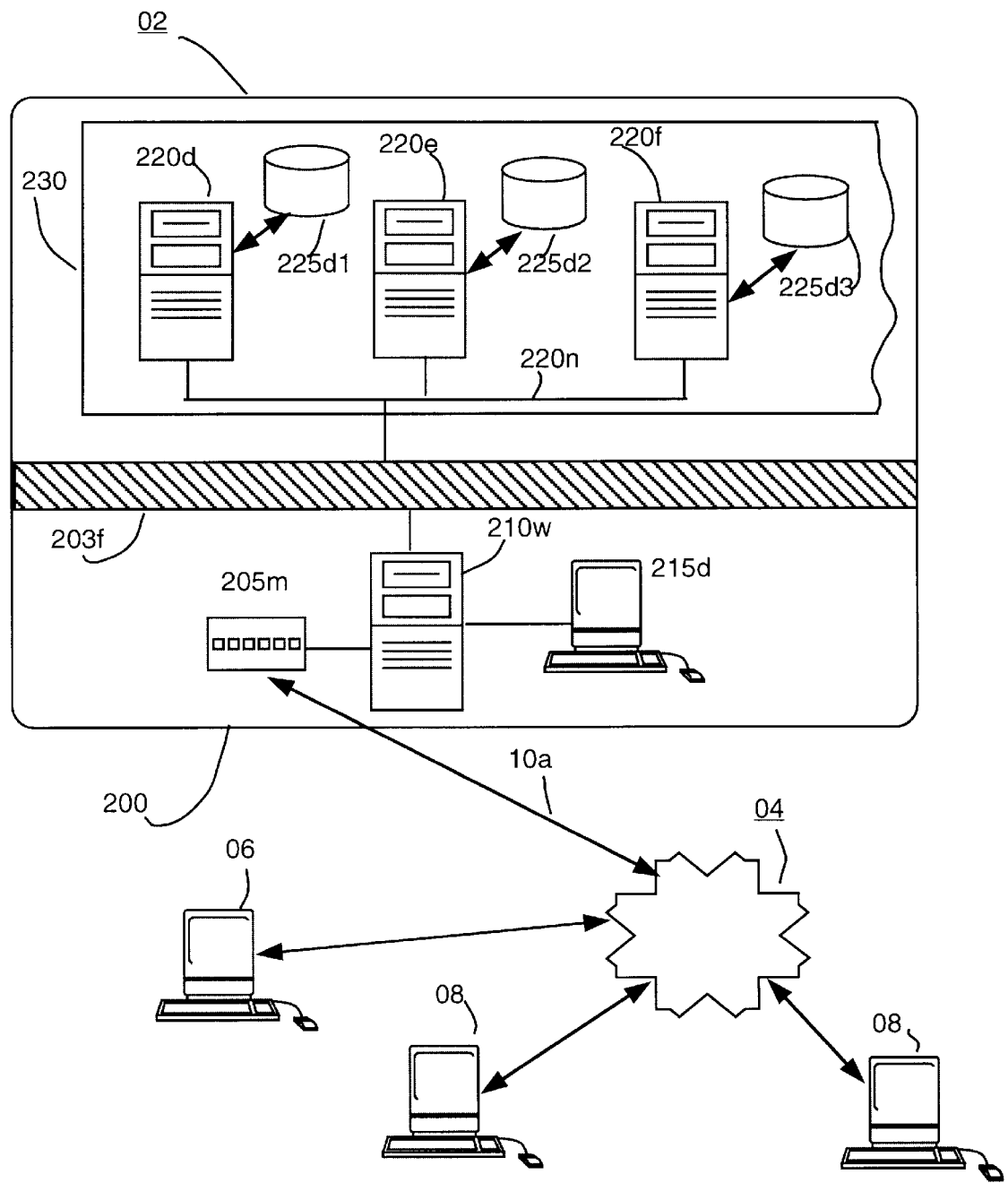
FIG. 1b is a block diagram of a configuration of the present invention.

Commonly available video conferencing and other multimedia techniques can be added to multivariate negotiations engine system 02. For these embodiments, it is possible that both sponsors and participants would have to add hardware or software for the multi-media features at their sites, if such features are not already present. FIG. 1h illustrates the use of commonly available videoconferencing equipment such as a camera positioned at the top of a monitor connected to a simple desktop computer. With existing videoconferencing products, an image I1 of a participant at another site is displayed on the monitor at the same time the Web browser interface W1 to multivariate negotiations engine system 02 displays a list of the terms being negotiated. Those skilled in the art appreciate that most existing videoconferencing products also include voice communications as well. Thus, the negotiating participants can see and hear each other and the complex, multiple variables they are negotiating at the same time. Multivariate negotiations engine system 02 can archive the multimedia sessions as video and audio files to be stored with the text.

The present invention allows the creation of one or more sponsored communities of any number of types for conducting iterative negotiations over a network. As seen in FIG. 1a, the network used is the present-day Internet with TCP-IP protocols and formats, but those skilled in the art will appreciate that it could also be implemented on any future open network(s) which might replace or supplement the Internet, or it could be implemented inside current, private networks within a corporation, if desired.

Figure 1C:
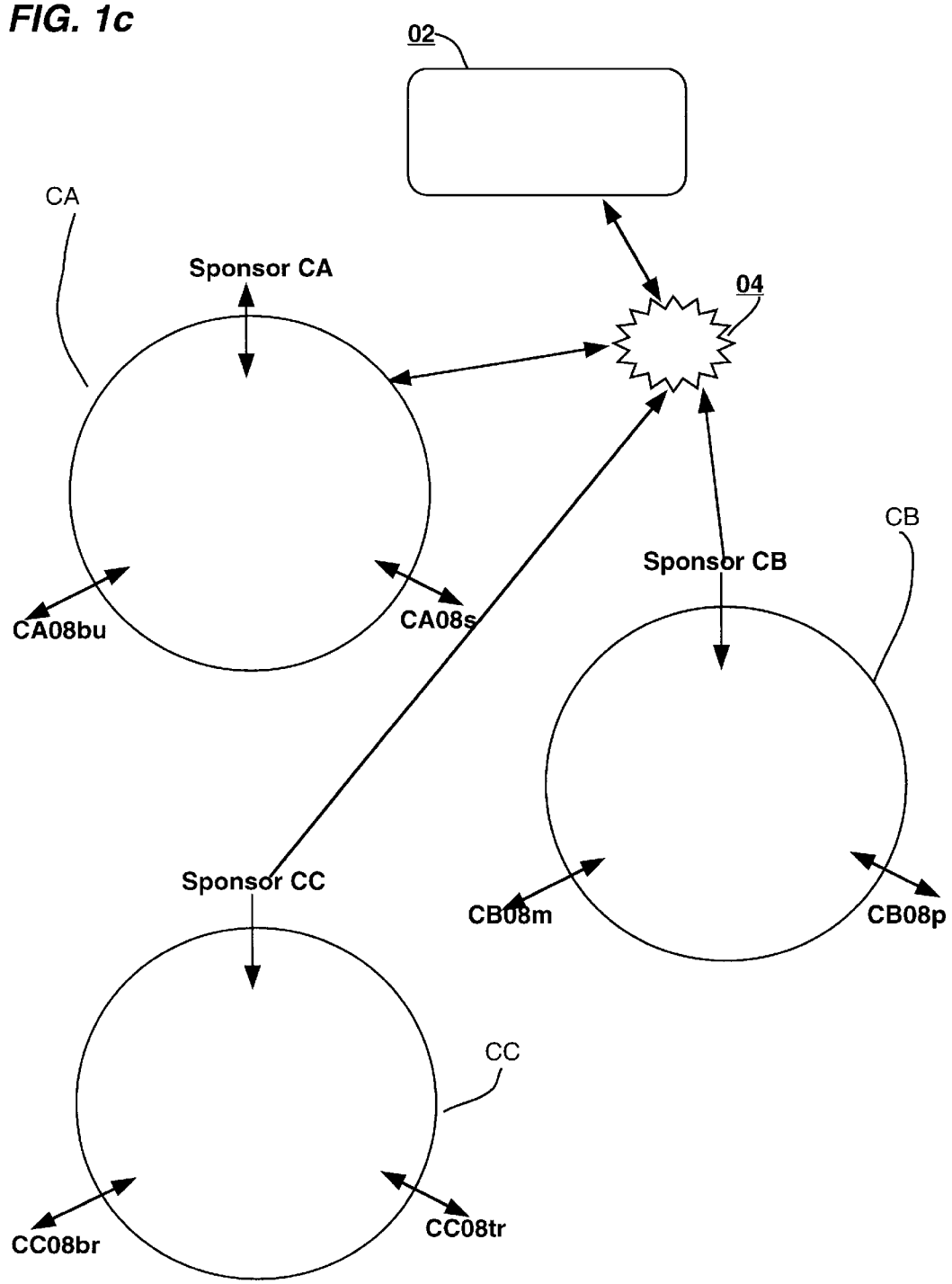
FIG. 1c is a logical diagram showing several communities created using the present invention.
Figure 1D:
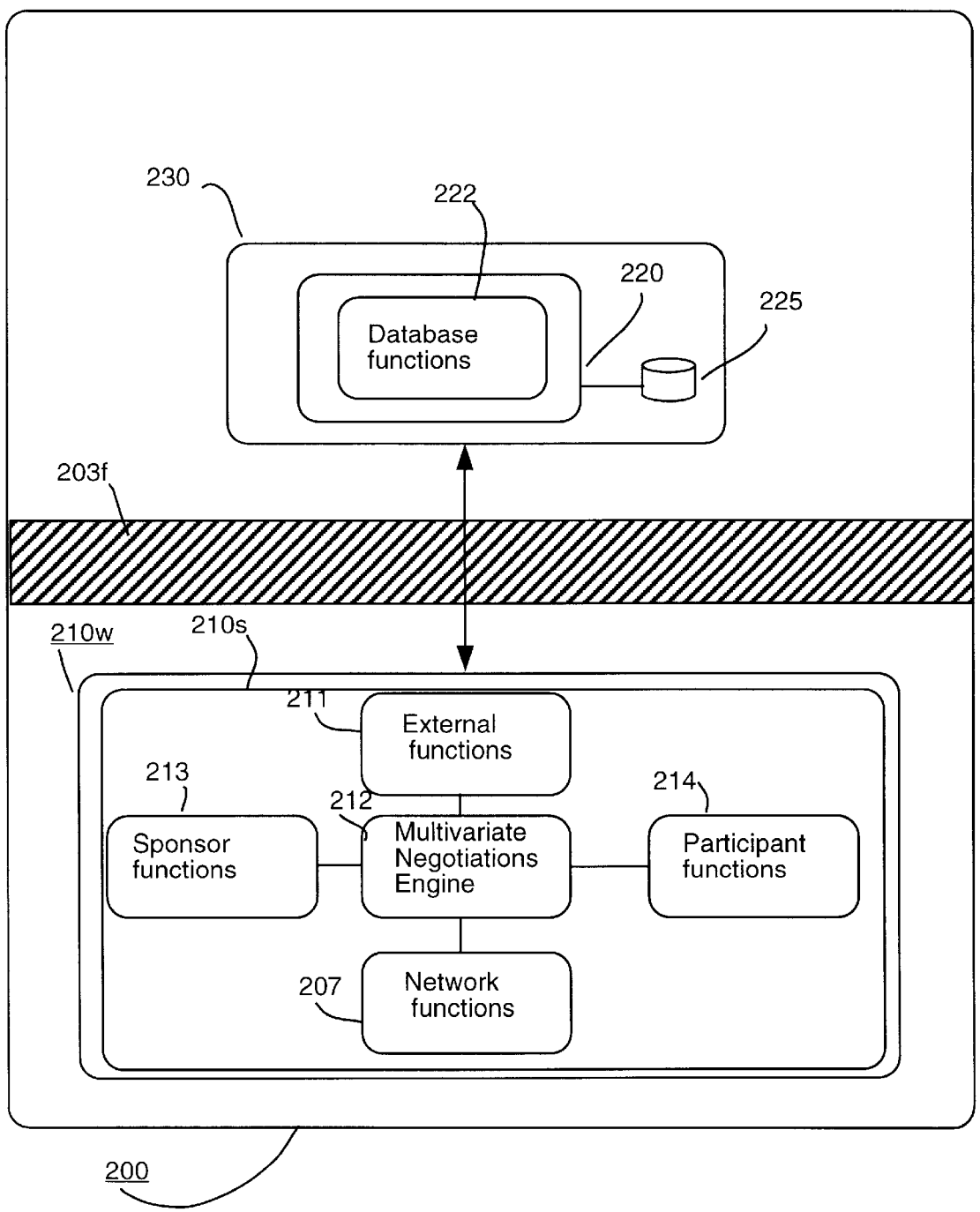
FIG. 1d is a block diagram of the present invention showing its main functions.
Figure 1E:
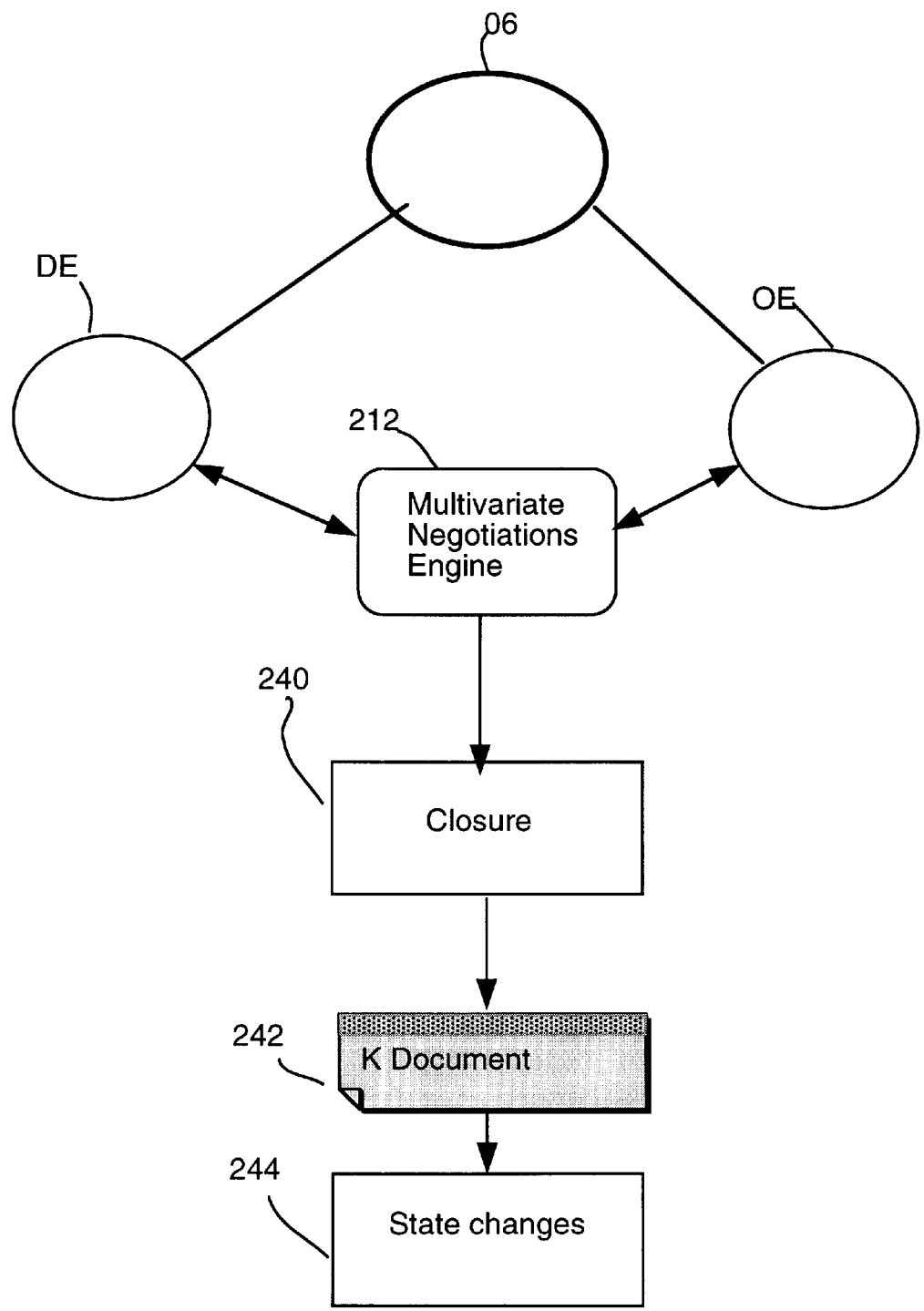
FIG. 1e is a block diagram illustrating a main process of the present invention.

Turning now to FIG. 1c, a logical diagram of several different sponsored communities is shown. Sponsored community CA might be a community of farm equipment buyers and sellers, while sponsored community CC might be a community of stockbrokers CC08br and traders CC08tr. Sponsored community CB might include computer manufacturers CB08m and peripheral makers CB08p in a standards community CB. Existing enterprise electronic commerce systems would require each member of such a community to install special Webserver, application server and database server software at each sponsor site, and at all or some participant sites in a community such as sponsored community CC. The present invention, however only requires that each sponsor, and participant in a community have a standard Web browser (not shown here), and a connection to the Internet 04. All of the processing software and hardware needed to handle transactions for each community CA-CC shown here is provided at the multivariate negotiations engine system 02's site.

The above aspect of the present invention is particularly important in business to business negotiations. Use of the Internet architecture helps both sponsors and participants keep their separate brand identifications through their individual URLs and Websites, and the use of http addressing and protocols enables near-instantaneous pulling of text and object files in response to any queries, whether in the same country or around the world.

Figure 1F:
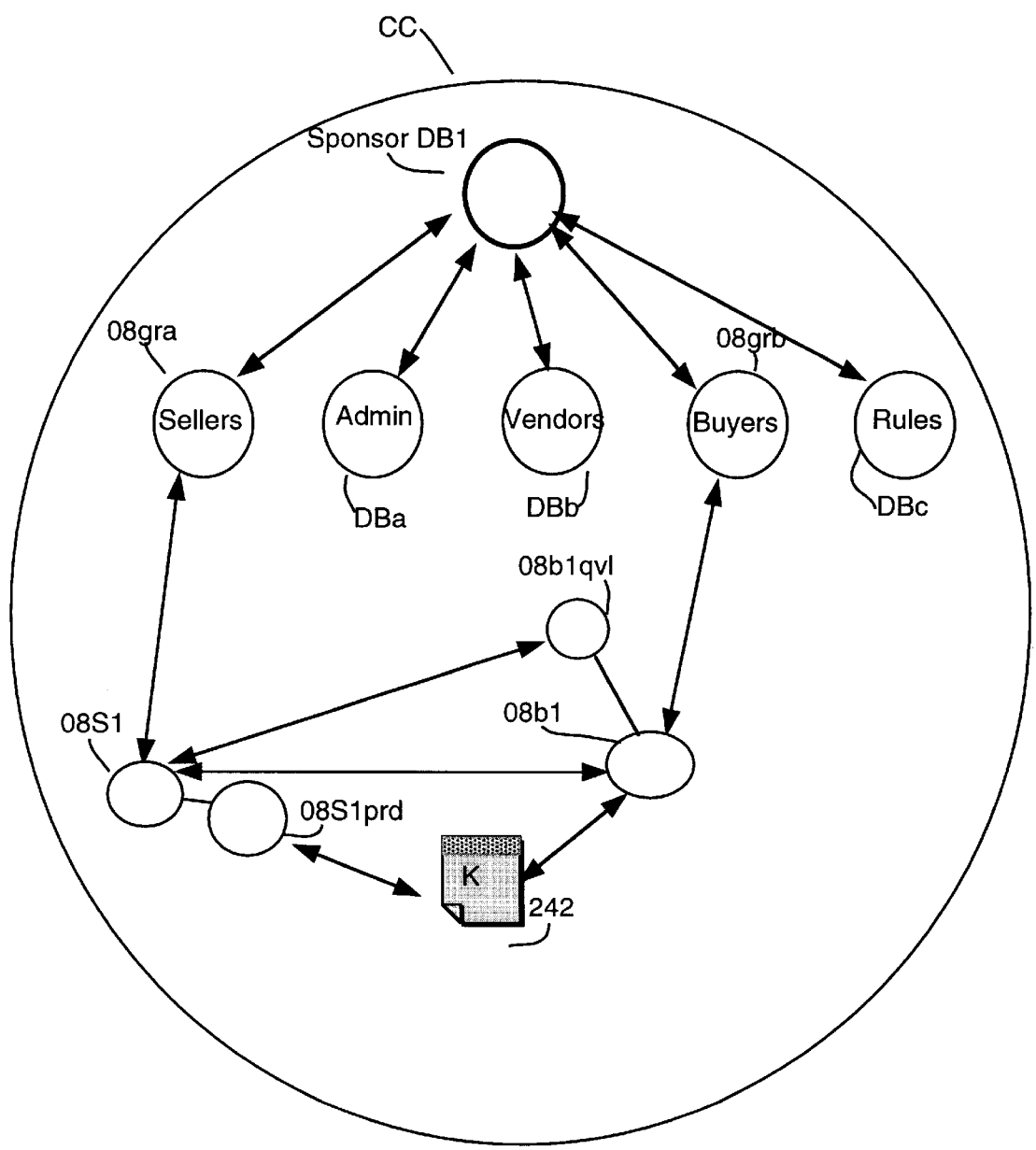
FIG. 1f is a block diagram illustrating database structures of the present invention.

Now in FIG. 1f, in many cases, sponsor 06 database 225 will be perceived by the participants and any visitors to the site, as the general site database for the sponsored community. In this capacity, the present invention includes site services such as collecting data on the number of visitors to the site, their demographics, and maintaining similar server logs and analysis of the site traffic.

Figure 1G:
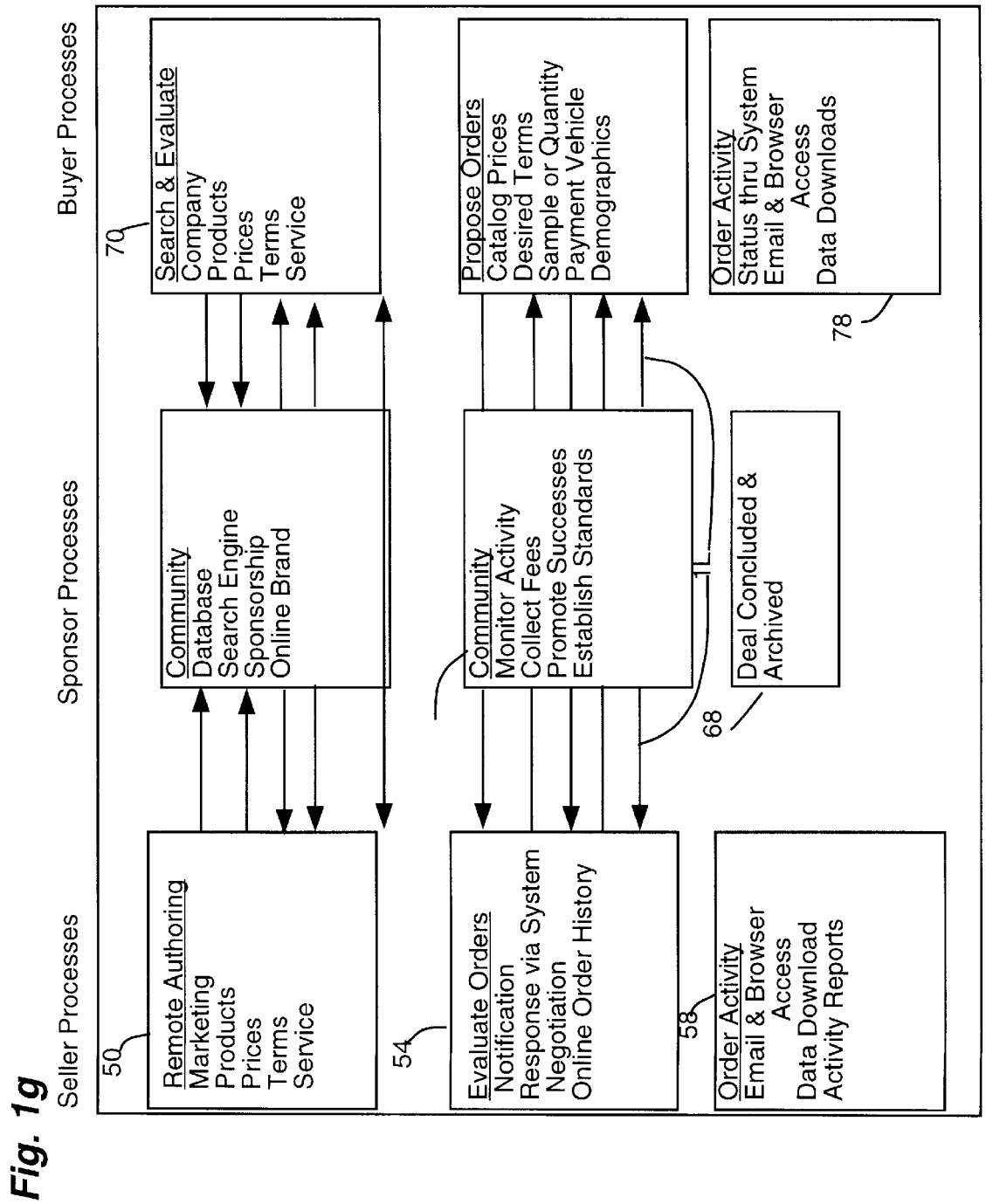
FIG. 1g is a block diagram showing some of the main interactions enabled by the present invention.
Figure 1H:
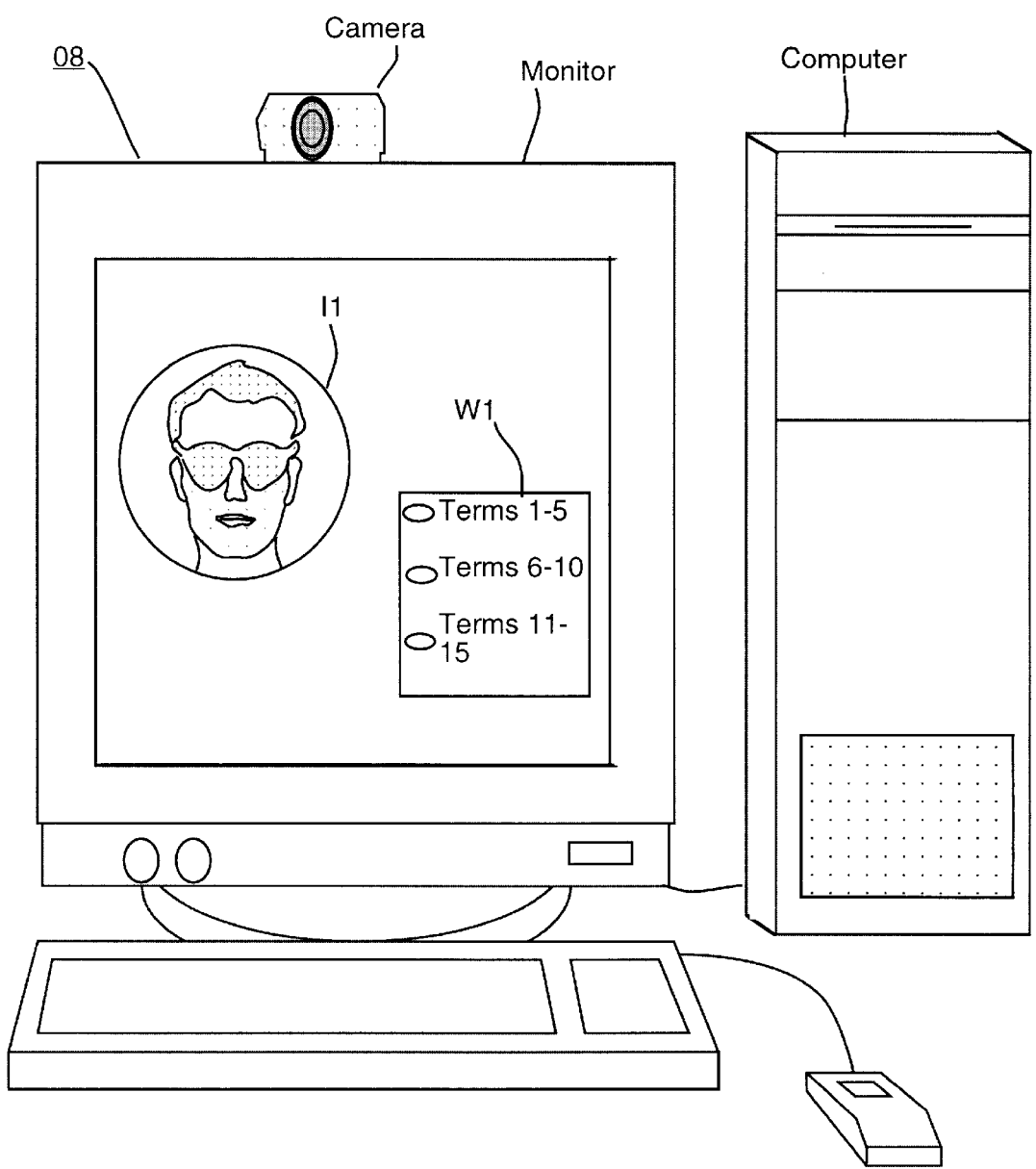
FIG. 1h is a schematic drawing of a multi-media embodiment of the present invention.

Now turning to FIG. 1g, the present invention can be viewed as a series of interrelated processes as shown here. For a commercial community, there are seller processes, sponsor processes and buyer processes. Remote authoring 50, is a seller process which enables a registered seller in the community to create a seller Website within the community on which to include the seller's marketing and product information, along with pricing, terms, service offerings and so on. Information generated or created in this remote authoring process 50 is automatically integrated with the community databases and listings. Promotion and brand identifying actions (such as registering the Web page with search engines) are taken automatically on behalf of the seller as well.

Still in FIG. 1g, a seller, once registered and having completed remote Web authoring, can immediately evaluate orders 54 and other inquiries and respond to them. The present invention alerts sellers (and buyers) that a pending offer or counteroffer has been submitted, so that they may return to the system to negotiate or resume negotiations. Finally, another seller process is order activity 58 which allows the seller to follow the activity by e-mail or browser or similar means, and request data downloads or activity reports on transaction data.

The sponsor processes of FIG. 1g include maintaining databases, registering community and seller domain names, and submitting Web uniform resource locators (URLs) to multiple search engines so that both the community Website and each seller Website within it can be found by search engines such as Compaq's ALTAVISTA™ among others. Sponsor 06 also monitors activity, collects fees, establishes standards or rules (or both) for the community, and promotes successes. Once a deal is concluded it is archived 68, by multivariate negotiations engine 212 on behalf of seller. The present invention also allows the collection and analysis of direct e-mail demographic information, such as company name, title and location. This data helps the present invention screen out frivolous or fraudulent inquirers. For example, a high school student attempting to propose an order might be intercepted when the present invention determines that no company name or title has been provided and no other authorization for such a request has been provided for.

Buyer processes shown in FIG. 1g include search and evaluate processes 70, which enable a prospective buyer to find companies and their products in the community and investigate their prices, terms and service offerings. If a buyer is interested in opening negotiations with a particular seller, the propose orders processes can be based on catalog prices or desired price and other terms, special orders for samples or small quantities, proposed payment vehicles, and can include information about the buyer. A buyer in this community can use order activity processes 78 to determine an order's status in the system, etc. Note that access to relevant information by each type of community member (sponsor, buyer, seller) is protected by password security and access levels.

Figure 1I:
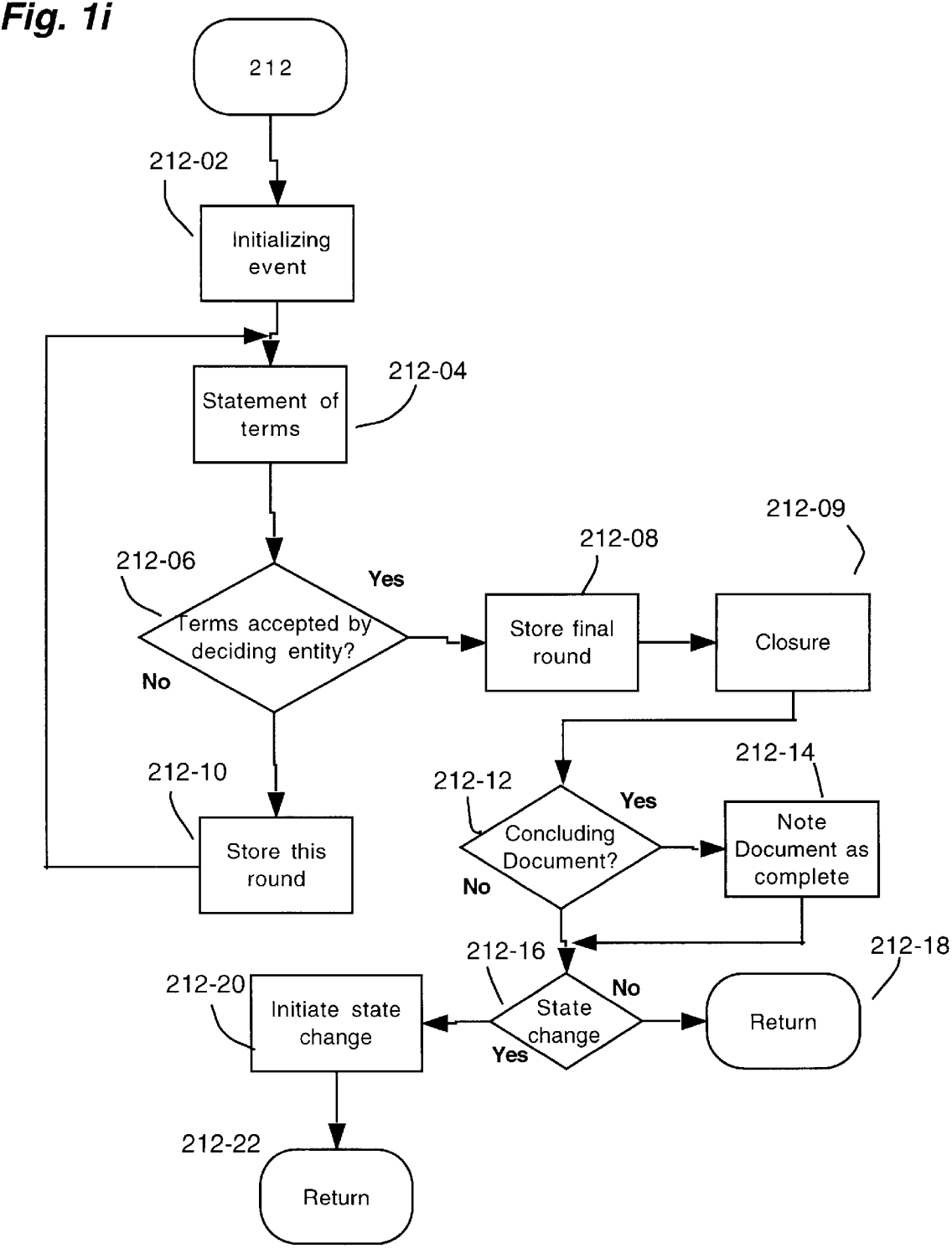
FIG. 1i is a flow diagram of the multivariate negotiations engine of the present invention.
Figure 1J:
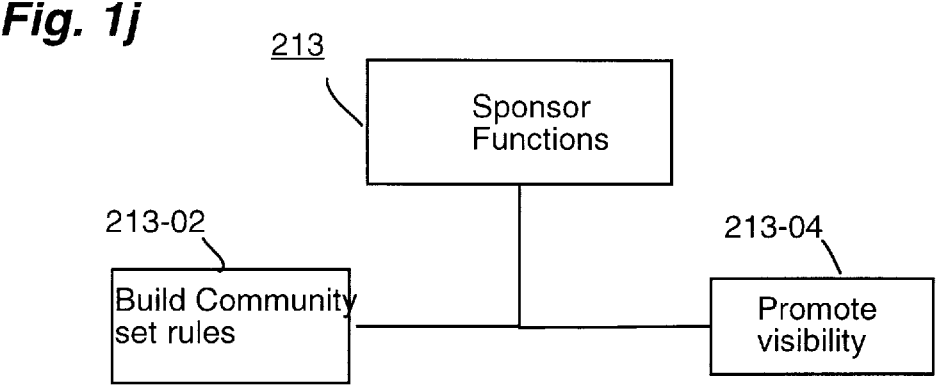
FIG. 1j is a block diagram of sponsor functions of the present invention.
Figure 1K:
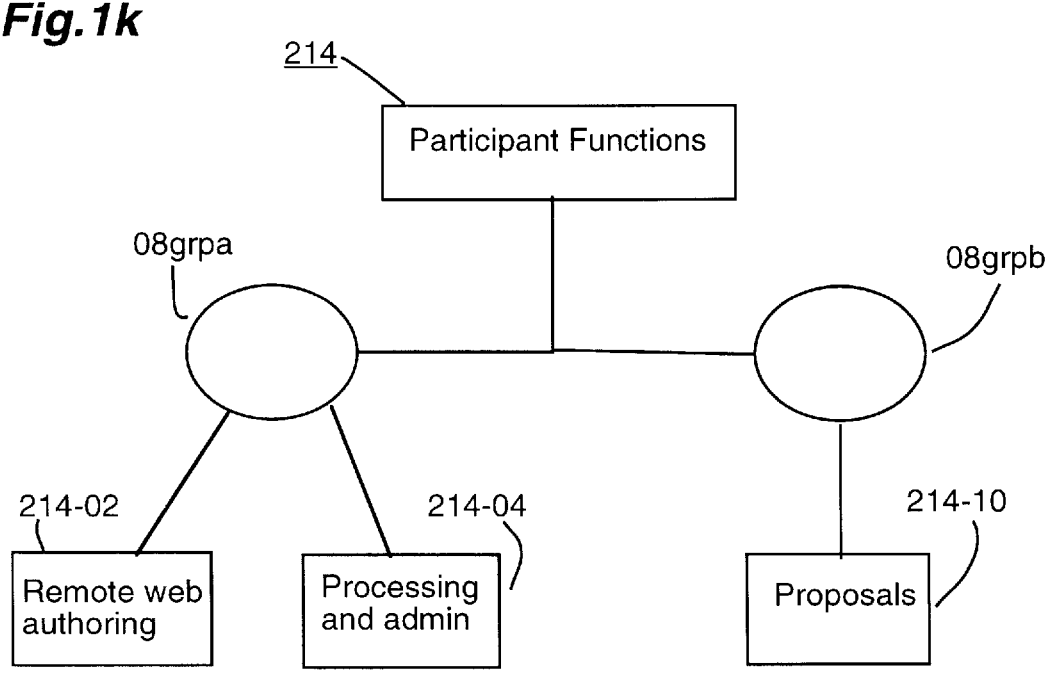
FIG. 1k is a block diagram of participant functions of the present invention.

Turning now to FIG. 1k participant functions 214 are outlined. In a commerce community, the participants might be grouped as sellers 08grpa and buyers 08grpb. Seller participant 08grpa functions include automatically integrated remote Web authoring 214-02 and processing and administration 214-04. In remote Web authoring 214-02, the present invention allows a seller registering with the sponsored community, to automatically create a seller's Website within the community, on completion of registration. The seller selects from several Website format templates provided by the present invention and as the seller "fills in the blanks" in a selected template, the information is automatically integrated with the rest of the system, so that orders can be processed and accepted immediately and more efficient registration with search engines is automatically initiated. A seller's processing and administrative steps 214-04 includes such tasks as uploading product catalogs, customizing the Website from time to time, and similar processing.

Still in FIG. 1k, participant functions for buyer participants 08grpb could be as simple as proposals 214-10. A buyer might either propose negotiations of order terms based on a seller's catalog and price lists or send out a request for proposal (RFP) to all or some of the seller's in the community, or send out a request for a quote (RFQ) to all or some of the sellers in a community, asking sellers to respond with the best, most comprehensive terms each seller can offer. The present invention also provides prospective buyers with the ability to make e-mail inquiries through the system, which are logged by the system.

Figure 1L:
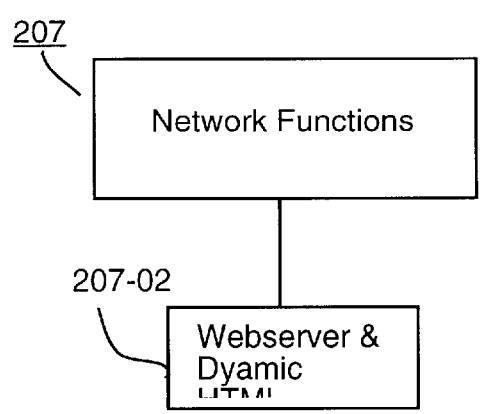
FIG. 1l is a block diagram of network functions of the present invention.

Next, in FIG. 1l, network functions 207 of the present invention are shown. As mentioned above, most of the functions of multivariate negotiations engine 212 are actually implemented as part of Webserver software 210s. As data is sent to and from the Internet 04 by Webserver 210W, Webserver software 210s interprets the TCP-IP protocol and transfers the contents to multivariate negotiations engine 212's Webserver and dynamic HTML functions 207-02. In one embodiment, these functions cause dynamic HTML text to be created to implement and communicate with the other functions of the present invention. Those skilled in the art will appreciate that Java, Java scripting , XML, or any of a number of other languages could also be used for such communications.

Figure 1M:
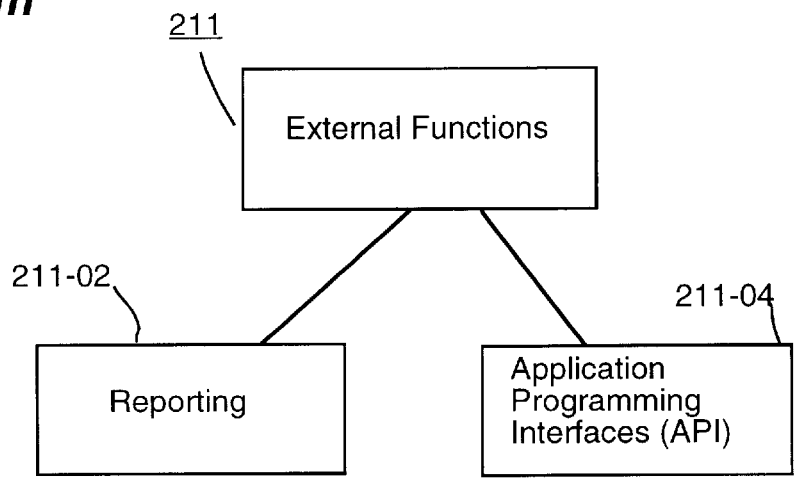
FIG. 1m is a block diagram of external functions of the present invention.

FIG. 1m, shows the external functions 211 of the present invention. Reporting 211-02 is one type of external function 211. When participants have concluded a negotiation, one or both of them may wish to have the final documents and current status of the deal reported back to them. The present invention protects the documents with separate user names, passwords and access levels for each inquirer. That is, a sponsor may be able to see the broadest or deepest levels of a transaction in the community using its master user name and password. A seller may be able to see all transactions relevant to it, proposed orders pending for it from one or all members of the community, using sellers own user id and password. A buyer may only be able to see orders it has proposed or concluded with one or all members of the community, using buyers separate user name and password.

Another external function 211 of the present invention shown in FIG. 1m, is the ability to incorporate application programming interfaces (API's) 211-04. Since the present invention is designed from the "outside looking in" (from the network looking into the enterprise) as it were, the data from transactions completed using it might have to be transferred manually to internal seller and buyer system formats without API 211-04 functions. With API 211-04 functions, the data that is stored internally by the present invention, can be reformatted by an API designed for a particular seller or buyer's internal systems. For example, if a seller has accepted all the terms of an open buying agreement against which a buyer has now placed an order, the seller might use an API 211-04 to "translate" that data into a format the seller's internal ERP systems can accept for order processing. For many participants and sponsors, standard APIs 211-04 can be created to interface with standard internal ERP systems, such as ORACLE or SAP Corporations' databases and so on. For other participants and sponsors, custom API's may need to be created to interface the present invention with their existing internal systems. In all cases, however, no API's are required to enable sponsors and participants to use the services provided by multivariate negotiations engine 212.

Figure 1N:
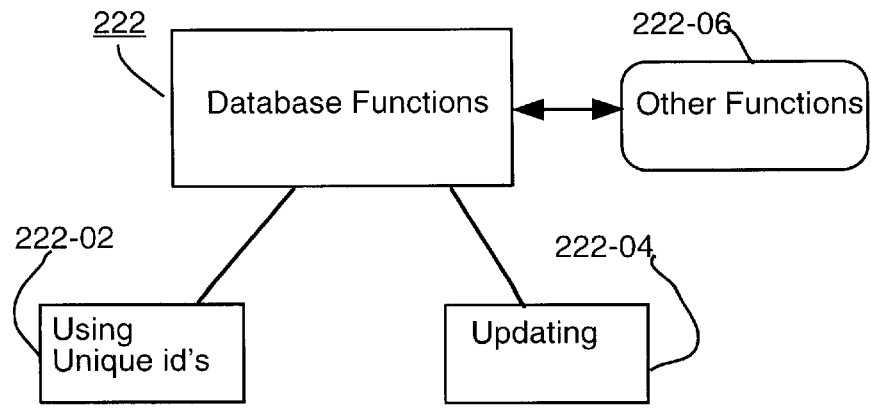
FIG. 1n is a block diagram of database functions of the present invention.

Now turning to FIG. 1n, database functions 222 are shown. First, database functions 222 are able to communicate with all other functions and services of the present invention and vice-versa. For example, as a remote Web authoring 214-02 request is handled by participant functions 214, Webserver software 210s fields the request and communicates it through IP firewall 203 f to database functions 222, asking the database server software managing database functions 222 to process the request and return the appropriate information. The database server software performs searches, analysis, and any computations needed to hand back the correct data. Webserver software 210s formats the returned data, and through conventional common gateway interface scripting techniques, creates dynamic HTML (or XML or Java or Java-compatible, etc. ) text for ultimate display. This formatted data, in turn, is transmitted to the appropriate sponsor or participants' browsers over the Internet.

Unique id's feature 222-02 is used to insure the proper data is found and transmitted. That is, the present invention associates unique identifiers (id's) with each sponsor, participant, and type of data or transaction. Since database functions 222 are integrated directly with the other functions of the invention, faster processing and updating of the database is enabled.

Figure 1O:
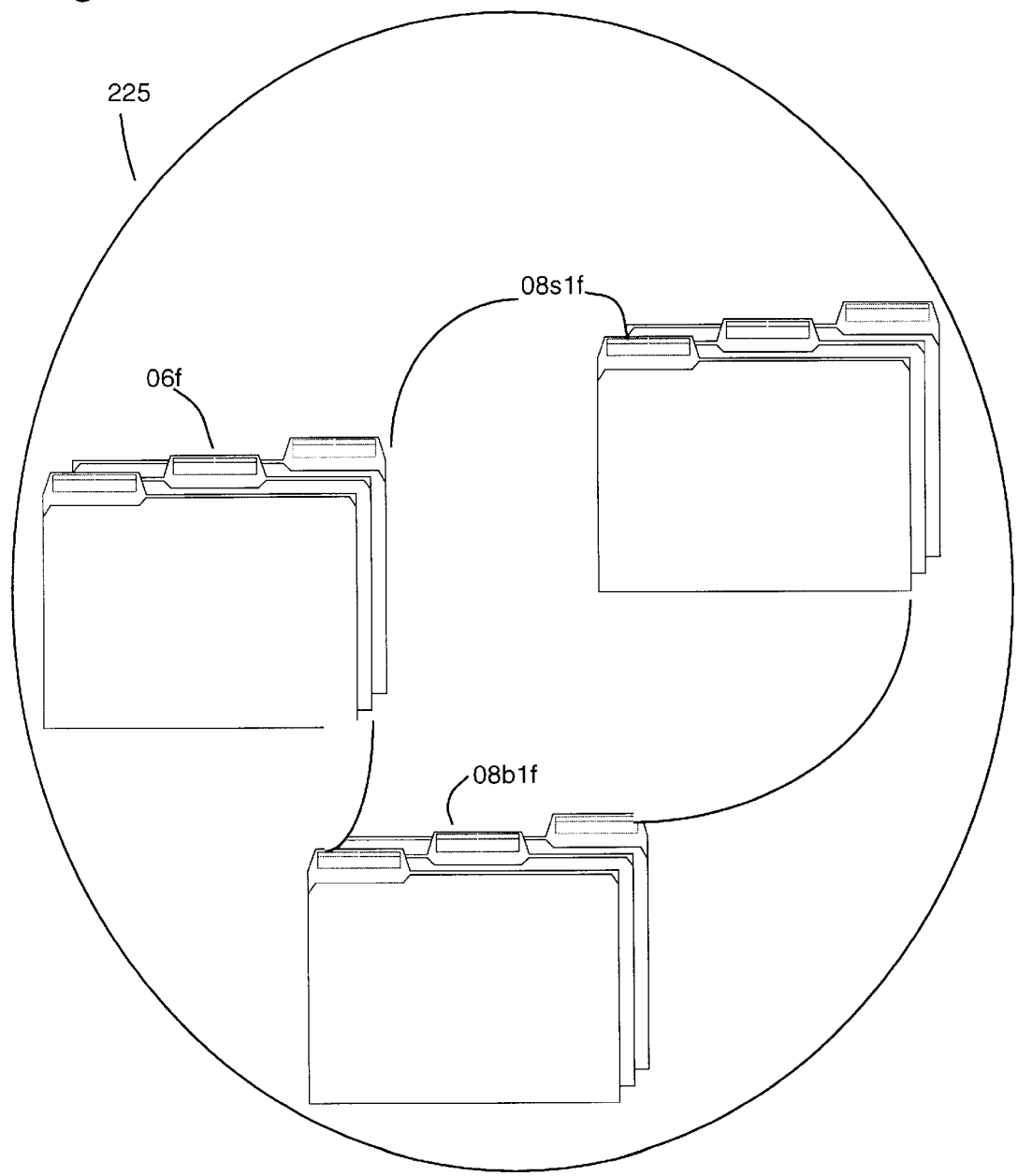
FIG. 1o is a block diagram logical overview of database functions of the present invention.

FIG. 1o shows a logical diagram of the relational structuring of database (s) 225 created according to the method and apparatus of the present invention. As seen here, logical folders, such as 06f, 08s1f, and 08b1f, are created for the sponsor 06 and for participants. A seller folder 08s1f is referenced from sponsor 06's community database folders 06f, and from a buyer's folders 08b1f. Databases 225 created according to the present invention use a combination of record, field, relational names and delimiters to interrelate the elements within. Those skilled in the art of relational databases will appreciate that a number of additional references and folders can be interrelated.

System

Turning to FIG. 1b, multivariate negotiations engine system 02's site contains all the software, hardware and database functions to create and support complete operations of communities. As seen there, the multivariate negotiations engine system 02's Website has a Webserver 210w containing standard Webserver software. In one embodiment the public domain Apache Webserver software is used, but those skilled in the art will appreciate that any of a number of other Webserver software products could be used, such as that provided by Microsoft Corporation's Internet Information Server (IIS) product or Netscape Corporation's Fasttrack or Enterprise Server products or any of several of UNIX™ Operating system server software products available from many vendors.

Still in FIG. 1b, Webserver 210w enables communications in the TCP-IP format, to be received from the Internet 04 and forwarded into multivariate negotiations engine system 02's site, which is here shown including server farm 230. Data in these communications is transferred through IP firewall 203f. Those skilled in the art will appreciate that IP firewalls, that is, firewalls such as those supplied by RAPTOR™ IP firewalls from Axent Technology Corporation, SOLSTICE 1™ and SOLSTICE 2™ IP firewalls from Sun Microsystems, Inc., and PIX™ Firewalls 510 and 520 from Cisco Systems, Inc. among others, are capable of screening the incoming and outgoing information at all the levels of the TCP-IP OSI 7-layer model. Thus they provide greater security than simpler router or proxy server firewall approaches. Webserver 210w, also transmits out to Internet 04, when transmissions are sent out from multivariate negotiations engine system 02's site. Thus, the data about negotiations and transactions in a community is kept safe behind IP firewall 203f at multivariate negotiations engine system 02's site. Data is kept secure by IP firewall 203f and communications over the Internet 04 are kept secure by Secure Socket Layer (SSL) encryptions.

Returning to FIG. 1a, all the components of multivariate negotiations engine system 02 are installed at a site separate from any sponsor 06 or participant 08 sites . This eliminates the need for any installation of software at a sponsor 06 or participant 08's site or the need for any customizing of software at those sites, thus greatly reducing the associated installation, customizing and training costs that either the sponsor or the participants or both might have incurred with other systems.

As will be apparent to those skilled in the art, if a sponsor or a participant wishes to have some of the applicable system software installed locally, this can also be done. A sponsor 06, for example, may have already spent half a million dollars or more creating its own Website and would prefer to operate the community from there. This can be accomplished with the present invention by installing the invention's core libraries on the sponsor's Webserver just as it is installed at multivariate negotiations engine system 02's site. A sponsor desiring such local installation would usually require a firewall and database server locally, too, dedicated to the community. Once these are in place the present invention can be installed at the sponsor's site in the same way it is installed at multivariate negotiations engine system 02's site. Depending on the configuration desired by the sponsor for the local site, additional customization may be required.

While the ability to operate the community from a sponsor's existing local Website is thus available, it is likely to be more costly to install than simply using the services provided at multivariate negotiations engine system 02's site.

Similarly, a seller may wish to use a Website it has previously created at great expense. Multivariate negotiations engine system 02 enables this by providing a customizable scripting language as shown in FIG. 26, and described in more detail below. Using this language, multivariate negotiations engine system 02 helps a seller create a Website which is, in effect, a mirror of the seller's original Website. A seller might choose to place its product catalog there and have the rest of its Website remain external to multivariate negotiations engine system 02's site. Thus, the existing seller external Website retains its existing domain name and URL, is linked to by the present invention as described above, and requests to see the product catalog are linked back to multivariate negotiations engine system 02's site where the product catalog is kept.

A more detailed view of multivariate negotiations engine system 02's site is shown in FIG. 1*d*. As seen there, the Website 200 includes Webserver hardware 210*w*, IP firewall 203f, server farm 230 and database server hardware 220. As shown in FIG. 1*d*, most of the functions needed to implement the present invention are implemented outside IP firewall 203*f* as part of the Webserver software used with Webserver hardware 210*w*. In this embodiment, the database server software 222 and the data 225 are the only items behind IP firewall 203*f*. Those skilled in the art will appreciate that all of multivariate negotiations engine system 02's functions could also be placed behind a firewall if virtual private networks (VPN) or tunneling or similar techniques known in the art used for implementation.

Still in FIG. 1*d*, the principal functions of the present invention operate as part of Webserver software 210*s* executing in Webserver hardware 210*w*. Multivariate negotiations engine 212 is the central function, with sponsor functions 213, participant functions 214, external functions 211 and network functions 207 working in cooperation with it. All of these, in turn, communicate through the IP firewall 203*f*, to database functions 222, operating with database server system 220, to maintain database(s) 225. Security of sponsor and participants' communications is provided at the Webserver level through secured socket layer (SSL) encryption schemes offered by most Webserver software products, while an additional layer of security is provided by restricting access to database server computers 230, where databases 225 resides, by use of IP firewall 203*f*. Thus, the present invention enables the collection and storing of negotiations and results data in a highly secure hosting environment over a public network.

FIG. 1*i* is a flow diagram of the steps of iterative multivariate negotiations engine 212 of the present invention. At step 212-02 an initializing event occurs, such as participant 08 proposing terms to another participant on an initiating terminal (or desktop computer or workstation, etc.) over the Internet 04 through multivariate negotiations engine system 02, thereby creating a communications path which is ultimately directed by multivariate negotiations engine system 02 over the Internet 04 to the destination terminal at which the selected other participant 08 is active. The terms could be the placement of an order from a buyer, or a seller's response to a general request for proposal (RFP), and so on. In initializing step 212-02 multivariate negotiations engine 212 recognizes that these two participants are negotiators and also determines that a deciding entity has been appointed either by the sponsor or by the rules established for this community.

For simple order processing, the seller may be designated the deciding entity by default. For an RFP, the buyer might be designated the deciding entity. In non-commercial communities, such as standards communities or treaty negotiation communities, a sponsor 06 may wish to designate multiple deciding entities for each issue under consideration. In such an implementation, a sponsor 06 will usually want to establish more detailed rules for the ordering and processing of proposals.

Still in FIG. 1*i*, the next step 212-04 is a statement of multiple terms by one of the negotiating participants. The terms could be formatted in any of a number of ways, such as pre-formatted forms, open field boxes, text areas, and so on. [See FIG. 15*b*, for example] At step 212-04, the proposed terms are evaluated by the other participant. If the other participant is also the deciding entity and the terms are accepted, the last set of terms proposed is stored and processing proceeds to step 212-08, closure.

However, if the terms are not accepted, multivariate negotiations engine 212 stores this set of proposed terms at step 212-10 and processing loops back up to step 212-04, where terms are proposed again, usually with some variations from the previous set proposed. This iterative process continues between steps 212-04 and 212-10 until the deciding entity accepts the terms and closure is reached at step 212-08.

Multivariate negotiations engine 212 keeps track of each set of changes and can display them so that the changes proposed at each step of the negotiations are clearly and accurately recorded.

Still in FIG. 1*i*, once closure is reached at step 212-08, multivariate negotiations engine 212 checks to see if a concluding document is desired. For most transactions in most communities, some form of final document (such as contract document 242 above) is desired to reflect the participants' agreement. However, it is possible that the participants may only wish to reach closure and that they will rely on the recorded rounds of negotiation to memorialize the terms they agreed on. If a concluding document is requested, it is created and noted as complete at step 212-04. Whether or not a concluding document is requested, the system automatically displays the changes so they can be easily seen and the present invention also checks to see whether a state change is needed at step 212-16. If a state change is needed it is initiated at step 212-20. Depending on the community, the participants, and the transactions involved, state changes could be as simple as payment authorizations sent electronically or as complex as multi-step processes desired by the participants.

Also as mentioned above, API functions can be used to integrate the present invention with a seller's or buyer's internal ERP systems, if desired.

While some users of the present invention may want to install parts of it locally, it is another advantage of the present invention that it can also be used for a "one-time" or "nearly instantaneous" community negotiation. Turning briefly to FIG. 1*c*, if the sponsor of community CB is a standards body, it could create a community Website for the negotiation of a particular standard, enlist participants, and encourage and monitor the negotiations without anyone having to buy or install additional local hardware or software. When the negotiation is complete and the concluding agreed upon standards document can be made available to all concerned, the community could be "dismantled" and the participants could disband without wasting any hardware or software installations and expenses. In other words, the present invention could be operated as a one-time service for a fee, as well as an ongoing systems. In either case, the costs of the system's fees are likely to be dwarfed by the costs the users would otherwise have incurred if they had to create their own Websites and mechanisms.

Iterative multivariate negotiations.

With reference now to FIG. 1*e*, the steps of mutlivariate negotiations engine 212 are shown. While a sponsor 06, is desirable, multivariate negotiations engine 212 can operate with only a deciding entity DE and another initiating entity OE. If this is a commerce community, deciding entity DE is usually the seller and the other initiating entity OE is usually the buyer. However, even in this situation, other designations are possible. For example, if the buyer is sending out a request for proposal to which sellers must reply and negotiate, then the buyer may be the deciding entity and the seller(s) the other negotiating entity. For many master agreements or open to buy agreements, both negotiating partes may be deciding negotiating entities.

In any case, as described in more detail below, one of the entities initiates a negotiation process and the participants negotiate terms iteratively, back and forth through multivariate negotiations engine 212 until the deciding entity accepts and closure 240 is reached. In a commercial community, closure 240 usually results in a contract document 242 and probably some state changes 244 associated with activating production, shipments, payments, order handling and so on.

To operate, multivariate negotiations engine 212 shown in FIG. 1e, need involve only two entities, one with decision-making authority and one to propose different or additional terms, with the goal of their actions being closure on a final set of terms. Multivariate negotiations engine 212 can also help participants check out market conditions through inquiries and proposals where closure 240 may not result in any contract document 242 but only in an accurate assessment of market conditions. For example, when there is rumored to be a shortage of goods of a certain type, a buyer may want to know whether it can purchase such a product in high quantities at a reasonable price from any seller. If not, then the buyer may believe the shortage does, in fact, exist.

Returning now to FIG. 1e, it can be seen that as few as two participants can use the iterative multivariate negotiation features of the present invention. At least one must be designated or identified as the deciding entity DE. Both can propose terms back and forth (see FIG. 1i) until closure 240 is reached.

Now referring to FIG. 15b, a typical proposal form for a buyer is shown. As seen here, the buyer identifies himself, his title, his company, and the company's location at lines 332–342. At lines 344–350 information about the buyer's designated freight forwarder is given. At line 350, document presentation terms are specified, as well as at line 352, 354, 358 and so on, the detailed terms of the buyer's preferences for shipment. Note that at box 362, buyer's comments, the buyer has said "I want a 20% discount." Open text box 366 can be used by the buyer to type in or cut and paste in from another document any additional terms the buyer would like to see. This might include warranty and indemnity terms favorable to the buyer, provisions for acts of God, and so on. If purchase orders of bulk order terms are being negotiated they can be included here. Letter of Credit (L/C) or other internationally standard payment vehicle terms such as wire transfer, documentary collection are being proposed, the negotiation can be structured around them.

Once the buyer has sent its proposal, the seller is alerted by the system by email (as seen in FIG. 20) that a proposal is available on the system for review and negotiation. In one embodiment, the email notification includes links to multivariate negotiations engine system 02's site. Once the seller (using its browser) becomes aware from the e-mail that a proposal is available it jumps immediately, using the link mentioned above in the email, to view a browser screen such as that shown in FIG. 16, which shows a proposed order with payment by letter of credit from the above buyer. According to the present invention, the seller must still use its user id and password for such viewing, thus preserving security of the data. In this approach, the email notification does not contain any sensitive or confidential data. It serves simply as a notifier. Note that email notices of the present invention do not contain any confidential information. Confidential data is transmitted securely to the browser through SSL techniques. Access to the data is by user name and password.

All participants in a negotiation are continually notified by e-mail as the negotiations progress. In this embodiment, the participants are required to enter their e-mail addresses in order to use the present invention. When participants log into their protected areas in the system's databases 225, they are also presented with information regarding the latest developments, if any, which have occurred in their respective negotiations.

International Transaction Processing

One of the paradoxes of international trade now is that as today's global economy expands exponentially the number of potential buyers and sellers, it becomes correspondingly difficult for them to find each other and negotiate agreements. The present invention addresses this in a number of ways. First, a sponsored community increases the visibility of member companies which are sellers. The methods described below in connection with functions to promote visibility for the sponsored community and its members significantly increase the likelihood that a buyer, searching for a new supplier over the Internet will find members of such sponsored communities and that they will be more likely to meet the buyer's needs. For example, trade development communities can be established using the present invention, including as sellers only those that meet the qualifications outlined by the sponsor. This simplifies a prospective buyer's search and evaluation task significantly. The sample order quantity purchasing features (also described in more detail below) of the present invention, significantly reduce the time it takes for a buyer to qualify a new supplier or seller anywhere in the world.

As mentioned above, most companies would prefer not to pay for volume goods with credit cards, since that it the equivalent of paying cash in advance. When that is coupled with the difficulties encountered by those attempting to pay for merchandise online, especially in countries that do not handle credit card transactions, it can be seen that the sample ordering and multiple payment vehicle features of the present invention also contribute to improved international transaction processing. This is especially true for buyers and sellers that are new to each other.

With reference now to FIG. 27, an overview block diagram illustrating the international transaction processing features of the present invention is shown. As seen there, multivariate negotiations engine system 02 is connected over an international network IN, such as the Internet 04. Those skilled in the art appreciate it could also be a proprietary network or virtual private network, if desired. For international processing, sponsored community CC might be a community of sellers of electronic components 08s located in Pacific rim countries. Prospective buyers 08b can be located anywhere in the world, such as Russia, Europe, Africa, South America, North America, and so on.

Since, as mentioned above, credit card online payment vehicles are difficult or impossible to implement in some countries, the present invention enables the use of several internationally accepted payment methods and automates the negotiation of them, along with the negotiation of the overall agreement. The payment vehicle most commonly used when the buyer and the seller are complete strangers to each other is the letter of credit (L/C).

In a proposed letter of credit, such as that shown in FIG. 16, the buyer's bank assumes the full credit risk, and is absolutely obligated to pay the seller, provided the seller ships goods in a way that conforms in every detail to the terms of the letter of credit. Minor errors such as typographical or facsimile reproduction blurring of a document are one of the most frequent causes for letter of credit payment disputes between buyers and sellers.

The present invention enables, as part of the negotiations process, the negotiation of the terms of a letter of credit as seen in FIG. 16. The letter of credit shown there, if accepted by the deciding entity DE as part of the negotiations, can be transmitted over a SWIFT compatible network to the advising bank, for immediate implementation. Thus, if the participants are unwilling to pay using credit cards or CYBER-CASH™ payment methods, (which are essentially cash payments in advance) a seller can still activate a Website automatically and take volume orders if it is willing to negotiate letters of credit, wire transfers, documentary collection procedures or to accept a buyer's purchase order.

FIG. 30 illustrates a wire transfer negotiated using the present invention. Wire transfers shift the risks from the bank to the participants. Documentary collection payment methods, purchase order payment methods, procurement cards and similar methods can also be used and negotiated using the present invention.

Remote Web Authoring

Figures 2, 10:
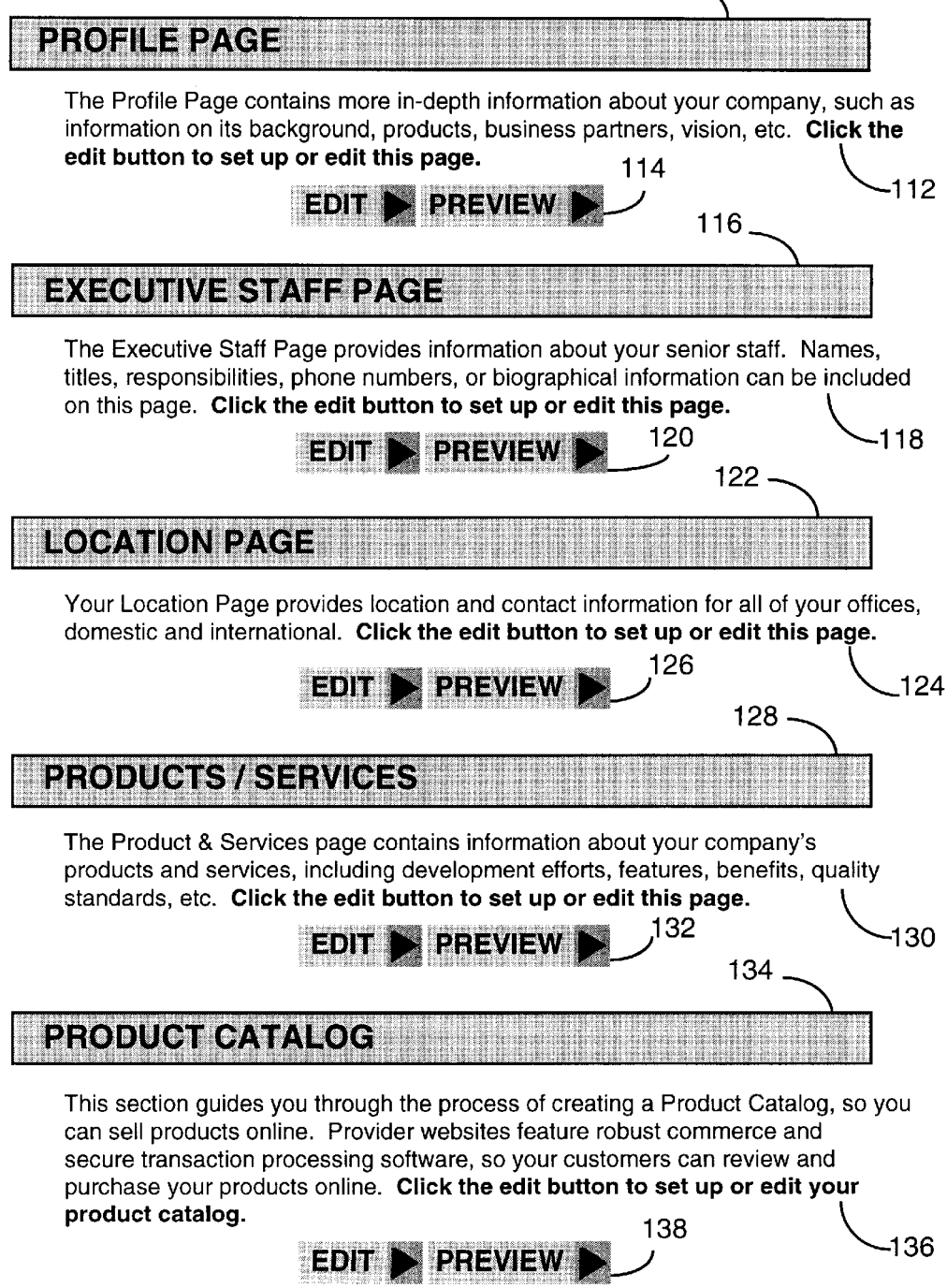
Figures 3, 10:
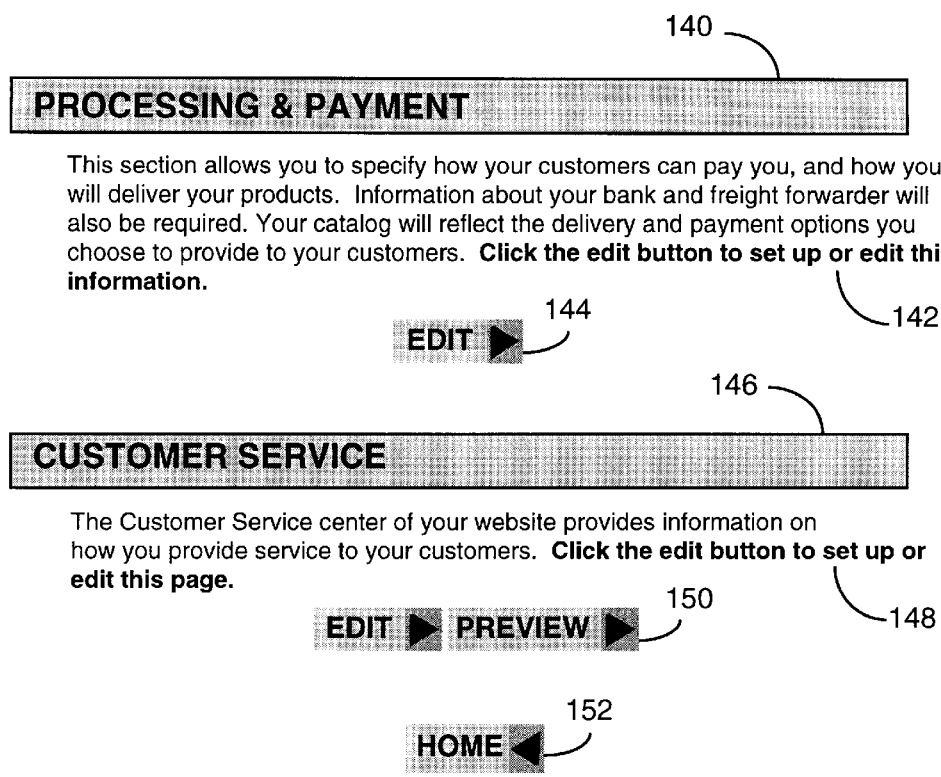

FIG. 10-1 shows the Web authoring features of the present invention as they are displayed to a participant seller through the sponsor's Web setup area. As can be seen there, Web page buttons, such as general information button 100, home page button 104, and so on, can be selected by the user at its browser to edit or preview a particular part of the website. Thus, the setup area takes advantage of existing web browser technology to simplify the authoring process.

Figure 4A:
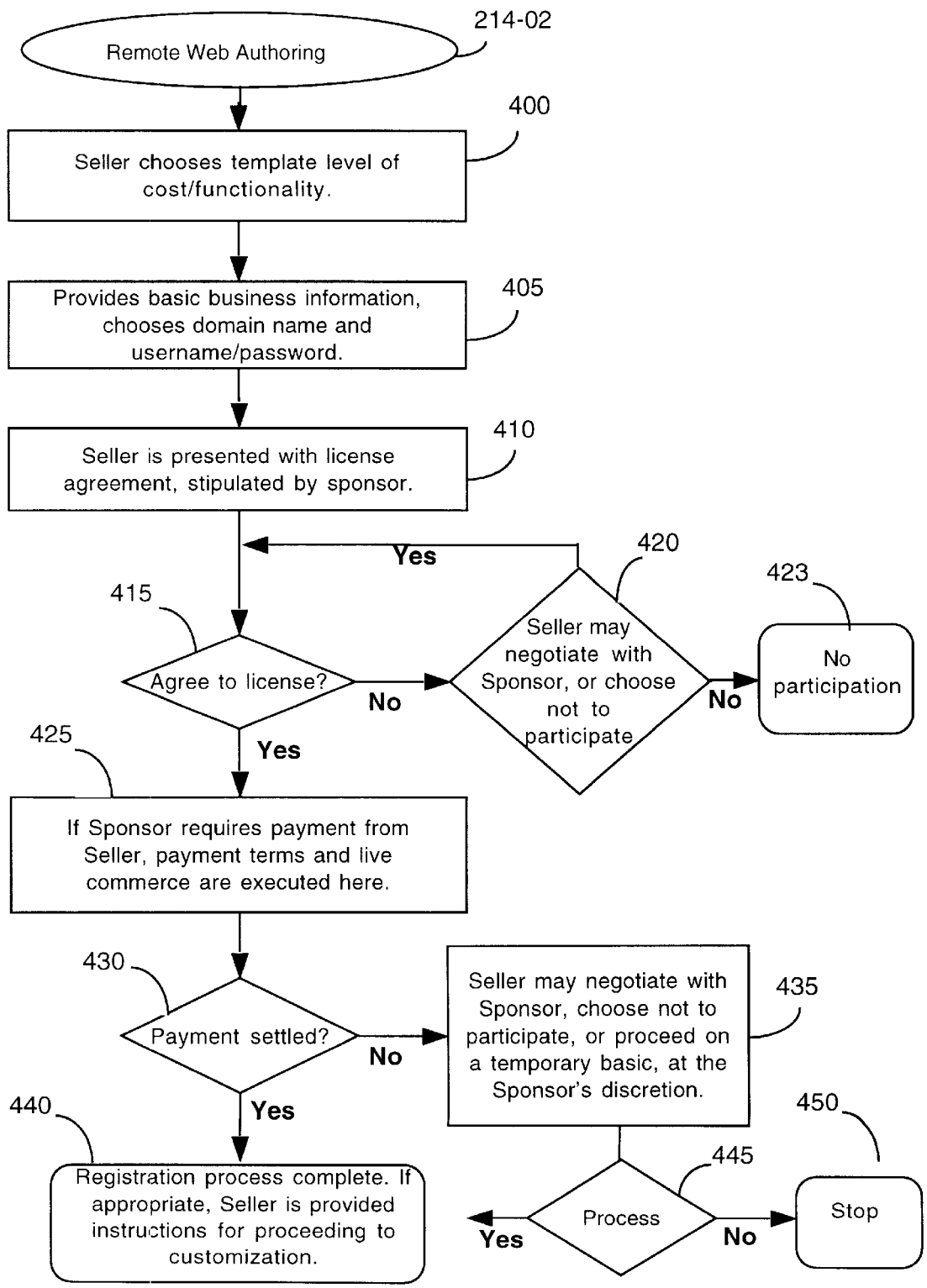
FIG. 4a is a flow diagram of remote Web authoring of the present invention.

In FIG. 4a a flow diagram of the initial part of remote Web authoring 214-02 is shown. In this diagram, it is assumed that a seller is registering for the first time with a sponsored commerce community. Other types of communities might vary this processing. First, at step 400, the seller chooses from one or more templates provided by multivariate negotiations engine system 02, based on the level of cost and functionality the seller desires. Sample website pages constructed from such templates by a hypothetical company named Exports, Inc., are shown in FIGS. 31a to 31d.

Next, at step 405 in FIG. 4a the seller provides basic information as prompted by the system through a setup screen such as that shown in FIGS. 10-1–10-3. Portions of the demographic information collected there, along with other data collected later is automatically formatted along with the META tags and Meta Keywords for automatic submission to search engines. At step 410 in FIG. 4a, the system presents the community's standard license agreement and terms to the seller. If the seller agrees to the terms at decision block 425, processing continues. If the seller does not agree, the seller may proceed to block 420 to negotiate with sponsor or elect not to participate.

Still in FIG. 4a, if the seller has agreed to the sponsor's terms for participation at step 425 payment terms are executed if the sponsor requires online payment. Any of a number of payment options provided by the system can be used. If payment has not been settled, as determined at block 430, the seller and sponsor can negotiate some more, or the seller may again elect not to participate at block 445. If the seller chooses not to participate, remote Web authoring 214-02 stops. If payment has been settled, the sponsor provides instructions at step 440 to the seller for proceeding to the creation and customization of the Website.

Figure 4B:
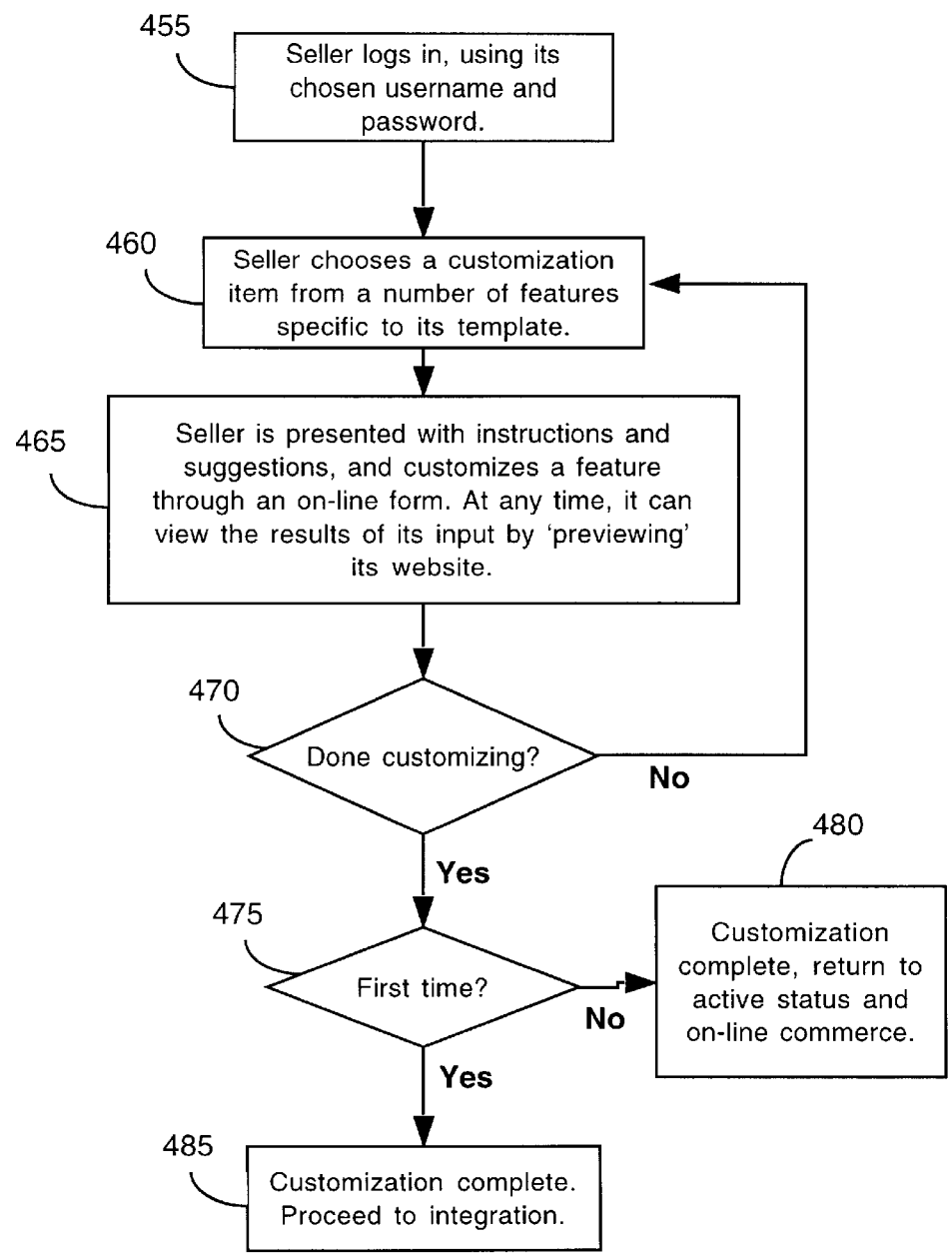
FIG. 4b is a flow diagram of the customization of the remote Web authoring of the present invention.

Turning now to FIG. 4b, processing steps for the customization of the seller's Website in the community are shown. At step 455, the seller logs into this part of multivariate negotiations engine system 02 using the username and passwords it selected when entering demographic data in the previous registration steps. At step 460, the seller, having already selected a general template for a Website, selects a customization item from those that are specific to its template. At step 465, the seller is presented with instructions and suggestions as it customizes features using an online form such as that shown in FIGS. 10-1–10-3. Sellers with a small inventory of goods can simply create a product catalog online using the web authoring features of the present invention.

Sellers with existing digital versions of their product catalogs or inventory tracking systems are able to integrate them with the present invention using application programming interfaces (APIs), file transfer protocols (FTP), or extensible markup language (XML), which latter method is in the final stages of becoming a standard language for the Web.

At any time in this process, the seller can preview the Website to see what it looks like so far. At decision block 470 the system checks to see if the seller has completed customizing. If it has, the system enables the seller for active status and online commerce at step 480. If customization is not complete, processing continues from step 460.

Sponsored Community

With reference now to FIG. 1j, a diagram of the sponsor functions 213 is shown. Generally speaking, a sponsor 06 builds a community and establishes its rules 213-02. In one embodiment, a sponsor 06 can create the community Website from templates available from multivariate negotiation system 02's site. In other embodiments, a sponsor may have already invested millions of dollars in the creation of its own database(s) and Website, and simply wants to have the community enabled from there, using applications programming interfaces (API's) or the new XML language when it is standardized. The present invention permits either or both methods of creating or enabling a community Website.

As seen in FIG. 24, the rules or standards for the community can be as comprehensive or as simple as the sponsor 06 desires. For a commercial site, for example, sponsor 06 may want to require all sellers to be compliant with a particular standards organization's applicable quality standards, such as the International Standards Organization (ISO), shown as R1 here. Additionally, sponsor 06 may want to insure that all fees due to sponsor from sellers are paid in full and kept up to date—rule R5. As another example, a sponsor for a regional trade development community may want to insure that each seller is able to handle importing and exporting of goods—rule R3, meets some specified minimum performance capabilities such as rule R6, just-in-time capability or rule R7, bar code processing, or rule R8, ability to handle specified payment methods.

Figure 6:
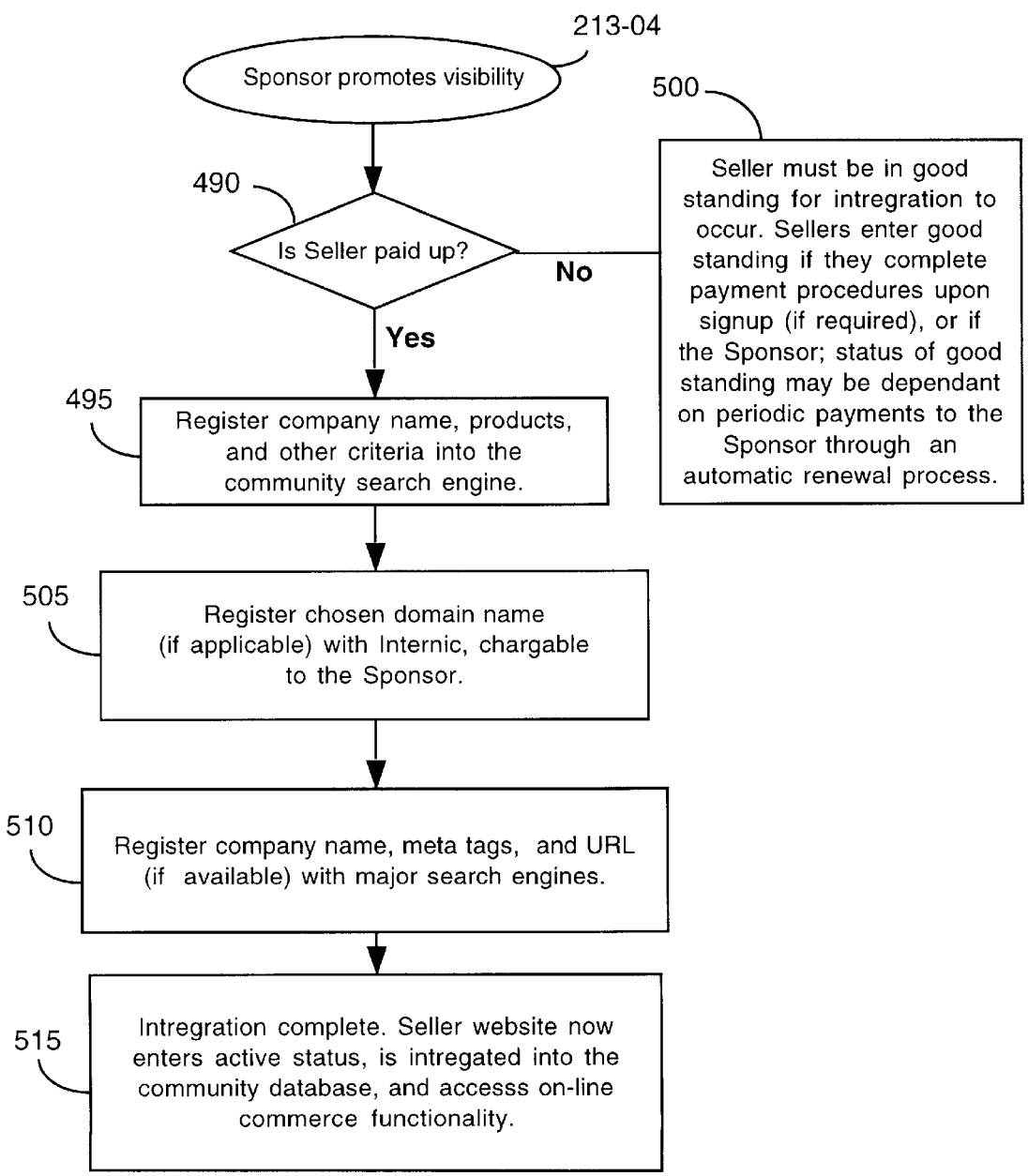
FIG. 6 is a flow diagram of illustrative sponsor promotion activities of the present invention.
Figure 7:
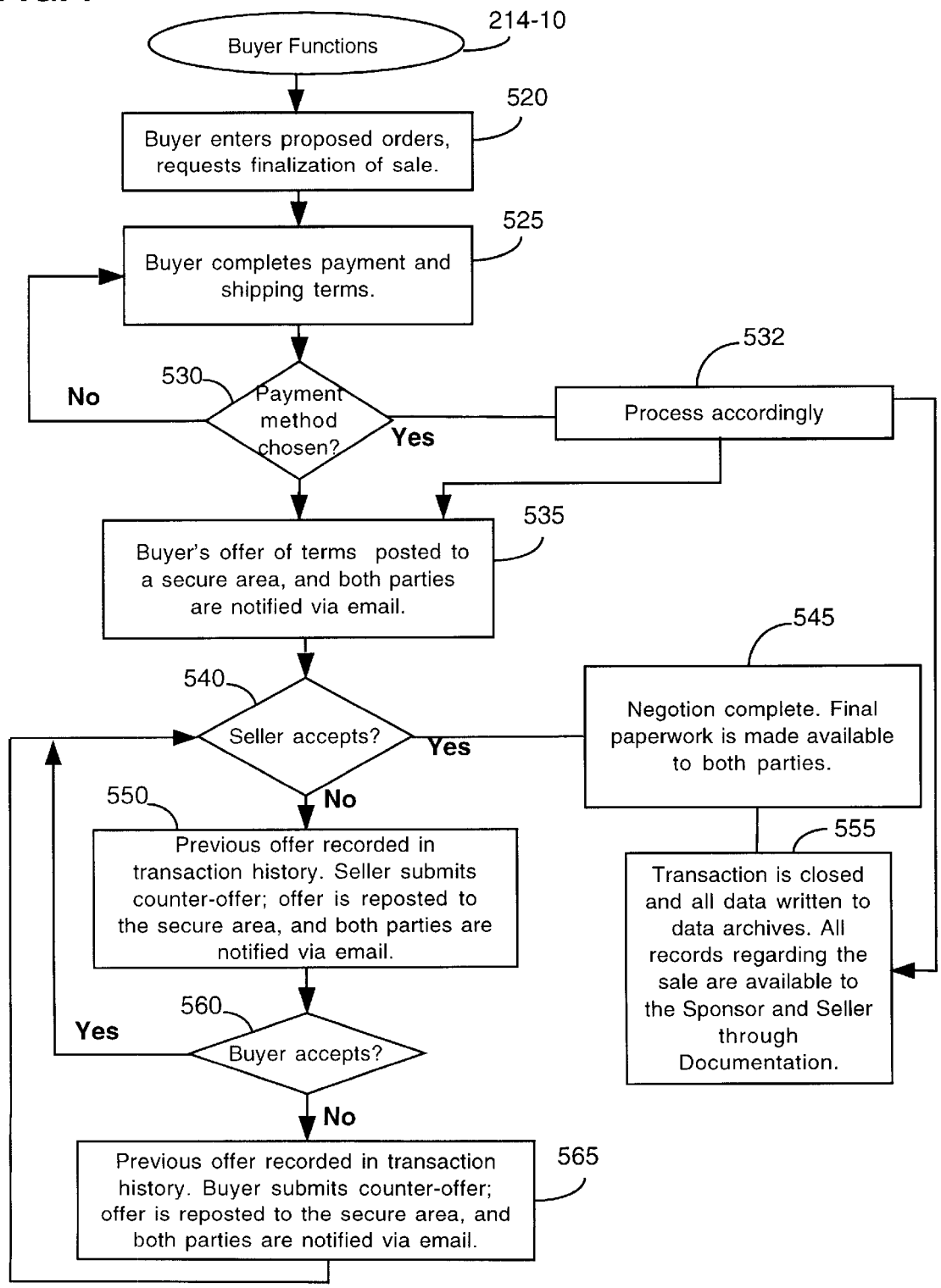
FIG. 7 is a flow diagram illustrating a buyer entering negotiations.
Figure 8:
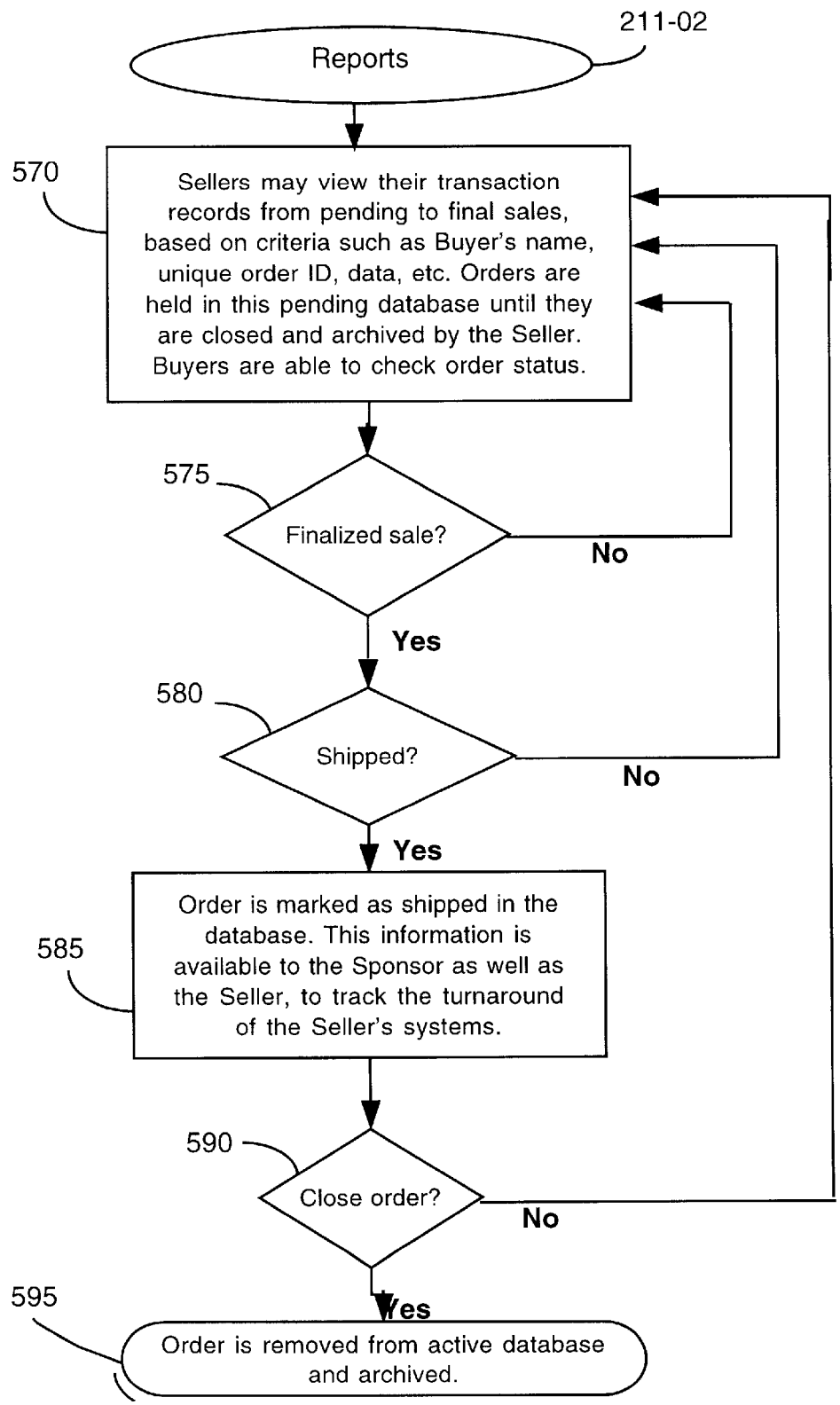
FIG. 8 is a flow diagram of illustrative reporting features of the present invention.
Figure 9:
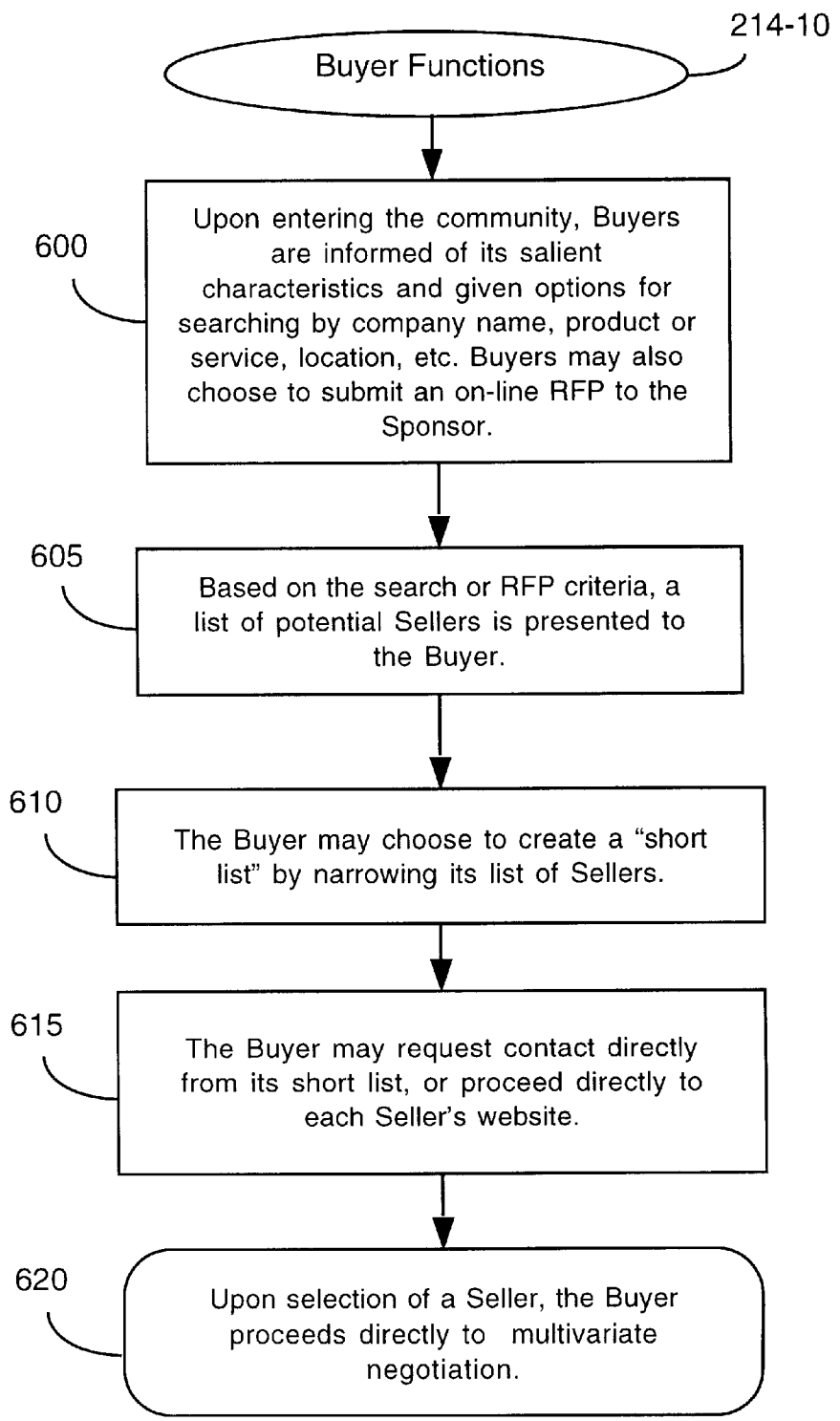
FIG. 9 is a flow diagram illustrating a buyer participant's preparation for purchasing.

As seen in FIG. 6, the sponsor functions 213-04 are also involved in the remote Web authoring functions 214-02. At step 490, after sponsor determines the seller is in good standing, sponsor register's seller's company name, products and other data with the community's internal search engine. Next, at step 505, sponsor registers the seller's name with Internic, the corporation established for assigning domain names and URLs. At step 510, sponsor automatically submits seller's name and data to major external search engines on the Internet. At step 515, the sponsor completes the integration of the new seller into the community, enables it for active status, includes it at the top of the list of any vendor databases and allows the seller's Website access to the online community's functions.

Returning to FIG. 1j, another principal sponsor function is promoting visibility 213-04. In this capacity, a sponsor 06 may submit its own Website and URL's to a number of Internet search engines and submit each selling participants' Websites and URL's to such search engines as soon as the seller is registered and has created a Website. A typical sponsor's promote visibility functions 213-04 formats the URL's and domain names (as provided by the system registration forms which are automatically integrated into the system) into the META Tags and Meta Keywords or similar formats and submission schedules most likely to speed up registration with the search engines. For example, the ALTAVISTA™ search engine Web site states that:

The Altavista indexer gives higher priority for keywords located in submit tags (META Tags and Meta Keywords ), a higher priority for keywords that are located near the top of the page, and also gives a tad higher ranking for keywords appearing closer to each other on the page text. It adds up the occurrences of the keyword in the page for higher scoring. If META keyword tags are not present, it indexes the first 30–40 words of the page as the page description.

Since, as noted above, it may take the ALTAVISTA™ search engine and others, as many as three months or more to index a site on a purely random basis, submissions such as this can significantly improve the visibility of the new seller Websites from the outset. Automating submissions to them further speeds up this process. In addition, aggregating all of the submissions under the sponsor community hierarchy is likely to generate exponentially more traffic as it takes advantage of the Internet's architecture and search engine indexing capabilities. Traffic, such as inquiries by potential buyers against any of the keywords submitted for the community site will come into the community environment.

FIG. 25 is a flow diagram illustrating how the present invention automates this notification process. As seen at step k1, promote visibility function 213-04 creates a script in any of the scripting languages used on the Web, from the information supplied when a participant 08, such as a seller, registers with the community for the first time. In this embodiment, the script is written to take the seller's data and create META Tags and Meta Keywords to assist with the location of the URL's .

Next, at step k2, promote visibility function 213-04 checks to see if it is time to submit the data to a selected search engine n. As noted above, some search engines accept submissions only on a weekly basis, at specified times. If search engine n is not accepting data at this time promote visibility function 213-04 proceeds to step k3 to wait the specified interval. If it is the right time to submit visibility data to search engine n, promote visibility function 213-04 does so at step k4. At step k5 a check is made to see if any more submissions should be made to search engines. If there are several more to process, promote visibility function 213-04 finds the address of the next search engine, which now becomes search engine n, and returns to decision block k2. If it has been determined at step k5 that submissions have been made to all search engines, promote visibility function 213-04 returns at step k6. Those skilled in the art will appreciate that these submission steps can be scheduled to repeat on a regular basis until all of the visibility data for a new participant registrant has been submitted to all the search engines. The present invention also schedules updating submissions on a regular basis to insure most search engines place community sites near the top of their index lists.

Those skilled in the art will also appreciate that other promote visibility functions 213 might be implemented for participants. For example, advertisements could be uploaded from a participant's local computer systems for inclusion in the participant's Website in the community, if allowed by the rules of the community. Such advertisements could be forwarded or submitted to related sites as another promote visibility function 213, if allowed by the community rules.

Still other promotional activities for the community can be performed by the sponsor's promote visibility functions 213-04. For example, many sponsors may want to create links to and from other Websites to direct more "traffic" to the sponsor's Website, and either directly or indirectly all the seller's Websites within. This is useful when sellers or sponsors or both already have established brand name identities and traffic patterns through their own individual traditional and Web-based brand recognition marketing efforts.

Non-repudiation

Referring again to FIG. 1i, it can be seen at step 212-10 of the multivariate negotiations engine 212's processing, that each "round" or step of negotiations is stored and archived by the present invention. This is of special benefit to any participants negotiating a binding agreement who may later disagree as to the exact intent or content of the final terms. This archival processing allows either side or the sponsor or moderator (using the appropriate usernames and passwords) to view the steps leading up to the final document. The likelihood of potential disputes arising over what has been historically referred to as the "battle of the forms" can be greatly reduced, or even eliminated using this archival feature. These non-repudiation features of the present invention are likely to significantly reduce the incidence of "inadvertent lapses of memory", since "memory" can easily be refreshed from the archives. This, coupled with other security and validation features of the present invention mentioned above, provides a more complete non-repudiation system than is presently available.

That is, the present invention provides authentication by validating the identity of the participants through user names and passwords; maintains confidentiality by using SSL encryption and decryption to ensure that confidential information is not intercepted during transmission; provides security of the data stored at multivariate negotiation engine system 02's site through use of IP firewall 203f; and by virtue of the archival features, provides documentary non-repudiation by ensuring that transactions, as they are negotiated and committed are fully documented. Those skilled in the art will appreciate that existing security techniques such as public key encryption (PKI) systems, certificates of authentication, among others can also be used to enhance the integrity of the documentary archives.

FIG. 28 illustrates this in simple overview format. As seen in FIG. 28, buyer terms BT1 include an order for 10,000 widgets, etc, requesting a 4-year warranty on parts and that buyer's performance or payment be excused for acts of God which are here proposed to include strikes and government actions. Using the present invention, these terms are stored for review by the seller. Seller terms ST1 indicate the seller would prefer to offer only a 6 month warranty on parts and would not include strikes or government actions under the heading of acts of God which would excuse the buyer from paying for the goods. The buyer responds with proposed buyer terms 2, BT2, which ask for a 1 year warranty and the inclusion of government actions as an act of God.

In this example, the seller accepts buyer terms BT2 and this is reflected in the final deal terms FD. If, at some later time, the seller demands payment from the buyer at a time when the buyer is unable to send money out of the country because of government action, these non-repudiation features make it clear that the seller had agree to excuse performance in that circumstance. Thus, the seller cannot say "I was positive we had eliminated two of your requested terms for inclusion as acts of God, and since our copy of the final terms has been destroyed, and you cannot find yours, I demand you pay." The present invention significantly increases the likelihood of preventing such not uncommon occurrences as disputes arising from lost or misplaced copies of documents.

Sample Ordering

For production purchasers, sample orders can be placed at the outset of vendor selection processes by a production buyer. If the sponsor desires to include this feature in the community, it will make arrangements with each seller for the payment for the samples. In order to enable a seller to "go live" immediately upon the creation of the seller's Website, a sponsor might authorize payments for such sample purchases through the Sponsor's own merchant id or similar arrangements for online payment processing. This eliminates the need for the seller to wait several weeks for a merchant Id in order to accept credit card payments for small value transactions such as sample orders.

Often a seller's ability to accept sample orders in specified quantities upon agreed upon payment terms will be one of the rules of the community. Once a buyer has placed an order for sample quantities, the system automatically sends a notification to that effect to the seller, as seen in FIG. 23. The seller, having previously agreed to accept sample orders is now obligated to ship the quantity of the items as specified by the buyer. In a typical implementation of this feature, the seller's normal shipping and handling terms apply. If the sponsor and sellers agree to accept payment for samples by credit card or procurement card, the sponsor can process the payments online using its own accounts, and then remit the proceeds from the payments, less its fees for handling, to the seller by wire transfer or other standard payment methods.

Figure 2:
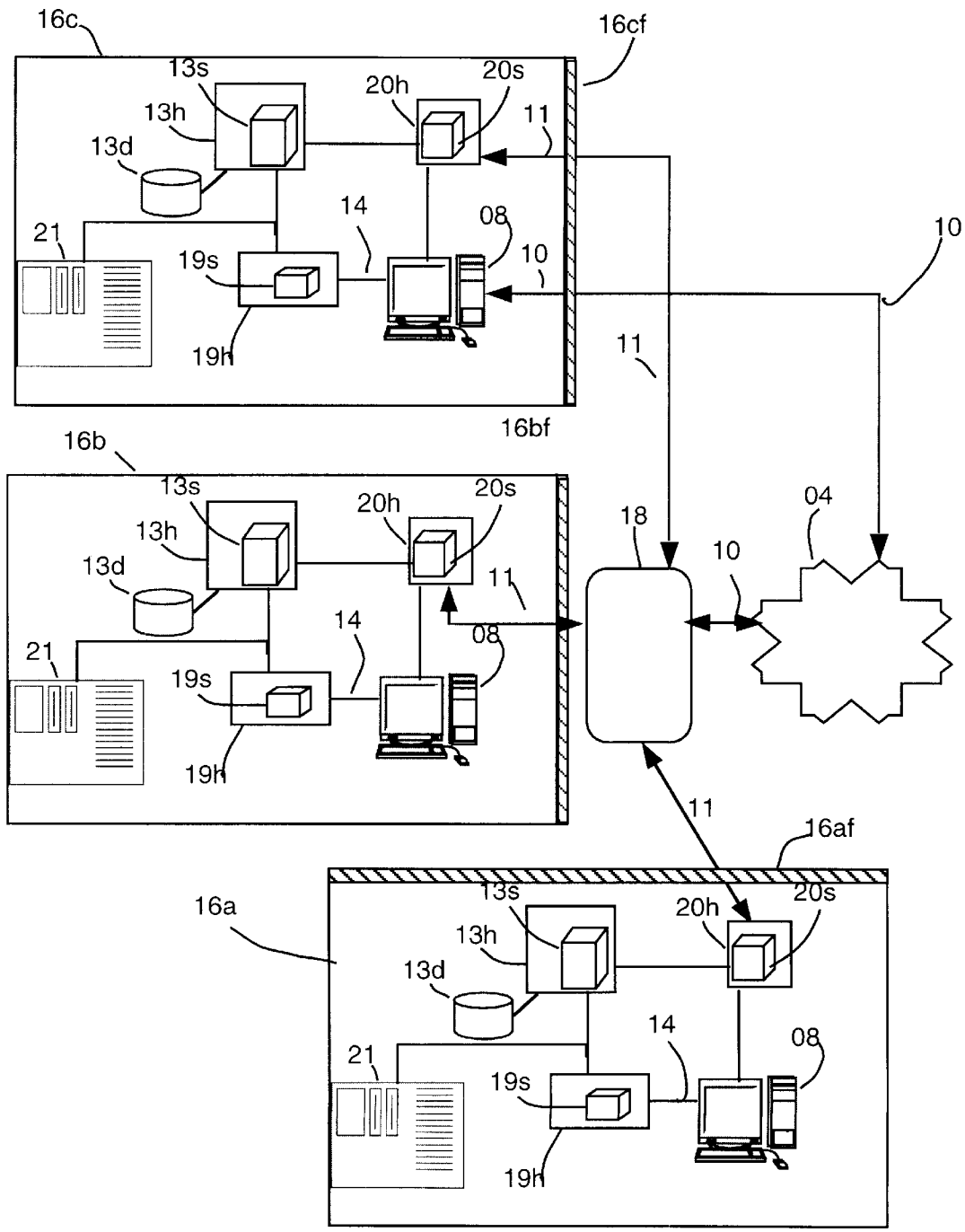
FIG. 2a (Prior Art) is a block diagram of a prior art enterprise application software server system.
FIG. 2b (Prior Art) is a block diagram of a prior art Internet mall site.
FIG. 2c (Prior Art) is a block diagram of prior art sample quantity purchasing techniques.
Figure 2B:
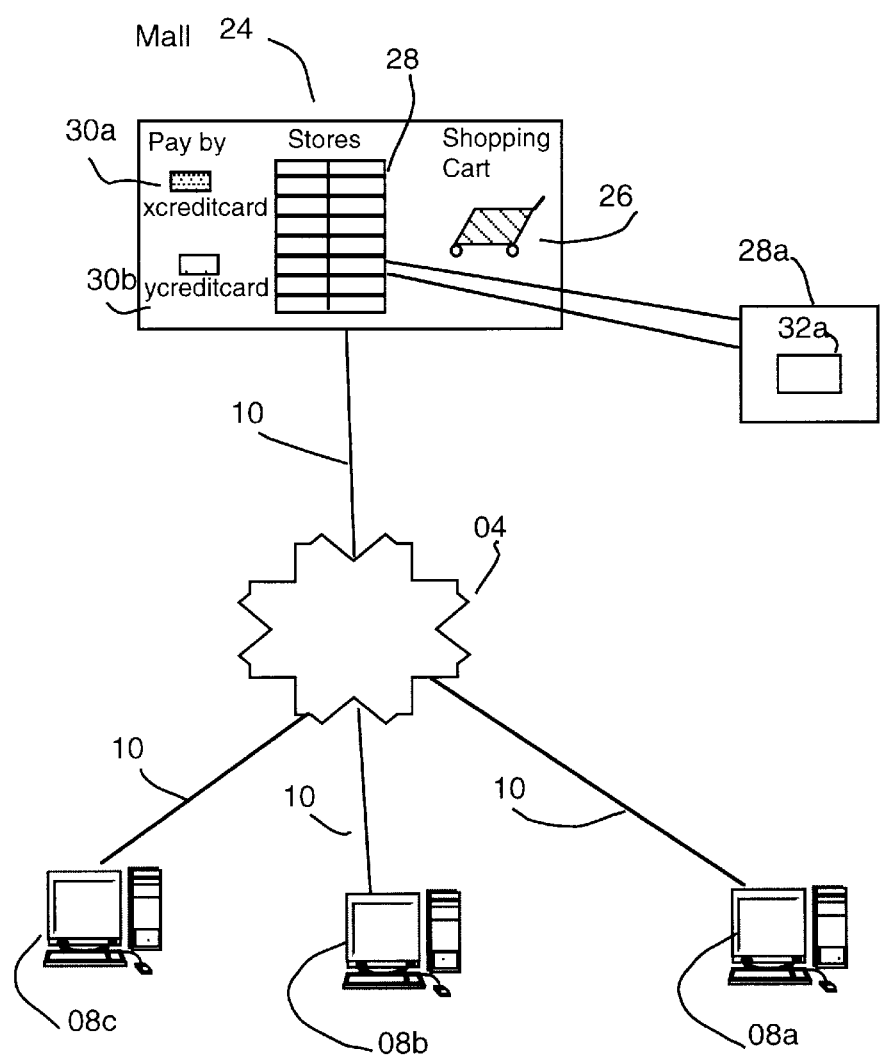
Figure 2C:
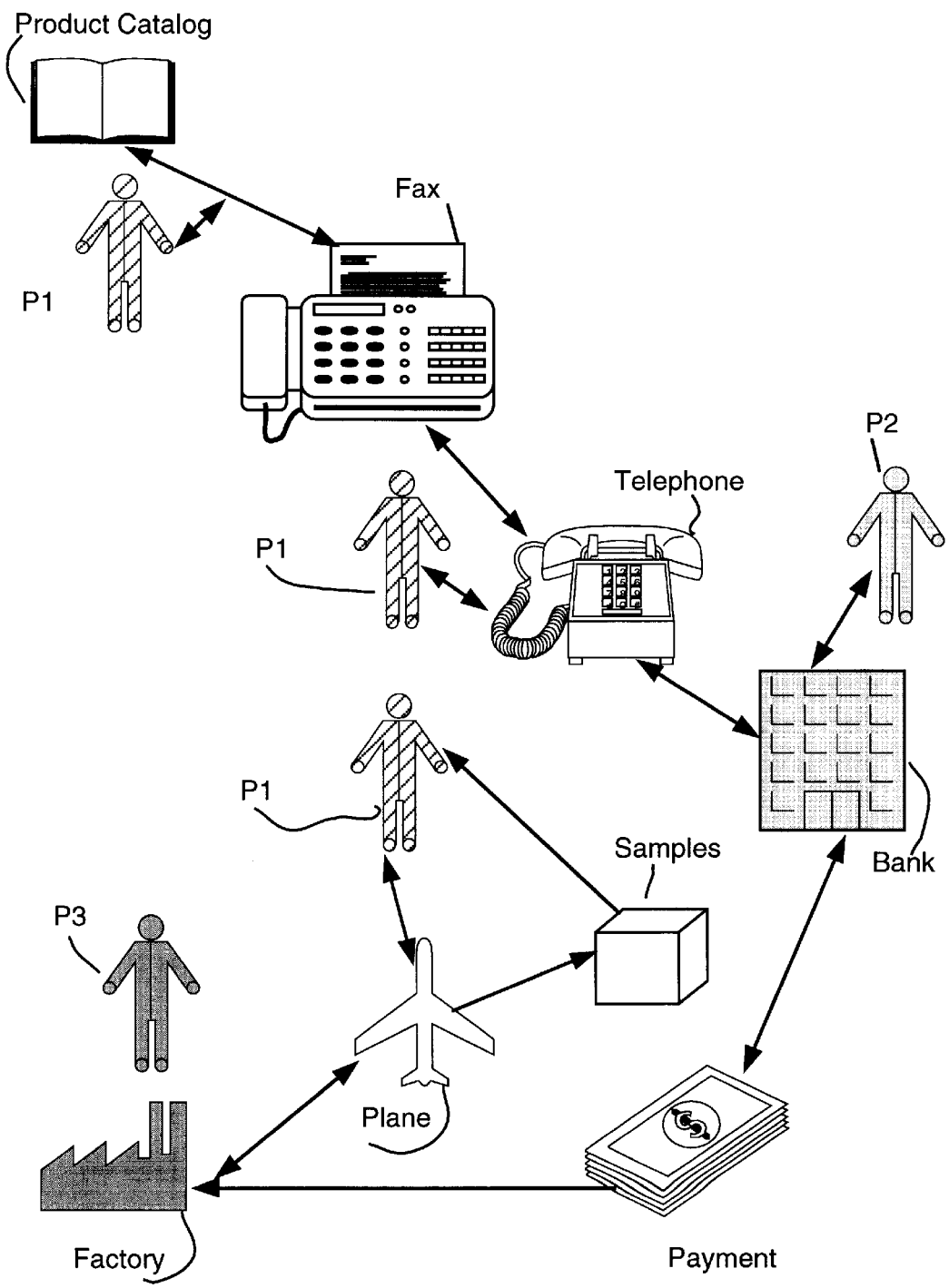

Referring briefly to FIG. 2c (Prior Art), it can be seen that the prior methods of ordering sample quantities were heavily labor intensive. A person P1, from the prospective buyer organization would look through a hard copy product catalog, place an order by facsimile or telephone, and possibly fly to the seller's factory, where face to face negotiations might occur with seller's representative P3. Buyer P1 might also have to negotiate by fax and telephone a letter of credit with its bank representative P2, before all price, payment, and other terms are completed so that payment can be arranged to occur upon shipment of the sample quantities. As noted in the background section above, this traditional approach is usually lengthy, costly and labor-intensive.

Referring now to FIG. 29, the present invention enables a prospective buyer to electronically search a sponsored community site at step SO1 for sellers of goods meeting buyers needs. As mentioned under international transaction processing, above, this ability to find new, possibly pre-qualified suppliers over the internet is a significant advantage for production buyers.

At step SO3, the sponsored community displays to the buyer the sellers with goods meeting the needs. At step SO6 the buyer can link to the sites of the sellers listed in the display, and either send email inquiries to them (step SO6), or directly order sample quantities from them (step SO10) or evaluate them at step SO12. If the buyer likes the samples and wishes to negotiate terms for placing an order in volume, it can proceed to Steps SO14 through SO20 to do so.

As mentioned above, this ability to order and receive sample quantities quickly has special benefit for production buyers looking for goods to use in new developments. If samples of such goods can be brought in and tested by the engineering developers, significant improvements are possible in getting new products ready for market.

Integrated Database.

Turning now to FIG. 1f, databases 225 as they might be logically depicted for a commercial sponsored community CC are shown. In this view, sponsor database DB1 includes not only sponsor-specific information, but pointers to: a database of registered seller participants 08gra, an administrative database DBa, perhaps a larger database of potential vendors DBb, as well as a buyer participants database 08grb, and a rules database DBc.

Still in FIG. 1f, there are usually logical interrelationships amongst the various databases in a community, as well. For example, seller participant 08S1 has its products database 08S1prd. Seller participant 08S1in this example has just been linked to buyer participant 08b1, because of a contract document 242 the participants have just completed negotiating through the system. This, in turn, enables buyer participant OSb1 to include seller participant 08S1 in buyer participant's qualified, online vendor list maintained by the present invention in database 08b1qvl. In production purchasing, once a seller has achieved the status of inclusion in the buying company's qualified vendor list (QVL), it usually makes it easier to have future negotiations between the two companies. The present invention not only allows the QVL list to be maintained online, it can also automatically add a seller to it if a major agreement such as the type designated by buyer has been completed between the two of them through the system. Similarly, the buyer in the above example is likely to be entered in several of the seller's databases.

A typical sponsor 06's administrative database DBa, in FIG. 1f, includes such things as templates, procedures, and charges for registering new sellers, procedures for recognizing and assigning passwords to buyers, procedures for automatic renewal, details of each sellers required banking information, and so on. Sponsor 06's vendor database DBb, might be a listing of all the potential vendors in this general market. For example, if the general market for which sponsored community CC was created is the market for power supplies for electronic equipment, then all the makers of power supplies might be included in a brief listing in this database. As a manufacturer of power supplies for this market registers with the sponsor 06, agreeing to meet all the conditions specified for inclusion by sponsor 06, it is automatically placed, by multivariate negotiations engine system 02, at the top of a list of vendors in vendor database DBb. Thus, when potential buyers are browsing through the community Website CC, they will find the registered sellers at the top of vendor database list DBb, with others listed in lower priority order.

Typical sponsor vendor database Dbb includes text, images, sound files, etc. When information from one or more of these databases is called for, the present invention pulls such associated files and graphics for display to the requestor. Typical sponsor 06 databases 225 also include demographic data about registered sellers, such as company name, title, and locations. If certificates of authenticity, customer identification numbers, or electronic signatures such as those conventionally used for non-repudiation purposes are collected, they can also be stored in a sponsor database 225. Consequently, the services available from a typical sponsor 06 using the present invention, can make production purchasing more efficient for a buyer and provide direct access to potential buyers for all registered sellers.

As seen in FIGS. 1*f* and 1*o*, database 225 of the present invention is automatically integrated with the functions of the multivariate negotiations engine system 02. As HTML text is received, requests and data are extracted from it (as described in more detail below) into dynamic HTML for storage in database 225 in the appropriate "folders" for the respective members.

Figure 5A:
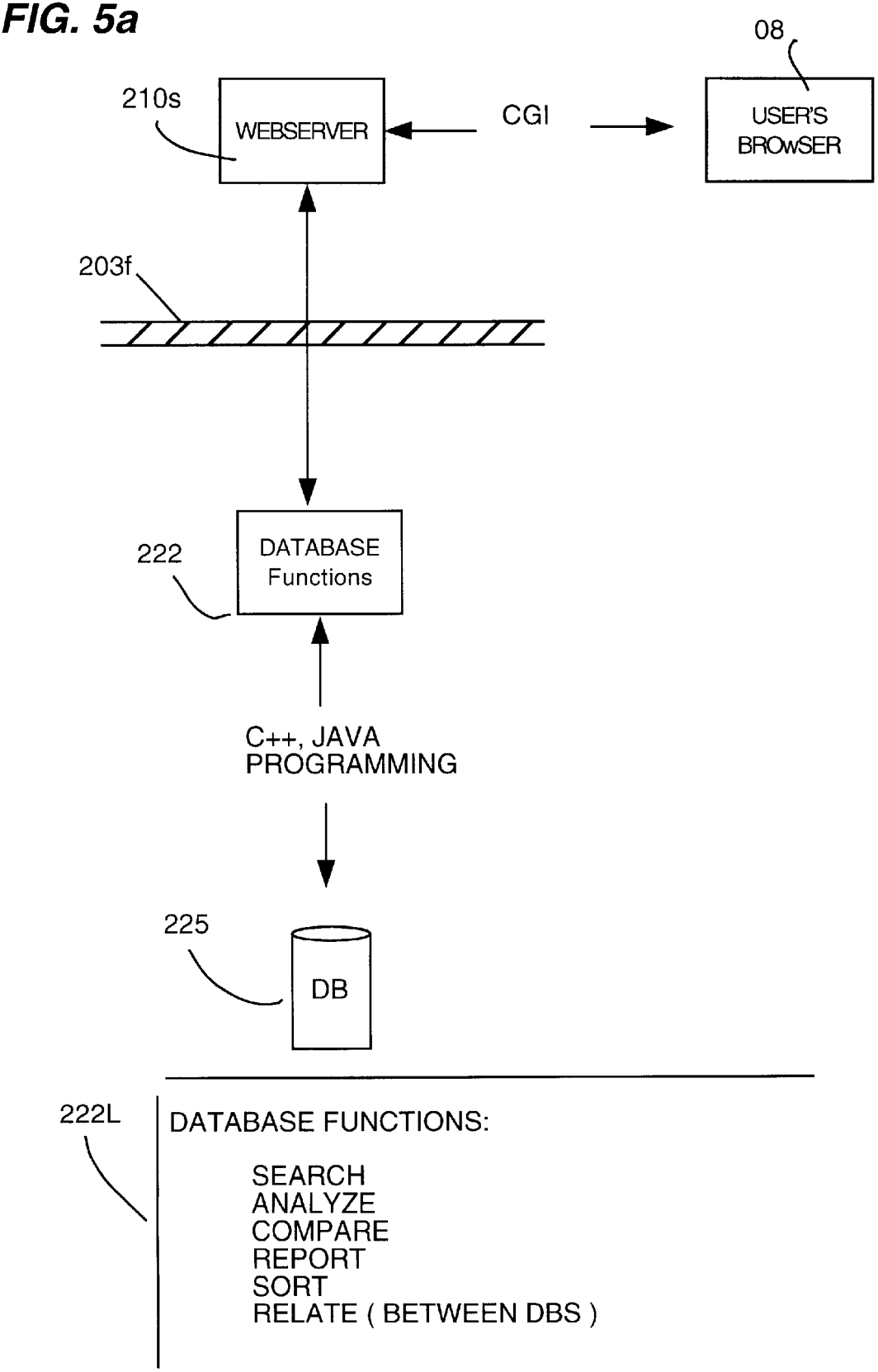
FIG. 5a is a block diagram of the database functions of the present invention.

With reference now to FIG. 5*a*, it can be seen that database functions 222 communicate directly with webserver 210*s* through IP firewall 203*f* in the present invention. The traditional approach to addressing database concerns over the Internet usually involve a webserver, an application server software product, and a database software server product. As can be seen in FIG. 5*a*, this embodiment of the present invention does not use an application server software product. Instead the functionality that is needed to receive and transmit information to and from a participant 08, over a communications path through webserver 210*s* of multivariate negotiations engine system 02 is accomplished by using common gateway interface (CGI) programming such as per, C++ and Java. Those skilled in the art will appreciate that other scripting and programming languages could be used as well.

As seen in FIG. 5*a*, CGI programming is used between participant 08's browser software at the participant's site, to handle communications between participant 08 and multivariate negotiations engine system 02's webserver 210*s*. CGI programming is used to dynamically create Web pages based upon the participant's request.

In the embodiment shown in FIG. 5*a*, communications between webserver 210*s* and database functions 222 are conducted directly also using languages Java, perl and C++, without the use of an intervening application server software product. Most of the functions of an applications server product are thus programmed directly either into webserver 210*s* or database functions 222 using web-based programming techniques. This approach tends to save both space and time and has the advantage of simplifying the operations at both ends, since functions can be streamlined. In particular, reporting can be more flexible than if a standard application server software program were interposed between webserver 210*s* and database functions 222. Those skilled in the art will appreciate that more traditional application server software products could still be used, if desired, as could other languages or scripting languages.

For example, and still in FIG. 5*a*, if a buyer participant 08 wishes to place a proposed order, the browser encrypts it at the browser's secure socket layer and webserver 210*s* decrypts the proposed order upon receipt at multivariate negotiations engine 02's site. Webserver 210*s* next analyzes the proposed order to understand it and formats into a request sent to database functions 222. In addition to basic read and write functions, database functions 222 shown in FIG. 5*a*, include operations such as search, analyze, compare, report, sort and relate (between databases.) Formatting can be as simple as "user=username" etc. A request such as "find user=username, return catalog" might be sent through IP firewall 203*f*. Using object-oriented techniques, the database is ordered more compactly to provide faster search capabilities. Those skilled in the art will appreciate that traditional flat file and relational or other database structures could be used as well.

FIG. 5*b*, for example is an illustrative database entry as it might be stored for a listing in a vendor database DBb. In this example, login is shown as 579—the unique ID assigned by multivariate negotiations engine 02 to this particular vendor. The remote web authoring template chosen by this vendor is shown as template 4, the vendor's letter of credit bank information is listed, and so on.

Those skilled in the art will appreciate that the embodiments described above are illustrative only, and that other systems in the spirit of the teachings herein fall within the scope of the invention.

What is claimed is:

1. An apparatus for processing multivariate negotiations, comprising:
    a network;
    a multivariate negotiations system including storage space, and negotiations software, such negotiations software including an automated negotiations engine for analyzing terms, the analysis of terms comprising understanding the purpose of the terms, formatting the terms according to the purpose, and placing them into user supplied context for use by a user, the multivariate negotiations system being connected to the network;
    a destination terminal for a first user connected to the network, the destination terminal including software for sending and receiving terms along a communications path over the network which flows through the multivariate negotiations system;
    an initiating terminal for a second user connected to the network, the initiating terminal including software for sending and receiving terms along a communications path over the network which flows through the multivariate negotiations system, during iterative processing the automated negotiations engine recognizing the users at the destination terminal and the initiating terminal as negotiators and recognizing one of the users as a deciding entity, such automated negotiations engine further recognizing any changes in the terms and storing in the storage space the terms each terminal proposes, and recognizing the terminal to which proposed terms are being sent as the indicated terminal, sending terms to the indicated terminal, the automated negotiations engine indicating any changes in the terms until a set of terms is acted upon in a final manner by the deciding entity.

2. The apparatus of claim 1, wherein the negotiations software enables iterative bargaining about the terms proposed by individuals at the respective terminals.

3. The apparatus of claim 1, wherein the negotiations software includes international processing software which enables proposed terms to be selected from and processed in internationally accepted formats.

4. The apparatus of claim 1, wherein the multivariate negotiations system includes sponsorship software which enables the creation of a sponsore community with prescribed rules and procedures for participants.

5. The apparatus of claim 1, wherein the multivariate negotiations system includes remote website authoring software which enables a participant to create a website remotely, using predefined templates.

6. The apparatus of claim 1, wherein the multivariate negotiations system includes sample quantity ordering software which allows a negotiator to order and purchase a sample quantity for evaluation.

7. The apparatus of claim 1, wherein the multivariate negotiations system includes archival software for recording and retrieving each set of proposed terms from each terminal to minimize the risk that final terms can be repudiated later.

8. The apparatus of claim 1, wherein the multivariate negotiations system includes integrated database soft ware to store and retrieve terms proposed.

9. The apparatus of claim 1, wherein the negotiations software includes commercial transaction software for enabling commercial transactions over a network.

10. The apparatus of claim 1, wherein the negotiations software includes non-commercial transaction software for enabling non-commercial negotiations over a network.

11. The apparatus of claim 1, wherein the multivariate negotiations system is physically located at one or more central sites on a network.

12. The apparatus of claim 1, wherein a multivariate negotiations system is physically located at a sponsor site on a network.

13. The apparatus of claim 1, wherein a multivariate negotiations system is physically located at a participant's site on a network.

14. The apparatus of claim 1, wherein the network comprises an open public network.

15. The apparatus of claim 1, wherein the network comprises a private network.

16. The apparatus of claim 1, wherein the network comprises a virtual private network.

17. The apparatus of claim 1, wherein the network comprises a local area network internal to an entity.

18. The apparatus of claim 1, wherein the software for sending and receiving terms comprises a web browser.

19. The apparatus of claim 1, wherein each terminal includes multimedia equipment capable of capturing additional content for inclusion in the terms.

20. A method for processing multivariate negotiations, comprising the steps of:

establishing communications paths over a network;

connecting a multivariate negotiations system including storage space and negotiations software to the network, such negotiations software including an automated negotiations engine for analyzing terms, the analysis of terms comprising understanding the purpose of the terms, formatting the terms according to that purpose, and placing them into user supplied context for use by a user;

connecting a destination terminal for a first user to the network, the destination terminal including software for sending and receiving terms along a communications path over the network which flows through the multivariate negotiations system;

connecting an initiating terminal for a second user to the network, the initiating terminal including software for sending and receiving terms along a communications path over the network which flows through the inultivariate negotiations system, during iterative processing the automated negotiations engine recognizing the users at the destination terminal and the initiating terminal as negotiators and recognizing one of the users as a deciding entity, such automated negotiations engine further storing in the storage space the terms each terminal proposes, and recognizing the terminal to which proposed terms are being sent as the indicated terminal, sending terms to the indicated terminal, the automated negotiations engine indicating any changes in the terms until a set of terms is acted upon in a final manner by the deciding entity.

21. The method of claim 20, wherein the step of including negotiations software further comprises the step of enabling iterative bargaining about the terms proposed by individuals at the respective terminals.

22. The method of claim 20, wherein the step of including negotiations software further comprises the step of international processing to enables proposed terms to be selected from and processed in internationally accepted formats.

23. The method of claim 20, wherein the step of connecting a multivariate negotiations system to the network further comprises the step of enabling the creation of a sponsored community with prescribed rules and procedures for participants.

24. The method of claim 20, wherein the step of connecting a multivariate negotiations system to the network further comprises the step of enabling a participant to create a website remotely, using predefined templates.

25. The method of claim 20, wherein the step of connecting the multivariate negotiations system to the network further comprises the step of allowing a negotiator to order and purchase a sample quantity for evaluation.

26. The method of claim 20, wherein the step of connecting a multivariate negotiations system to the network further comprises the step of enabling the recording and retrieval of each set of proposed terms from each terminal to minimize the risk that final terms can be repudiated later.

27. The method of claim 20, wherein the step of connecting a multivariate negotiations system to the network further comprises the step of including integrated database software to store and retrieve terms proposed.

28. The method of claim 20, wherein the step of including negotiations software further comprises the step of enabling commercial transactions over a network.

29. The method of claim 20, wherein the step of including negotiations software further comprises the step of enabling non-commercial negotiations over a network.

30. The method of claim 20, wherein the step of connecting a multivariate negotiations system to a network further comprises the step of physically locating said multivariate negotiations system at one or more central sites on a network.

31. The Method of claim 20, wherein the step of connecting a multivariaty negotiations system to a network further comprise the step of physically locating said multivariate negotiations system at a sponsor site on a network.

32. The method of claim 20, wherein the step of connecting a multivariate negotiations system to a network further comprises the step of physically locating said multivariate negotiations system at a participant's site on a network.

33. The method of claim 20, wherein the step of establishing communications paths over a network further comprises the step of using an open, public network.

34. The method of claim 20, wherein the step of establishing communications paths over a network further comprises the step of using a private network.

35. The method of claim 20, wherein the step of establishing communications paths over a network further comprises the step of using a virtual private network.

36. The method of claim 20, wherein the step of establishing communications paths over a network further comprises the step of using a local area network internal to an entity.

37. The method of claim 20, wherein the step of including software for sending and receiving terms further comprises the step of including a web browser.

38. The method of claim 20, wherein the step of connecting a terminal to a network further comprises the step of including multimedia equipment capable of capturing additional content for inclusion in the terms.

39. An apparatus for processing iterative, multivariate bargaining, comprising:

a multivariate negotiations system including storage space, and negotiations software such negotiations software including an automated negotiations engine for analyzing terms, the analysis of terms comprising understanding the purpose of the terms, formatting the terms according to the purpose, and placing them into user supplied context for use by a user;

a destination terminal for a first user communicating with the multivariate negotiations system, the destination terminal including software for sending and receiving terms along a communications path which flows through the multivariate negotiations system;

an initiating terminal for a second user communicating with the multivariate negotiations system, the initiating terminal including software for sending and receiving terms along a communications path which flows through the multivariate negotiations system, during iterative processing the automated negotiations engine recognizing the users at the destination terminal and the initiating terminal as negotiators and recognizing one of the users as a deciding entity, such automated negotiations engine further recognizing any changes in the terms and storing in the storage space the terms each terminal proposes, and recognizing the terminal to which proposed terms are being sent as the indicated terminal, and sending terms to the indicated terminal the automated negotiations engine indicating any changes in the terms until a set of terms is acted upon in a final manner by the deciding entity.

40. The apparatus of claim 39, wherein the software for sending and receiving terms includes editable forms.

41. The apparatus of claim 40, wherein the editable forms are pre-formatted.

42. The apparatus of claim 40, wherein the editable forms contain open field boxes.

43. The apparatus of claim 40, wherein the editable forms contain text areas.

44. The apparatus of claim 39, wherein the automated negotiations engine notifies users of activity by separate, electronic mail that does not contain any confidential information.

45. The apparatus of claim 39, wherein terms which have been acted upon in a final manner are incorporated into a concluding document.

46. The apparatus of claim 39, wherein the negotiations software can detect the need for a state change in the negotiations.

47. The apparatus of claim 46, wherein a state change further comprises a payment authorization.

48. The apparatus of claim 46, wherein a state change further comprises a user-defined procedure.

49. A method for processing iterative, multivariate bargaining, comprising the steps of:

operating a multivariate negotiations system including storage space and negotiations software, such negotiations software including an automated negotiations engine for analyzing the analysis of terms comprising understanding the purpose of the terms, formatting the terms according to the purpose, and placing them into user supplied context for use by a user;

communicating with the multivariate negotiations system through a destination terminal for a first user, the destination terminal including software for sending and receiving terms along a communications path which flows through the multivariate negotiations engine system;

communicating with the multivariate negotiations system through an initiating terminal for a second user, the initiating terminal including software for sending and receiving terms along a communications path which flows through the multivariate negotiations system, during iterative processing the automated negotiations engine recognizing the users at the destination terminal and the initiating terminal as negotiators and designating one of the users as a deciding entity, such automated negotiations engine further storing in the storage space the terms each terminal proposes, and recognizing the terminal to which proposed terms are being sent as the indicated terminal, sending terms to the indicated terminal, the automated negotiations engine indicating any changes in the terms until a set of terms is acted upon in a final manner by the deciding entity.

50. The method of claim 49, wherein the step of sending and receiving terms includes the step of using editable forms.

51. The method of claim 50, wherein the step of using editable forms includes the step of pre-formatting them.

52. The method of claim 50, wherein the step of using editable forms includes the step of providing editable forms containing open field boxes.

53. The method of claim 50, wherein the step of using editable forms includes the step of using editable forms containing text areas.

54. The method of claim 49, wherein the step of sending terms with an indication of any changes includes the step of the automated negotiations engine notifying users of activity by separate, electronic mail that does not contain any confidential information.

55. The method of claim 49, wherein the step of sending terms to the indicated terminal includes the step of incorporating terms which have been acted upon in a final manner into a concluding document.

56. The method of claim 49, wherein the step of sending terms to the indicated terminal includes the step of detecting the need for a state change in the negotiations.

57. The method of claim 56, wherein the step of detecting the need for a state change further comprises the step of detecting the need for a payment authorization.

58. The method of claim 56, wherein he step of detecting the need for a state change further comprises the step of detecting a user-defined procedure.

* * * * *

UNITED STATES PATENT AND TRADEMARK OFFICE
CERTIFICATE OF CORRECTION

PATENT NO. : 6,141,653
DATED : October 31, 2000
INVENTOR(S) : Conklin, et al.

It is certified that error appears in the above-identified patent and that said Letters Patent is hereby corrected as shown below:

Title page,
Item [54], delete "INTERATIVE," and insert -- ITERATIVE, --.

Column 1,
Line 1, delete "INTERATIVE," and insert -- ITERATIVE, --.

Claim 4,
Line 3, delete "sponsore" and insert -- sponsored --.

Claim 8,
Line 18, delete "soft ware" and insert -- software --.

Signed and Sealed this

Twenty-third Day of October, 2001

Attest:

NICHOLAS P. GODICI
Attesting Officer    Acting Director of the United States Patent and Trademark Office

(12) EX PARTE REEXAMINATION CERTIFICATE (7433rd)

United States Patent
Conklin et al.

(10) Number: US 6,141,653 C1
(45) Certificate Issued: Mar. 30, 2010

(54) SYSTEM FOR ITERATIVE, MULTIVARIATE NEGOTIATIONS OVER A NETWORK

(75) Inventors: Jeffrey Conklin, Boston, MA (US); David Foucher, Somerville, MA (US); Daniel Foucher, Bedford, MA (US)

(73) Assignee: Whitelight Technology, LLC, Boston, MA (US)

Reexamination Request:
No. 90/010,139, Apr. 10, 2008

Reexamination Certificate for:
Patent No.: 6,141,653
Issued: Oct. 31, 2000
Appl. No.: 09/192,735
Filed: Nov. 16, 1998

Certificate of Correction issued Oct. 23, 2001.

(51) Int. Cl.
*G06F 7/60* (2006.01)

(52) U.S. Cl. .................. 705/80; 705/1; 705/26
(58) Field of Classification Search .............. 705/80
See application file for complete search history.

(56) References Cited

U.S. PATENT DOCUMENTS

| | | | |
|---|---|---|---|
| 5,168,446 A | 12/1992 | Wiseman |
| 5,191,613 A | 3/1993 | Graziano et al. |
| 5,717,989 A | 2/1998 | Tozzoli et al. |
| 6,055,519 A | 4/2000 | Kennedy et al. |

OTHER PUBLICATIONS

AMiX Software, 1992 American Information, Exchange Corporation, Mountain View, California.

*Primary Examiner*—Matthew C. Graham

(57) ABSTRACT

A multivariate negotiations engine for iterative bargaining which: enables a sponsor to create and administer a community between participants such as buyers and sellers having similar interests; allows a buyer/participant to search and evaluate seller information, propose and negotiate orders and counteroffers that include all desired terms, request sample quantities, and track activity; allows a seller/ participant to use remote authoring templates to create a complete Website for immediate integration and activation in the community, to evaluate proposed buyer orders and counteroffers, and to negotiate multiple variables such as prices, terms, conditions etc., iteratively with a buyer. The system provides secure databases, search engines, and other tools for use by the sponsor, which enable the sponsor to define the terms of community participation, establish standards, help promote the visibility of participating companies, monitor activity, collect fees, and promote successes. All this is done through a multivariate negotiations engine system operated at the system provider's Internet site, thus requiring no additional software at the sponsors', or participant sellers', or buyer's sites. This also allows buyers and sellers to use and negotiate payment options and methods that are accepted internationally. The system maintains internal databases that contain the history of all transactions in each community, so that sponsors, buyers and sellers may retrieve appropriate records to document each stage of interaction and negotiation. Documents are created by the system during the negotiation process.

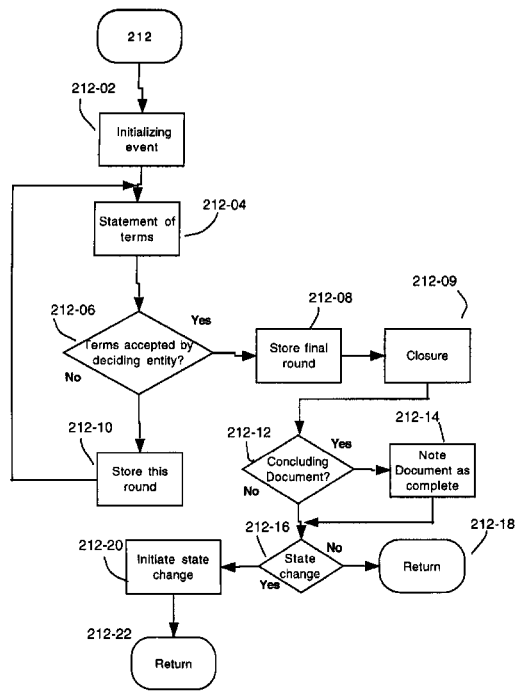

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 4, 20 and 23 is confirmed.

Claims 2, 3, 5–19, 21, 22 and 24–58 were not reexamined.

* * * * *